(12) United States Patent
Nakajima et al.

(10) Patent No.: US 8,948,254 B2
(45) Date of Patent: Feb. 3, 2015

(54) VIDEO SIGNAL TRANSMITTING DEVICE, VIDEO SIGNAL TRANSMITTING METHOD, VIDEO SIGNAL RECEIVING DEVICE, AND VIDEO SIGNAL RECEIVING METHOD

(75) Inventors: Yasuhisa Nakajima, Kanagawa (JP); Masaaki Takesue, Tokyo (JP); Ban Kawamura, Tokyo (JP)

(73) Assignee: Sony Corporation (JP)

( * ) Notice: Subject to any disclaimer, the term of this patent is extended or adjusted under 35 U.S.C. 154(b) by 1133 days.

(21) Appl. No.: 12/450,666

(22) PCT Filed: Jan. 20, 2009

(86) PCT No.: PCT/JP2009/050717
§ 371 (c)(1),
(2), (4) Date: Oct. 2, 2009

(87) PCT Pub. No.: WO2009/098933
PCT Pub. Date: Aug. 13, 2009

(65) Prior Publication Data
US 2010/0073574 A1    Mar. 25, 2010

(30) Foreign Application Priority Data

Feb. 4, 2008 (JP) ................ P2008-024411
Sep. 1, 2008 (JP) ................ P2008-223440

(51) Int. Cl.
*H04N 7/12* (2006.01)
*H04J 3/16* (2006.01)
(Continued)

(52) U.S. Cl.
CPC ........... *H04N 21/43615* (2013.01); *G06F 3/14* (2013.01); *G09G 5/006* (2013.01);
(Continued)

(58) Field of Classification Search
USPC .............. 375/240.03; 370/401, 468; 382/239; 348/14.13, 723, 500; 710/19
See application file for complete search history.

(56) References Cited

U.S. PATENT DOCUMENTS 6,522,352 B1    2/2003    Strandwitz et al.
7,024,045 B2 *  4/2006    McIntyre ............. 382/239
(Continued)

FOREIGN PATENT DOCUMENTS

EP    1519263 A2    3/2005
EP    1804503 A1    7/2007
(Continued)

OTHER PUBLICATIONS

Search Report from corresponding SG Application No. 200906044-3, dated Jan. 25, 2010.
(Continued)

*Primary Examiner* — Gims Philippe
(74) *Attorney, Agent, or Firm* — Lerner, David, Littenberg, Krumholz & Mentlik, LLP

(57) ABSTRACT

Object
To transmit well a video signal of a desired bit rate within a transfer bit rate of a transfer path.
Solving Means
A control unit 111 controls the operation of data compression units 121-1 through 121-n and switch unit 122. When the bit rate BR of a non-compressed video signal output from a codec 117 is within the transfer bit rate BR2 of an HDMI transfer path, the control unit 111 supplies the non-compressed video signal output from the codec 117 to the HDMI transmitting unit 102 as a video signal to be transmitted. On the other hand, when the bit rate BR1 is greater than the bit rate BR2, the control unit 111 selects a compression method that can be handled on the receiving side performs compression processing so that the bit rate BR1 becomes lower than the bit rate BR2, and supplies the compression video signal to the HDMI transmitting unit 102 as a video signal to be transmitted. Also, the control unit 111 transmits compression information (control information of the switch unit 122 and data compression units 121-1 through 121-n).

19 Claims, 26 Drawing Sheets

(51) Int. Cl.

| | | |
|---|---|---|
| *H04L 12/28* | (2006.01) | |
| *H04N 21/436* | (2011.01) | |
| *G06F 3/14* | (2006.01) | |
| *G09G 5/00* | (2006.01) | |
| *H04N 21/2343* | (2011.01) | |
| *H04N 21/41* | (2011.01) | |
| *H04N 21/434* | (2011.01) | |
| *H04N 21/437* | (2011.01) | |
| *H04N 21/4402* | (2011.01) | |
| *H04N 21/442* | (2011.01) | |
| *H04N 21/4425* | (2011.01) | |
| *H04N 21/6373* | (2011.01) | |
| *H04N 21/647* | (2011.01) | |
| *H04N 21/6583* | (2011.01) | |
| *H04N 19/164* | (2014.01) | |
| *H04N 19/12* | (2014.01) | |
| *H04N 19/61* | (2014.01) | |
| *H04N 19/46* | (2014.01) | |

(52) U.S. Cl.
CPC ... *H04N21/234327* (2013.01); *H04N 21/4122* (2013.01); *H04N 21/4344* (2013.01); *H04N 21/437* (2013.01); *H04N 21/440227* (2013.01); *H04N 21/44227* (2013.01); *H04N 21/44245* (2013.01); *H04N 21/4425* (2013.01); *H04N 21/6373* (2013.01); *H04N 21/64792* (2013.01); *H04N 21/6583* (2013.01); *H04N 19/00236* (2013.01); *H04N 19/00078* (2013.01); *H04N 19/00781* (2013.01); *H04N 19/00545* (2013.01); *G09G 2340/02* (2013.01); *G09G 2350/00* (2013.01); *G09G 2370/10* (2013.01); *G09G 2370/12* (2013.01)
USPC ............... 375/240.03; 370/401; 370/468

(56) References Cited

U.S. PATENT DOCUMENTS

| | | | | |
|---|---|---|---|---|
| 7,327,381 | B2* | 2/2008 | Suzuki | 348/14.13 |
| 7,386,641 | B2* | 6/2008 | Xu et al. | 710/19 |
| 7,499,462 | B2* | 3/2009 | MacMullan et al. | 370/401 |
| 8,072,549 | B2* | 12/2011 | Inoue et al. | 348/723 |
| 2003/0208774 | A1 | 11/2003 | Yurt et al. | |
| 2005/0063707 | A1 | 3/2005 | Imai | |
| 2005/0128349 | A1 | 6/2005 | Takamori et al. | |
| 2006/0039413 | A1 | 2/2006 | Nakajima et al. | |
| 2006/0209890 | A1* | 9/2006 | MacMullan et al. | 370/468 |
| 2007/0280646 | A1 | 12/2007 | Seita et al. | |
| 2010/0066906 | A1* | 3/2010 | Nakajima | 348/500 |

FOREIGN PATENT DOCUMENTS

| | | |
|---|---|---|
| JP | 07-074652 A | 3/1995 |
| JP | 11-008626 A | 1/1999 |
| JP | 11-261977 A | 9/1999 |
| JP | 2002330167 A | 11/2002 |
| JP | 2004-072147 A | 3/2004 |
| JP | 2005-073220 A | 3/2005 |
| JP | 2005-244289 A | 9/2005 |
| JP | 2006-109011 A | 4/2006 |
| JP | 2007-037029 | 2/2007 |
| JP | 2007-037029 A | 2/2007 |
| JP | 2007235370 A | 9/2007 |
| JP | 2007-288247 A | 11/2007 |
| JP | 2007324919 A | 12/2007 |
| JP | 2008113198 | 5/2008 |

OTHER PUBLICATIONS

Office Action from Japanese Application No. 2008-306683, dated May 14, 2013.
Office Action from Japanese Application No. 2008-223440, dated May 21, 2013.
European Search Report from EP Application No. 09830307, dated Jul. 4, 2013.

* cited by examiner

FIG. 4

| Byte# | 7 | 6 | 5 | 4 | 3 | 2 | 1 | 0 |
|---|---|---|---|---|---|---|---|---|
| 0 | Video tag code (=2) | | | | Length (=L) | | | |
| 1 | CEA Short Video Descriptor 1 = &H85 (1920x1080i 60Hz 16:9 Native Mode) | | | | | | | |
| 2 | CEA Short Video Descriptor 2 = &H02 (720x480i 60Hz 4:3) | | | | | | | |
| 3 | CEA Short Video Descriptor 3 = &H03 (720x480p 60Hz 16:9) | | | | | | | |
| 4 | CEA Short Video Descriptor 4 = &H04 (1280x720p 60Hz 16:9) | | | | | | | |
| 5 | CEA Short Video Descriptor 5 = &H16 (1920x1080p 60Hz 16:9) | | | | | | | |
| 6...L-1 | ... | | | | | | | |
| L | CEA Short Video Descriptor L =& H46 (1920x1080i 120Hz 16:9) | | | | | | | |

FIG. 5

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI-Dual |
| 7 | Max_TMDS_Clock | | | | | | | |
| 8 | Latency | | | | Reserved (0) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

FIG. 6

| | FrameRate | Bit | TRANSFER RATE |
|---|---|---|---|
| 4096x2048 | 60p | 36 | 18.119Gbps * |
| | | 24 | 12.080Gbps * |
| 3840x2400 | | 36 | 19.907Gbps * |
| | | 24 | 13.271Gbps * |
| 3840x2160 | | 36 | 17.916Gbps * |
| | | 24 | 11.944Gbps * |
| 3200x2400 | | 36 | 16.589Gbps * |
| | | 24 | 11.059Gbps * |
| 2560x2048 | | 36 | 11.325Gbps * |
| | | 24 | 7.550Gbps |
| 2560x1600 | | 36 | 8.847Gbps |
| | | 24 | 5.900Gbps |
| 1920x1080 | | 36 | 4.479Gbps |
| | | 24 | 2.986Gbps |
| | 60i | 36 | 2.239Gbps |
| | | 24 | 1.493Gbps |

FIG. 7

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI-Dual |
| 7 | Max_TMDS_Clock | | | | | | | |
| 8 | Latency | | | | Compress Method Length (M-13) | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...M-1 | Compress Method | | | | | | | |
| M...N | Reserved (0) | | | | | | | |

FIG. 8

| Byte# | 7 | 6 | 5 | 4 | 3 | 2 | 1 | 0 |
|---|---|---|---|---|---|---|---|---|
| ... | | | | | | | | |
| 8 | Latency | | | | Compress Method Length = 0x01 | | | |
| ... | | | | | | | | |
| 13 | Reserved (0) | | | | RLE | Wavelet | SBM | LLVC |
| ... | | | | | | | | |

FIG. 10

| Byte# | 7 | 6 | 5 | 4 | 3 | 2 | 1 | 0 |
|---|---|---|---|---|---|---|---|---|
| 0 | Check Sum ||||||||
| 1 | Rsvd(0) | Y1 | Y0 | A0 | B1 | B0 | S1 | S0 |
| 2 | C1 | C0 | M1 | M0 | R3 | R2 | R1 | R0 |
| 3 | ITC | EC2 | EC1 | EC0 | Q1 | Q0 | SC1 | SC0 |
| 4 | Rsvd(0) | VIC6 | VIC5 | VIC4 | VIC3 | VIC2 | VIC1 | VIC0 |
| 5 | Reserved (0) |||| PR3 | PR2 | PR1 | PR0 |
| 6,7 | Line Number of End of Top Bar ||||||||
| 8,9 | Line Number of Start of Bottom Bar ||||||||
| 10,11 | Pixel Number of End of Left Bar ||||||||
| 12,13 | Pixel Number of Start of Right Bar ||||||||
| 14 | Compress Method Length (M-15) ||||||||
| 15 ... M-1 | Compress Method ||||||||
| M | Compress Ratio ||||||||
| M ...27 | Reserved (0) ||||||||

FIG. 11

| Byte# | 7 | 6 | 5 | 4 | 3 | 2 | 1 | 0 |
|---|---|---|---|---|---|---|---|---|
| 14 | Compress Method Length = 0x01 ||||||||
| 15 | Reserved (0) |||||| 1 | 0 |
| 16 | Compress Ratio Integer = 0x02 |||| Compress Ratio Fractional Part = 0x00 ||||

FIG. 17

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

| DIRECTION | TRANSFER BIT RATE |
|---|---|
| (a) | TRa |
| (b) | TRb |
| (c) | TRc |

VIDEO SIGNAL TRANSMITTING DEVICE, VIDEO SIGNAL TRANSMITTING METHOD, VIDEO SIGNAL RECEIVING DEVICE, AND VIDEO SIGNAL RECEIVING METHOD

CROSS-REFERENCES TO RELATED APPLICATIONS

The present application is a national phase entry under 35 U.S.C. §371 of International Application No. PCT/JP2009/050717 filed Jan. 20, 2009, published on Aug. 13, 2009 as WO 2009/098933 A1, which claims priority from Japanese Patent Application No. JP 2008-024411 filed in the Japanese Patent Office on Feb. 4, 2008 and Japanese Patent Application No. JP 2008-223440 filed in the Japanese Patent Office on Sep. 1, 2008.

TECHNICAL FIELD

The present invention relates to a video signal transmitting device, video signal transmitting method, video signal receiving device, and video signal receiving method. More specifically, the present invention relates to a video signal transmitting device and so forth that can transmit a video signal of a desired pit rate within transmission bit rates of a transmission path well, by selectively transmitting a non-compressed video signal or a compressed video signal obtained by performing compression processing with a compression method that the receiving device can handle as to the non-compressed video signal. Also, the present invention relates to a video signal transmission device and so forth that can realize an optimal transmission state according to an actual transmission path state, by dynamically adjusting the bit rate of the transmission video signal according to the state of the transmission path.

BACKGROUND ART

In a system to transmit a non-compressed (baseband) video signal with cable or wireless technique, the maximum transmission bit rate of the transmission path thereof has an upper limit, and a non-compressed video signal of a bit rate above the upper limit transmission bit rate cannot be transmitted.

Currently, baseband transmission systems are stipulated to transmit up to 1920×1080 60p. However, hereafter, graphics cards of a PCs (Personal Computer) which correspond to standards of QWXGA (2560×1600), QSXGA (2560×2048), QUXGA (3200×2400), and QWUXGA (3840×2400) are conceivable, and also, with broadcasting/cinemas, high-precision screens such as 4K×2K (4096×2048) or 4×2K (3840×2160) are conceivable.

In the event thereof, transmission of a non-compressed video signal with a resolution exceeding 1920×1080 is required. However, with the current baseband transmission system, as described above, transmitting up to 1920×1080 60p is stipulated, and in order to transmit a non-compressed video signal with a resolution exceeding 1920×1080 requires some sort of data compression means.

For example, Patent Document 1 discloses controlling the transmission bit rate by changing the modulation method of changing the transmission frequency, in the event of wireless transmission. Also, for example, Patent Document 2 discloses appending identification data of a communication mode such as band compression or security processing or the like, and on the transmission arriving side, performing transmission-arriving processing based on the communication mode identification data.

Also, for example, Patent Document 3 discloses, in a bi-directional image communication system having a client and server that encodes a video using a video compression method that generates key frames that are compressed within the frame and interpolation frames that are compressed between frames, effectively using a bandwidth between server and client by determining a refresh rate value for video encoding with the client, based on the transmission state from the server to the client.

Patent Document 1: Japanese Unexamined Patent Application Publication No. 2007-370229
Patent Document 2: Japanese Unexamined Patent Application Publication No. 11-8626
Patent Document 3: Japanese Unexamined Patent Application Publication No. 2006-109011

DISCLOSURE OF INVENTION

Problems to be Solved by the Invention

With the technique in the Patent Document 1 described above, a video signal having a bit rate exceeding the range of wireless limitations cannot be transmitted. Also, with the technique in the Patent Document 2, corresponding status of the communication mode at the transmission arriving side is not detected at the transmission origin side, whereby compatibility between manufacturers cannot be obtained. Also, with the technique in the Patent Document 3, compressed video signals are mentioned but non-compressed video signals are not disclosed.

Note that whether the transfer path is cabled or wireless, the transfer bit rate of the transfer path can be changed by the state thereof changing. For example, in the case that the transfer path is configured with a cable, signal decay from deterioration (bends, twists, broken lines) of the cable or cable length, or by connection problems with the connection portions the receiving signal quality deteriorates, and the transfer bit rate of the transfer path decreases in actuality. Also, for example, in the case that the transfer path is wireless, the receiving signal quality deteriorates with the existence of obstacles, interfering waves, and so forth, and the transfer bit rate of the transfer path decreases in actuality. Accordingly, in determining the transfer bit rate of the transfer path, it is necessary to consider the state of the transfer path.

An object of the present invention is enable good transmission of a video signal of a desired bit rate within the transfer bit rates of the transfer path. Also, an object of the present invention is to enable realizing the optimal transfer state according to the actual transfer path state.

Means for Solving the Problems

The concept of the present invention is in a video signal transmitting device including a video signal output unit to output a non-compressed video signal to be transmitted;

a compression method information obtaining unit to obtain information indicating a compression method that a receiving device can handle, from the receiving device via a transfer path;

a video signal compression unit to perform compression processing as to a non-compressed video signal output from the video signal output unit, with a compression method corresponding to the compression method indicated by the compression method information obtained with the compression method information obtaining unit, and output a compressed video signal;

a video signal selecting unit to select the non-compressed video signal output from the video signal output unit or the compressed video signal output from the video signal compression unit;

a video signal transmitting unit to transmit the video signal selected with the video signal selecting unit to the receiving device via a cable or wireless transfer path;

a transmission control unit to control the operations of the video signal compression unit and the video signal selecting unit; and a compression information supplying unit to supply the control information of the video signal compression unit and the video signal selecting unit by the transmission control unit to the receiving device via the transfer path.

According to the present invention, a non-compressed video signal to be transmitted is output from a video signal output unit. Also, information indicating a compression method that the receiving device can handle is obtained from the receiving device via a transfer path, by a compression method information obtaining unit. With the video signal compression unit, compression processing is performed as to the non-compressed video signal output from the video signal output unit with a compression method that the receiving device can handle, and a compressed video signal is output. Herein the data amount of the compressed video signal is reduced as to the bit rate of the non-compressed video signal, and the bit rate thereof is made smaller.

The non-compressed video signal output from the video signal output unit or the compressed video signal output from the video signal compression unit is selected by a video signal selecting unit, and the selected video signal is transmitted to the receiving device via a cable or wireless transfer path by the video signal transmitting unit. For example, the video signal is transmitted to the receiving device through multiple channels, by a differential signal, via a transfer path. In this case, control information of the video signal compression unit and video signal selecting unit is supplied to the receiving device via the transfer path, and used for control for the purpose of receiving the video signal with the receiving device well.

Thus, with the configuration, the non-compressed video signal or the compressed video signal obtained by performing compression processing as to the non-compressed video signal with a compression method that the receiving device can handle is selectively transmitted, whereby the video signal can be transmitted with a desired bit rate within with transfer bit rates of the transfer path well.

The present invention may be arranged such that, for example, when the bit rate of the non-compressed video signal to be transmitted is a first bit rate, and the transfer bit rate of the transfer path is a second bit rate, in the case that the first bit rate does not exceed the second bit rate, the transmission control unit controls so that the non-compressed video signal is selected with the video signal selecting unit, and in the case that the first bit rate exceeds the second bit rate, when the video signal compression unit can be handled with the compression method indicated by the compression method information obtained with the compression method information obtaining unit, controls so that the compressed video signal is selected with the video signal selecting unit, and also controls at least the compression ratio or compression method of the video signal compression unit so that the bit rate of the compression video signal becomes lower than the second bit rate.

Also, the present invention may be arranged to have a video format information obtaining unit to obtain the format information of the video signal that a receiving device handles, from the receiving device via the transfer path, for example, and the video signal output unit outputs the non-compressed video signal of a format that the format information obtained with the video format information obtaining unit indicates, and the transmission control unit obtains a first bit rate based on the format information obtained with the video format information obtaining unit.

Also, the present invention may be arranged such that, for example, in the case that the first bit rate exceeds the second bit rate, the transmission control unit controls so that the non-compressed video signal is selected by the video signal selecting unit when the video signal compression unit cannot handle the compression method indicated by the compression method information obtained with the compression method information obtaining unit, and also at least the resolution, bit depth, or frame rate of the non-compressed video signal output from the video signal output unit is made to be small, and the bit rate of the non-compressed video signal herein becomes lower than the second bit rate. In this case, the resolution, bit depth, or frame rate of the non-compressed video signal to be transmitted is made to be small, but at least the video signal can be transmitted in a state usable at the receiving device.

Also, the transmission control unit may be arranged such that, for example, in the case that the first bit rate exceeds the second bit rate, when the video signal compression unit can handle multiple compression methods indicated by the compression method information obtained with the compression method information obtaining unit, a lossless compression method is used with priority as a compression method in the event of performing compression processing as to the non-compressed video signal with the video signal compression unit. By the lossless compression method being used with priority, image decay can be suppressed.

Also, the present invention may be arranged to further include, for example, a transfer path information obtaining unit to obtain transfer path information indicating the state of the transfer path via the transfer path from the receiving device; and a bit rate adjusting unit to adjust the bit rate of the video signal transmitted to the receiving device by the video signal transmitting unit, based on the transfer path information obtained with the transfer path information obtaining unit.

Depending on the state of the transfer path, the actual transfer bit rate of the transfer path is lower than a theoretical value. By the bit rate of the transmitting video signal being adjusted based on the transfer path information, the bit rate of the transmitting video signal is dynamically adjusted so as to not exceed the actual transfer bit rate of the transfer path. Thus, an optimal transfer state is realized according to the actual transfer path state.

Now, the bit rate adjusting is performed by a format change of the transmitting video signal, and further a change of the compression method or compression ratio. For example, when the bit error rate indicated by the bit error rate information serving as the transfer path information becomes higher than a constant value, the transmitting video signal format is changed to a low-bit rate format, or is changed from a non-compressed video signal to a compressed video signal, and further the compression method or compression ratio is controlled and the bit rate of the transmitting video signal is lowered.

For example, the transfer path information obtained with the transfer path information obtaining unit is the format information of the video signal read out from the storage unit wherein the format information of the video signal that the receiving device handles is stored, which the receiving device has. In this case, with the bit rate adjusting unit, for example, the format of the video signal output from the video signal output unit is changed to a format indicated by the format information of the video signal as the transfer path information, whereby bit rate adjusting of the transmitting video signal can be easily performed.

Note that with the receiving device, for example error parameters which are parameters indicating the state of the transfer path, e.g. receiving signal level, bit error rate and so forth, are measured, and updating of the format information of the video signal stored in the storage unit is performed based on the measured error parameters herein. Therefore, information indicating the format of the video signal which does not have to exceed the actual transfer bit rate of the transfer path is stored in the storage unit.

For example, when there is a change to the format information of the video signal stored in the storage unit, the transfer path information obtaining unit obtains format information of the video signal stored in the storage unit from the receiving device. Thus, only in the case that a change is made to the format information of the video signal stored in the storage unit can the transfer path information obtaining unit obtain the format information, and prevent wasteful obtaining actions. For example, in the case of the receiving device changing the format information of the video signal stored in the storage unit, the voltage of a predetermined line of the transfer path, e.g. the HPD line, is changed and the change thereof is notified to the transmitting device. The transfer path information obtaining unit recognizes that the format information of the video signal stored in the storage unit by the voltage change of the predetermined line.

Also, the present invention may be arranged such that, for example, the transfer path is a wireless transfer path, and the transmission control unit has information of the transfer bit rate of the transfer path as to multiple transmission directions; and when the video signal transmitting unit performs switching of the transmission direction from a first direction to a second direction, controls the operations of the video signal compression unit and the video signal selecting unit, based on the transfer bit rate in the second direction. In this case, when the transfer direction switch is performed from the first direction to the second direction with the video signal transmitting unit, even if the transfer bit rate is lowered, the video signal to be transmitted is changed from a non-compressed video signal to a compressed video signal, based on the transfer bit rate information, and further by the compression method or compression ratio being controlled, the video signal can be transmitted well.

The concept of the present invention is in a video signal transmitting device which has a video signal output unit to output a video signal to be transmitted;

a video signal transmitting unit to transmit the video signal output from the video signal output unit to the receiving device via a cable or wireless transfer path;

a transfer path information obtaining unit to obtain transfer path information indicating the state of the transfer path from the receiving device via the transfer path; and a bit rate adjusting unit to adjust the bit rate of the video signal output from the video signal output unit, based on the transfer path information obtained with the transfer path information obtaining unit.

According to the present invention, a video signal to be transmitted is output from the video signal output unit. The video signal here is transmitted to the receiving device via a cable or wireless transfer path by the video signal transmitting unit. For example, the video signal is transmitted to the receiving device through multiple channels, by a differential signal, via a transfer path. Also, transfer path information indicating the state of the transfer path is obtained by the transfer path information obtaining unit from the receiving device via the transfer path.

Based on the transfer path information here, the bit rate of the video signal transmitted to the receiving device is adjusted by the bit rate receiving unit. Depending on the transfer path state, the actual transfer bit rate of the transfer path is lower than a theoretical value. By the bit rate of the transmitting video signal being adjusted based on the transfer path information, the bit rate of the transmitting video signal is dynamically adjusted so as to not exceed the actual transfer bit rate of the transfer path. Thus, an optimal transfer state is realized according to the actual transfer path state.

Here, the bit rate adjustment is performed by changing the transmitting video signal format, and further changing the compression method or compression ratio. For example, when the bit error rate indicated by the bit error rate information serving as the transfer path information is higher than a constant value, the format of the transmitting video signal is changed to a format with a low bit rate, or is changed from a non-compressed video signal to a compressed video signal, and further, the compression method or compression ratio is controlled, and the bit rate of the transmitting video signal is lowered.

For example, the transfer path information obtained with the transfer path information obtaining unit is the format information of the video signal read out from the storage unit wherein the format information of the video signal that the receiving device handles is stored, that the receiving device has. In this case, with the bit rate adjusting unit, for example, the format of the video signal output from the video signal output unit is changed to a format indicated by the format information of the video signal serving as the transfer path information, whereby the bit rate adjustment of the transmitting video signal is easily performed.

Note that with the receiving device, for example error parameters which are parameters indicating the state of the transfer path, e.g. receiving signal level, bit error rate and so forth are measured, and based on the measured error parameters herein, updating of the format information of the video signal stored in the storage unit is performed. Therefore, information indicating a format of video signal which does not have to exceed the actual transfer bit rate of the transfer path is stored in the storage unit.

For example, when there is a change to the format information of the video signal stored in the storage unit, the transfer path information obtaining unit obtains format information of the video signal stored in the storage unit from the receiving device. Thus, only in the case that a change is made to the format information of the video signal stored in the storage unit can the transfer path information obtaining unit obtain the format information, and prevent wasteful obtaining actions. For example, in the case of the receiving device changing the format information of the video signal stored in the storage unit, the voltage of a predetermined line of the transfer path, e.g. the HPD line, is changed and the change thereof is notified to the transmitting device. The transfer path information obtaining unit recognizes that the format information of the video signal stored in the storage unit by the voltage change of the predetermined line has been changed.

The concept of the present invention is in a video signal receiving device which has a video signal receiving unit transmitted from a transmitting device via a cable or wireless transfer path;

a video signal decompressing unit to perform decompression processing as to a compressed video signal and output a non-compressed video signal, when the video signal received with the video signal receiving unit is a compressed video signal;

a video signal selecting unit to select the video signal received with the video signal receiving unit or the video signal output from the video signal decompression unit;

a compression information obtaining unit to obtain compression information including at least information indicating whether the video signal received with the video signal receiving unit from the transmitting device is a non-compressed video signal or a compressed video signal, and information indicating a compression method in the case that the video signal received with the video signal receiving unit is a compressed video signal;

a receiving control unit to control operations of the video signal decompression unit and the video signal selecting unit, based on the compression information obtained with the compression information obtaining unit; and a compression method information supplying unit to supply information indicating a compression method that the video signal decompression unit can handle to the transmitting device.

According to the present invention, the video signal transmitted from the transmitting device via a cable or wireless transfer path is received with the video signal receiving unit. For example, with the video signal receiving unit, the video signal is received from the transmitting device through multiple channels, by a differential signal, via a transfer path. When the received video signal is a compressed video signal, decompression processing is performed by the video signal decompression unit as to the compressed video signal and a non-compressed video signal is output. As the reception video signal, when the received video signal is a non-compressed video signal, the video signal thereof is selected, and when the received video signal is a compressed video signal, the non-compressed video signal obtained with the decompression processing of the video signal decompression unit is selected.

In this case, the operations of the video signal decompression unit and video signal selecting unit are controlled based on the compression information obtained with the compression information obtaining unit, whereby a reception video signal can be obtained well, regardless of whether the video signal transmitted from the transmitting device is a non-compressed video signal or a compressed video signal. Also, information indicating the compression method that the video signal decompression unit can handle is transmitted to the transmitting device, whereby in the case that compression processing is performed with the transmitting device, the compression method thereof can be made the compression method that can be handled by itself.

Also, the present invention may be arranged to include, for example, a video format information supplying unit to supply the format information (information of resolution, bit depth, frame rate and so forth) of the video signal handled by itself to the transmitting device via the transfer path. Thus, the transmission device side can transmit the video signal of the video format handled by itself.

Also, the present invention may be arranged to further include, for example, a transfer path information supplying unit to supply the transfer path information indicating the transfer path state to the transmitting device via the transfer path. For example, error parameters which are parameters indicating the state of the transfer path, e.g. receiving signal level, bit error rate and so forth are measured, and the information corresponding to the error parameters are supplied to the transmission device as the transfer path information.

Depending on the state of the transfer path, the actual transfer bit rate of the transfer path becomes that which is lower than the theoretical value. By the transfer path information indicating the state of the transfer path being transmitted from the receiving device to the transmitting device as described above, the bit rate of the transmitting video signal can be adjusted based on the transfer path information, and the bit rate of the transfer video signal can be dynamically adjusted so as not to exceed the actual transfer bit rate of the transfer path. Thus, an optimal transfer state according to the actual transfer path state is realized.

Also, the present invention may be arranged to further include: a storage unit wherein format information of the video signal handled by itself is stored; wherein the transfer path information supplying unit changes the format information of the video signal stored in the storage unit, based on the error parameters measured with the error parameter measuring unit, and supplies the changed format information of the video signal to the transmitting device as the transfer path information. In this case, information indicating the format of the video signal, which does not have to exceed the actual transfer bit rate of the transfer path, is stored in the storage unit.

Thus by supplying the format information of the video signal stored in the storage unit to the transmitting device as transfer path information, the format of the video signal output from the video signal output unit is changed into a format indicated by the format information at the transmitting device, and the bit rate adjustment of the transmitting video signal can be performed easily.

For example, when there is a change to the format information of the video signal stored in the storage unit, the transfer path information supplying unit may change the voltage of a predetermined line making up the transfer path, and notify the transmitting device of the change of format information of this video signal. Thus, only in the case that a change is made to the format information of the video signal stored in the storage unit and obtained with the transmitting device can the transfer path information supplying unit supply the format information, and prevent wasteful supplying actions.

The concept of the present invention is in a video signal receiving device which has a video signal receiving unit to receive a video signal transmitted from a transmitting device via a cable or wireless transfer path; and a transfer path information supplying unit to supply the transfer path information indicating the state of the transfer path to the transmitting device via the transfer path.

According to the present invention, a video signal transmitted from the transmitting device via a cable or wireless transfer path is received by the video signal receiving unit. For example, with the video signal receiving unit, the video signal is received from the transmitting device through multiple channels, by a differential signal, via a transfer path.

The transfer path information indicating a state of the transfer path is supplied to the transmitting device via the transfer path, by the transfer path information supplying unit. For example, error parameters such as receiving signal level, bit error rate and so forth which are parameters indicating the state of the transfer path are measured, and the information corresponding to the error parameters herein is supplied to the transmitting device as transfer path information.

Depending on the state of the transfer path, the actual transfer bit rate of the transfer path becomes lower than the theoretical value. By the transfer path information indicating the state of the transfer path from the receiving device to the transmitting device as described above, the bit rate of the transmitting video signal can be adjusted based on the transmitting path information, and the bit rate of the transmitting video signal can be dynamically adjusted so as to not exceed the actual transfer bit rate of the transfer bit rate. Thus, an optimal transfer state according to the actual transfer path state can be realized.

Also, the present invention may for example further include: a storage unit wherein format information of the video signal handled by itself is stored; wherein the transfer path information supplying unit changes the format information of the video signal stored in the storage unit, based on the error parameters measured with the error parameter measuring unit, and supplies the changed format information of the video signal to the transmitting device as the transfer path information. In this case, information indicating the format of the video signal, which does not have to exceed the actual transfer bit rate of the transfer path, is stored in the storage unit.

Thus, by supplying the format information of the video signal stored in the storage unit to the transmitting device as transfer path information, with the transmitting device the format of the video signal output from the video signal output unit is changed into a format indicated by the format information, and the bit rate adjustment of the transmitting video signal can be performed easily.

For example, when there is a change to the format information of the video signal stored in the storage unit, the transfer path information supplying unit may change the voltage of a predetermined line making up the transfer path, and notify the transmitting device of the change of format information of this video signal. Thus, only in the case that a change is made to the format information of the video signal stored in the storage unit and obtained with the transmitting device can the format information be supplied, and prevent wasteful supplying actions.

Advantageous Effects

According to the video signal transmitting device of the present invention, a non-compressed video signal or a compressed video signal obtained by performing compression processing with a compression method that the receiving device can handle as to the non-compressed video signal is selectively transmitted, and a video signal of a desired bit rate can be transmitted within the transmission bit rates of the transmission path well.

Also, according to the video signal receiving device of the present invention, information of the compression method that itself can handle is supplied to the transmission device, while decompression processing, signal selection processing and so forth are controlled based on the compression information obtained from the transmission device, and a reception video signal can be obtained well, regardless of whether the video signal being sent is a non-compressed video signal or a compressed video signal.

Also, according to the video signal transmitting device of the present invention, the bit rate of the transmission video signal is adjusted based on the transfer path information obtained from the receiving device, the bit rate of the transmission video signal can be dynamically adjusted according to the state of the transmission path, and an optimal transfer state can be realized according to the actual transfer path state.

Also, according to the video signal receiving device of the present invention, the transfer path information indicating the state of the transfer path is supplied to the transmission device, a transmission video signal wherein the bit rate is dynamically adjusted according to the state of the transfer path can be received from the transmitting device, and the video signal transmitted from the transmitting device can be received with good quality.

BRIEF DESCRIPTION OF DRAWINGS

FIG. 4 is a diagram illustrating a video data example of a Video Short region.

FIG. 5 is a diagram illustrating a data configuration example of a Vendor Specific region.

FIG. 6 is a diagram illustrating the relation between video format and transfer rate.

FIG. 7 is a diagram illustrating a data configuration example of compression method information of a Vendor Specific region.

FIG. 8 is a diagram illustrating an example of compression method information of a Vendor Specific region.

FIG. 10 is a diagram illustrating a data configuration example of an AVI InfoFrame packet.

FIG. 11 is a diagram illustrating a data example of a compression method and compression ratio of an AVI InfoFrame packet.

FIG. 17 is a diagram illustrating a pin array (Type A) of an HDMI terminal.

REFERENCE NUMERALS

Figure 1:
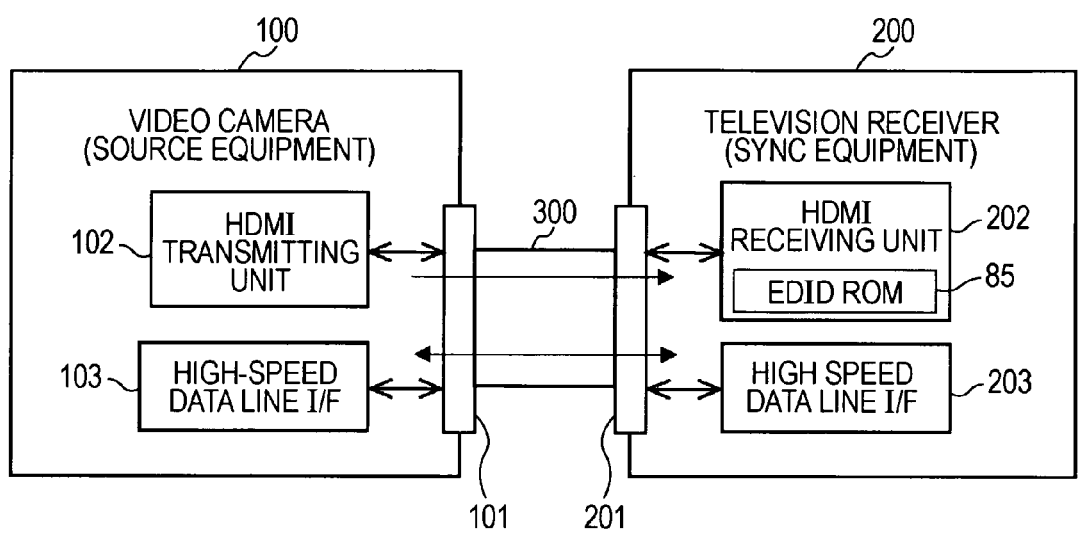
FIG. 1 is a block diagram illustrating a configuration example of an AV system according to an embodiment of the present invention.

Explanation of Reference Numerals 50, 50A AV system, 50B wireless system, 50C optical communication system, 100 video camera, 100A, 100B transmitting device, 101 HDMI terminal, 102 HDMI transmitting unit, 103 high speed data line interface, 111 control unit, 111a storage unit, 112 user operating unit, 113 display unit, 114 imaging lens, 115 imaging device, 116 imaging signal processing unit, 117 codec, 117a signal converting unit, 118 storage playing unit, 119 HD, 120 external terminal, 121-1~121-n data compression unit, 122 switch unit, 123 Ethernet interface, 124 network terminal, 130 external device, 131 control unit, 131a storage unit, 132 user operating unit, 133 display unit, 134 playing unit, 134a signal converting unit, 135 wireless transmitting/receiving unit, 200, 200' television receiver, 200A, 200B receiving device, 201 HDMI terminal, 202 HDMI receiving unit, 203 high speed data line interface, 211 control unit, 211a storage unit, 212 user operating unit, 213 tuner, 215 antenna terminal, 216 switching unit, 216a signal converting unit, 217 display processing unit, 218 display unit, 219-1~219-m data decompression unit, 220 switch unit, 221 Ethernet interface, 222 network terminal, 225 error parameter measuring unit, 231 control unit, 231a storage unit, 232 user operating unit, 233 wireless transmitting receiving unit, 233a bit error rate measuring unit, 234 display unit, 234a signal converting unit, 300 HDMI cable, 300A wireless transfer path, 400 disk recorder, 500 audio amp, 600 television receiver

BEST MODE FOR CARRYING OUT THE INVENTION

The embodiments of the present invention will be described below with reference to the drawings. FIG. 1 shows a configuration example of an AV system 50 as an embodiment.

The AV system 50 herein has a video camera 100 as source equipment, and a television receiver (TV) 200 as sync equipment. Also, the video camera 100 and television receiver 200 are connected via an HDMI cable 300.

An HDMI terminal 101 connected to an HDMI transmitting unit (HDMITX) 102 and a high speed data line interface 103 is provided to the video camera 100. An HDMI terminal 201 connected to an HDMI receiving unit (HDMIRX) 202 and a high speed data line interface 203 is provided to the television receiver 200. One end of the HDMI cable 300 is connected to the HDMI terminal 101 of the video camera 100, and the other end of the HDMI cable 300 is connected to the HDMI terminal 201 of the television receiver 200.

The HDMI receiving unit 202 of the television receiver 200 has an EDID ROM (Read Only Memory) 85. E-EDID (EnhancedExtended Display Identification Data), which is information relating to the functionality (Configuration/capability) of the television receiver 200, is stored in the EDID ROM 85.

With the AV system 50 shown in FIG. 1 herein, the video camera 100 can transmit a non-compressed (baseband) video signal or a compressed video signal to the television receiver 200. The non-compressed video signal is transmitted using a TMDS (Transition Minimized Differential Signaling) channel of HDMI. In this case, the non-compressed video signal is supplied from the HDMI transmitting unit 102 of the video camera 100 to the HDMI receiving unit 202 of the television receiver 200 via the HDMI cable 300. Also, the compressed videos signal is also transmitted using a TMDS channel of HDMI. In this case, the compressed video signal is supplied from the HDMI transmitting unit 102 of the video camera 100 to the HDMI receiving unit 202 of the television receiver 200 via the HDMI cable 300.

Figure 2:
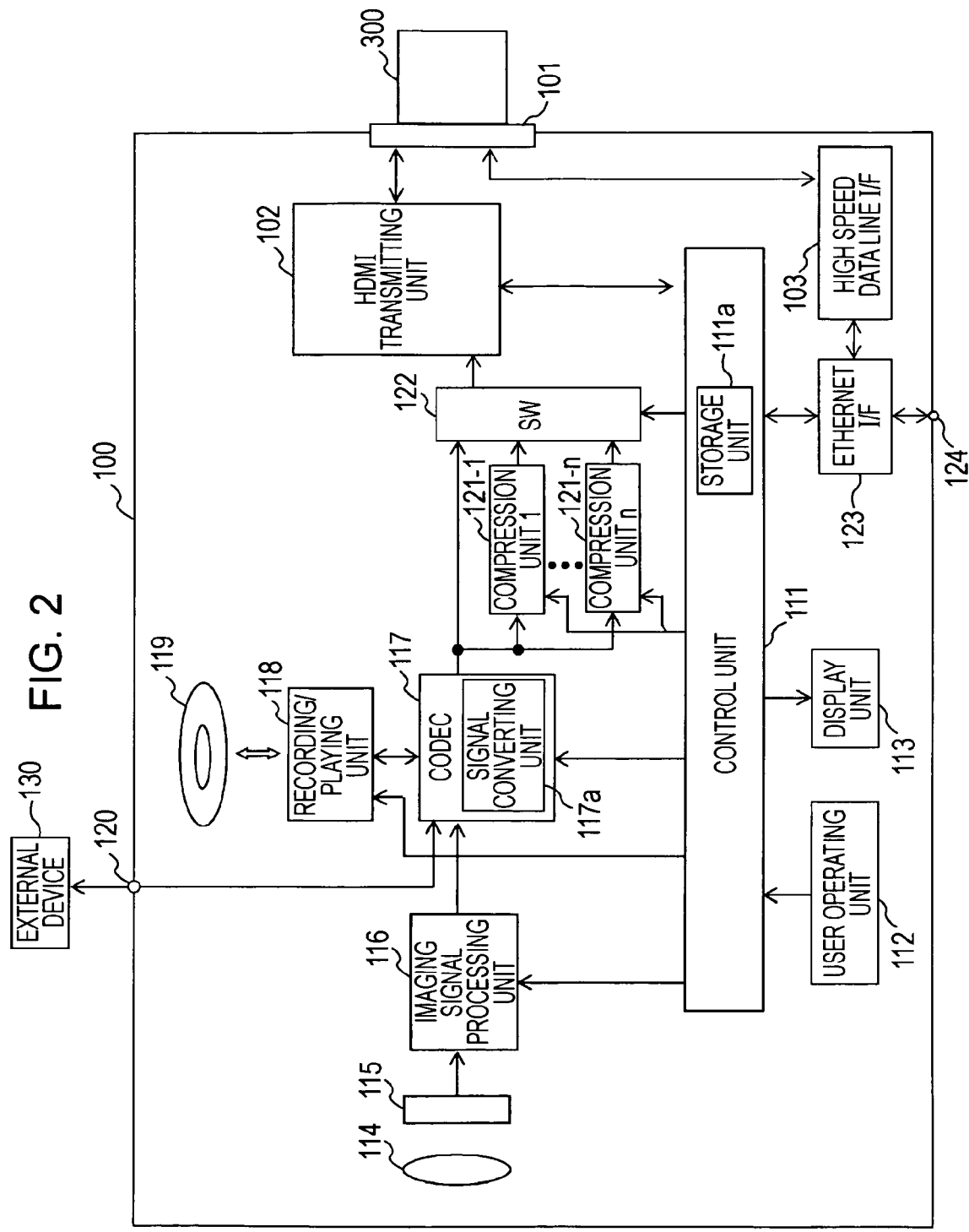
FIG. 2 is a block diagram illustrating a configuration example of a video camera as a video transmitting device.

FIG. 2 shows a configuration example of the video camera 100. The video camera 100 has an HDMI terminal 101, HDMI transmitting unit 102, high speed data line interface 103, control unit 111, and user operating unit 112. Also, the video camera 100 has a display unit 113, imaging lens 114, imaging device (image sensor) 115, imaging signal processing unit 116, codec 117, recording/playing unit 118, and external terminal 120. Also the video camera 100 has n number of data compression units 121-1 through 121-n, a switch unit 122, Ethernet interface (Ethernet I/F) 123, and network terminal 124. Note that "Ethernet" and "Ethernet" are registered trademarks.

The control unit 111 controls the operations of each unit of the video camera 100. The user operating unit 112 and display unit 113 make up the user interface, and are connected to the control unit 111. The user operating unit 112 is made up of keys, buttons, dials arrayed on an unshown casing of the video camera 100 or a touch panel arrayed on the display face of the display unit 113, or further with a remote controlled transmitting/receiving device or the like. The display unit 113 is made up of an LCD (Liquid Crystal Display) or the like.

The imaging device 115 is made up of a CCD (Charge Coupled Device) image sensor, CMOS (Complementary Metal Oxide Semiconductor) image sensor or the like. The imaging device 115 performs imaging processing in the state that an optical image of the subject is image-formed on an imaging face by the imaging lens 114, and outputs an imaging signal. The imaging signal processing unit 116 performs sample hold and gain control, conversion from an analog signal to digital signal, also white balance adjusting and gamma correction and so forth, as to the imaging signal (analog signal) output from the imaging device 115, and generates an image data (video signal).

The recording/playing unit 118 records encoded data that is obtained by encoding image data (video signal) supplied from the codec 117 and encoded by the MPEG (Moving Picture Experts Group) method or the like, to the HD (Hard Disk) 119. Also, the recording/playing unit 118 plays (reads out) the encoded data from the HD 119 and supplies to the codec 117.

The codec 117 decodes the encoded data supplied from the recording/playing unit 118, obtains a non-compressed (baseband) video signal, and supplies to the external device 130 by way of the external terminal 120 as necessary. Also, the codec 117 encodes the non-compressed video signal supplied from the imaging signal processing unit 116 or from the external terminal 130 into encoded data, and supplies the encoded data to the recording/playing unit 118. Here, the external device 130 is an HDD recorder, personal computer, DVD (Digital Versatile Disc) player, video camera, or the like.

Also, the codec 117 supplies the non-compressed video signal supplied from the imaging signal processing unit 116 or from the external device 130, or non-compressed video signal obtained by decoding, to the HDMI transmitting unit 102, data compression units 121-1 through 121-*n* and so forth in order to transmit to the television receiver 200. In this sense, the code 117 makes up a video signal output unit to output the non-compressed video signal to be transmitted.

Note that the codec 117 has a signal converting unit 117*a*, and as necessary converts and outputs the formats of the resolution, bit depth, frame rate and so forth of the non-compressed video signal supplied to the HDMI transmitting unit 102, data compression units 121-1 through 121-*n* and so forth into formats handled by the television receiver 200, i.e. formats that can be displayed with the television receiver 200.

The HDMI transmitting unit 102 reads out, via the HDMI cable 300, the E-EDID (Enhanced Extended Display Identification Data) which is the functionality information of the television receiver 200 from the EDIDROM 85 of the HDMI receiving unit 202 of the television receiver 200, via a DDC (Display Data Channel). Information of the video signal formats (resolution, bit depth, frame rate and so forth) handled by the television receiver 200 is included in this E-EDID herein. The HDMI transmitting unit 102 makes up a video format information obtaining unit.

Figure 3:
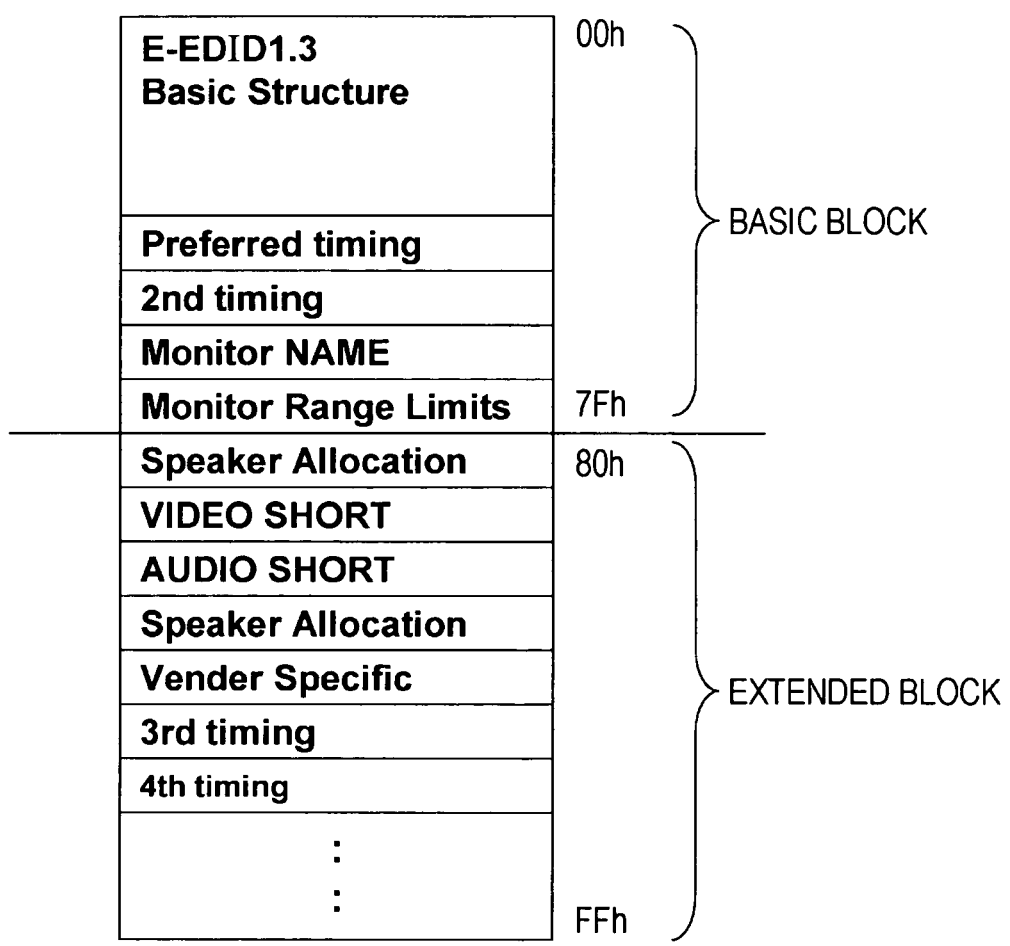
FIG. 3 is a diagram illustrating a configuration example of E-EDID data.

FIG. 3 shows a data configuration example of E-EDID. The E-EDID is made up of a basic block and an extended block. At the head of the basic block, data defined by the E-EDID 1.3 Standard shown in "E-EDID 1.3 Basic Structure" is disposed, and following is disposed timing information to maintain compatibility with the conventional EDID expressed by "Preferred timing" and timing information different from "Preferred timing" for maintaining compatibility with the conventional EDID expressed by "2nd timing".

Also, in the basic block, following the "2nd timing", information indicating the name of the display device expressed by "Monitor NAME", and information indicating the number of pixels that can be displayed in the case that the aspect ratios expressed by "Monitor Range Limits" are 4:3 and 16:9, are displayed in sequence.

At the head of the extended block, information relating to left and right speakers expressed by "Speaker Allocation" is disposed, following which, data describing information indicating image size (resolution) that can be displayed, frame rate, and whether interlaced or progressive, and information such as aspect ratio expressed by "VIDEO SHORT", data describing information such as audio codec method that can be played, sampling frequency, cutoff bandwidth, number of codec bits and so forth expressed by "AUDIO SHORT", and information relating to the left and right speakers expressed by "Speaker Allocation" is disposed in sequence.

Also, in the extended block, following "Speaker Allocation", data defined uniquely by manufactured expressed by "Vender Specific", timing information for maintaining compatibility with the conventional EDID expressed by "3rd timing", and timing information for maintaining compatibility with the conventional EDID expressed by "4th timing" is disposed.

FIG. 4 shows a video data example of a VIDEO SHORT region. From Byte #1 to Byte #L of the VIDEO SHORT region herein, formats that the receiving device (a television receiver 200 with the present embodiment) can display within the video signal formats defined by CEA-861-D are shown in combinations of resolution/frame rate/vertical-horizontal ratio.

FIG. 5 shows a data configuration example of the Vender Specific region. Block 0 through block N which are one-byte blocks are provided to the Vender Specific region herein.

In block 0 disposed at the head of the data expressed by "Vender Specific", a header showing the data region of the data "Vender Specific" expressed by "Vendor-Specific tag code (=3)" and information showing the length of the data "Vender Specific" expressed by "Length (=N)" are disposed.

Also, information showing the number "0x000C03" registered for HDMI(R) expressed by "24 bit IEEE Registration Identifier (0x000C03) LSB first" is disposed in block 1 through block 3. Further, information showing a physical address of a 24-bit sync equipment expressed by each of "A", "B", "C", and "D" is disposed in block 4 and block 5.

A flag indicating the function corresponding to the sync equipment expressed by "Supports-AI", a flag indicating each of information specifying the number of bits per one pixel expressed by each of "DC-48 bit", "DC-36 bit", and "DC-30 bit", and whether the sync equipment expressed by "DC-Y444" corresponds to the transfer of image of YCbCr4:4:4, and a flag indicating whether the sync equipment expressed by "DVI-Dual" corresponds to a dual DVI (Digital Visual Interface), are disposed in block 6.

Also, information indicating maximum frequency of a TMDS pixel clock expressed by "Max-TMDS-Clock" is disposed in block 7. Further, a flag indicating the existence or not of video and audio delay information expressed by "Latency" is disposed in block 8.

Also, delay time data of a progressive video expressed by "Video Latency" is disposed in block 9, and delay time data of audio associated with the progressive video expressed by "Audio Latency" is disposed in block 10. Further, delay time data of an interlaced video expressed by "Interlaced Video Latency" is disposed in block 11, and delay time data of audio associated with the interlaced video expressed by "Interlaced Audio Latency" is disposed in block 12.

Thus, bit depth information that the receiving device (television receiver 200 in this embodiment) can display is described in block 6 (Byte #6) of the Vendor-Specific region.

The data compression units 121-1 through 121-*n* each subject the non-compressed video signals output from the codec 117 to compression processing with a predetermined compression ratio, and output the compressed video signal. The data compression units 121-1 through 121-*n* make up a video signal compression unit. The data compression units 121-1 through 121-*n* each perform data compression processing with a mutually different compression method. For example, as compression methods, "RLE (Run Length Encoding)", "Wavelet", "SBM (SuperBit Mapping)", "LLVC (Low Latency Video Codec)", "ZIP" and so for may be considered. Note that the compression rate needed with the data compression units 121-1 through 121-*n* can be small, and a compression method that performs inter-line compression processing or inter-frame (field) compression processing is sufficient, and from the perspective of suppressing image quality deterioration, a lossless compression method is desired. For example, RLE and ZIP are lossless compression methods.

The switch unit 122 selectively takes out one of the non-compressed video signal output from the codec 117 and the compressed video signal output from the data compression units 121-1 through 121-n, and supplies to the HDMI transmitting unit 102. The switch unit 122 makes up a video signal selecting unit.

Now, the actions of the switch unit 122 and the data compression units 121-1 through 121-n are controlled as follows by the control unit 111. In this case, let us say that the bit rate of the non-compressed (baseband) video signal output from the codec 117 is BR1, and the transfer bit rate of the HDMI transfer path is BR2. The bit rate BR1 can be found with a computation expression of, for example, (resolution)×(frame rate)×(3 colors worth of bit depth). Also, the transfer bit rate (stipulated upper limit transfer bit rate) BR2 of the HDMI transfer path is 10.2 Gbps.

FIG. 6 shows video formats and the bit rates (transfer rates) of the non-compressed video signals corresponding thereto. As described above, the transfer bit rate BR2 of the HDMI transfer path is 10.2 Gbps, whereby in the case that the bit rate BR1 of the non-compressed video signal output from the codec 117 exceeds 10.2 Gbps (see formats appended with "*" mark in FIG. 6), the non-compressed video signal cannot be transmitted as is.

In the case that the bit rate BR1 is not exceeding the bit rate BR2, the switch unit 122 takes out the non-compressed video signal output from the codec 117, and supplies to the HDMI transmitting unit 102 as a video signal to be transmitted. On the other hand, in the case that the bit rate BR1 is exceeding the bit rate BR2, the switch unit 122 takes out the compressed video signal obtained by data compression processing as to the non-compressed video signal output from the codec 117 with one of the data compression units 121-1 through 121-n, and supplies to the HDMI transmitting unit 102 as a video signal to be transmitted.

Now, which data compression unit to select from within the data compression units 121-1 through 121-n is determined, by making reference to the information showing the compression methods that the television receiver 200 can handle which are supplied form the television receiver 200. That is to say, a data compression unit is selected which satisfies the conditions wherein the control unit 111 performs data compression processing with a compression method that the television receiver 200 can handle, while performing compression processing so that the bit rate of the compressed video signal generated with the data compression processing does not exceed the transfer bit rate BR2 of the HDMI transfer path. In this case, with a data compression unit that can change the compression ratio, there are cases wherein the above-described bit rate conditions can be satisfied by the change control of the compression ratio.

Note that in the case that two or more data compression units satisfying the above-described conditions exist, if there is one that performs data compression with a lossless compression method therein, the control unit 111 selects that data compression unit with priority. Thus, image quality deterioration due to data compression processing is suppressed by a data compression unit that performs data compression with a lossless compression method being selected with priority.

Also, as described above, in the case that the bit rate BR1 exceeds the bit rate BR2, having the compressed video signal obtained by data compression processing with one of the data compression units 121-1 through 121-n to be the video signal to be transmitted is basic, but in the case that there is none to perform data compression processing with the compression method that the television receiver 200 can handle within the data compression units 121-1 through 121-n, the control unit 111 performs control as follows.

That is to say, of the resolution, bit depth, and frame rate of the non-compressed video signal, one or multiple items are made small by the signal converting unit 117a which the codec 117 has, so that the bit rate BR1 of the non-compressed video signal does not exceed the transfer bit rate BR2 of the HDMI TRANSFER PATH. The control unit 111 takes out the non-compressed video signal output from the codec 117 with the switch unit 122, and supplies to the HDMI transmitting unit 102 as a video signal to be transmitted.

With the present embodiment, the information showing a compression method (decompression method) that the television receiver 200 can handle is supplied to the video camera 100 by regions "Compress Method" and "Compress Method Length" showing the handling of the compression method being newly defined to the Vender Specific region of the E-EDID (see FIG. 3), as shown in FIG. 7, for example.

Bits are assigned to the "Compress Method" according to types of compression methods respectively, and for example "1" is set to the bit applicable to the method that the television receiver 200 is handling. In the case that the number of types of compression methods exceeds eight, the number of bytes is defined in the "Compress Method Length" so that multiple bytes can be defined. By the video camera 100 reading out the compression method information herein, the video camera 100 can determine the compression method that should be selected. The video camera 100 stores the compression method information supplied from the television receiver 200 side as described above to the storage unit 111a built within the control unit 111, for example.

FIG. 8 shows a description example of the "Compress Method Length" and "Compress Method" in the case that the television receiver 200 is handling four compression methods. The bit 5 through bit 0 of byte 8 shows that only one byte of necessary data region is needed, since the number of defined compression methods is eight or less. This shows that "LLVC (Low Latency Video codec)" corresponds to bit 0 of byte 13, "SBM (Super bit Mapping)" to bit 1, "Wavelet" to bit 2, and "RLE (Run Length Encoding)" to bit 3.

Note that the television receiver 200 may transmit information of a compression method (decompression method) that the above-described television receiver 200 can handle to the video camera 100, by way of a CEC line or high speed data line, not the E-EDID Vender Specific region.

The control unit 111 receives the compression method information from the television receiver 200 by an E-EDID Vender Specific region, CEC line, or high speed data line or the like, thereby making up a compression information obtaining unit along with the HDMI transmitting unit 102, and high speed data line interface 103, and so forth.

Figure 9:
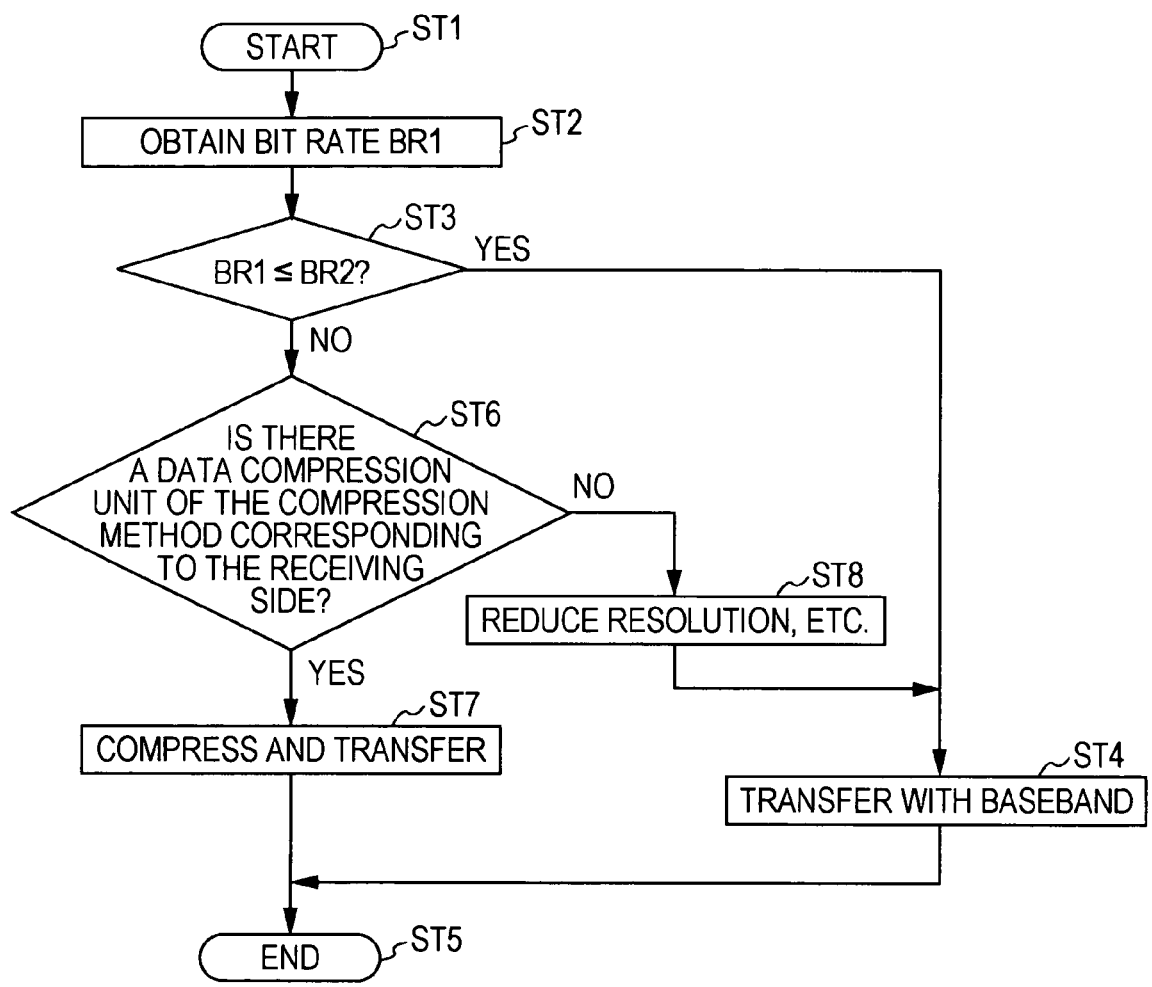
FIG. 9 is a flowchart to describe control operations of a data compression unit and switch unit by a control unit of the video camera.

The flowchart in FIG. 9 shows the above-described control actions of the control unit 111. First, the control unit 111 starts the control processing in step ST1, and after this in step ST2, obtains the bit rate BR1 of the non-compressed videos signal output from the codec 117 by the above-described computation equation.

Next, in step ST3, the control unit 111 determines whether or not the bit rate BR1 of the non-compressed video signal output from the codec 117 is greater than the transfer bit rate BR2 of the HDMI transfer path. When BR1≤BR 2, the control unit 111 determines in step ST4 to transfer the video signal by baseband. That is to say, the control unit 111 takes out the non-compressed video signal output from the codec 117 with the switch unit 122 and supplies to the HDMI transmitting unit 102. After the processing in step ST4, the control unit 111 ends the control processing in step ST5.

On the other hand, when BR1≤BR2 does not hold, the control unit 111 determines in step ST 6 whether or not there is any data compression unit of a compression method that the receiving side, i.e. the television receiver 200, can handle.

When there is a data compression unit handled by the receiving side, the control unit 111 determines in step ST7 to compress and transfer. That is to say, the control unit 111 subjects the non-compressed video signal output from the codec 117 to data compression processing with the data compression unit of the compression units 121-1 through 121-n handling the receiving side, takes out the compressed videos signal thereof with a switch unit 122, and supplies to the HDMI transmitting unit 102. After the processing in step ST7, in step ST5 the control unit 111 ends the control processing.

Also, when there is no data compression unit handled by the receiving side in step ST6, in step ST8 the control unit 111 reduces the resolution and so forth of the non-compressed video signal output from the codec 117, so that the bit rate BR1 thereof does not exceed the transfer bit rate BR2 of the HDMI transfer path. In step ST4, the control unit 111 determines to transfer the video signal by baseband. That is to say, the control unit 111 takes out the non-compressed video signal output from the codec 117 wherein the resolution and so forth has been reduced is taken out with the switch unit 122 and supplied to the HDMI transfer unit 102. After the processing in step ST4, in step ST5 the control unit 111 ends the control processing.

The control unit 111 supplies the control information of the switch unit 122 and data compression units 121-1 through 121-n, and further the format information (information of resolution and so forth) of the video signal output from the codec 117 described above to the television receiver 200. Information indicating whether the video signal transmitted to the television receiver 200 is a non-compressed video signal or a compressed video signal, and information of the compression method, compression ratio, and so forth when the video signal transmitted to the television receiver 200 is a compressed videos signal, is included in the control information of the switch unit 122 and data compression units 121-1 through 121-n (hereinafter referred to as "compression information).

In the present embodiment, the control unit 111 uses an AVI (AuxiliaryVideo Information) InfoFrame packet to transmit the control information of the above-described switch unit 122 and data compression units 121-1 through 121-n to the television receiver 200. The AVI InfoFrame packet herein transfers the data from source equipment to sync equipment, and indicates information relating to the video/audio source that is currently active. The AVI InfoFrame packet herein transfers once for every video frame, wherein in the case that the compression method, compression ratio, and so forth changes on the source equipment side, notification can be made to the sync equipment side by changing the data of the AVI InfoFrame packet.

FIG. 10 shows a data configuration example of the AVI InfoFrame packet. Note that in FIG. 10 is shown in a state omitting the header. Note that in the headers, the packet type information, version information, packet length information, and so forth are described. In the present embodiment, the compression information of the video camera 100 is described in byte 14 through byte M in the AVI InfoFrame packet, as shown in FIG. 10.

The byte 14 shows the data length of the compression method information and compression ratio information. Also, the bytes 15 through (M−1) show which compression method is used for data compression processing out of the handling compression methods transferred from the receiving device. For example, this shows that if the byte 15 is "0x01" then "LLVC (Low Latency Video Codec)", if "0x02" then "SBM (SuperBit Mapping)", if "0x04" then "Wavelet", if "0x08" then "RLE (RunLength Encoding)" is selected and data compression processing is performed. Also, byte 16 shows the compression ratio data.

FIG. 11 shows a data example of the compression method and compression ratio in the AVI InfoFrame packet. With this data example, the integer portion and the portion below the decimal point of the compression ratio are each expressed with 4 bits, whereby if the integer portion is "0x02" and below the decimal point is "0x00", the compression ratio becomes 2.0. Note that the expression of the compression ratio may be in a logarithmic format, not an integer format.

Note that the information of the format (resolution and so forth) of the non-compressed video signal output from the coded 117 described above is supplied to the television receiver 200 from the video camera 100 using a CEC line or high speed data line, for example. Relating to the compression information transmitted with the AVI InfoFrame packet described above also, transmission may be made with a CEC line or high speed data line.

As described above, the control unit 111 transmits the compression information to the television receiver 200 using the AVI InfoFrame packet, CEC line, high speed data line and so forth, thereby making up the compression information supplying unit along with the HDMI transmitting unit 102, high speed data line interface 103 and so forth.

The HDMI transmitting unit 102 transmits the video signal supplied from the switch unit 122 to the television receiver 200 in one direction via the HDMI cable 300, with communication compliant with HDMI. In this sense, the HDMI transmitting unit 102 makes up the video signal transmitting unit. The details of the HDMI transmitting unit 102 will be described later.

The high speed data line interface 103 is a bi-directional communication interface using a predetermined line making up the HDMI cable 300. The high speed data line interface 103 herein is inserted between the Ethernet interface 123 and HDMI terminal 101. The high speed data line interface 103 herein transmits the transmission data supplied from the control unit 101 via the Ethernet interface 123 to the television receiver 200 from the HDMI terminal 101 via the HDMI cable 300.

Also, the high speed data line interface 103 herein supplies the received data from the television receiver 200 that has been received from the HDMI cable 300 via the HDMI terminal 101 to the control unit 111 via the Ethernet interface 123. The details of the high speed data line interface 103 herein will be described later.

Note that the Ethernet interface 123 is connected to a network terminal 124. The video camera 100 is connectable to the network of the Ethernet, using the network terminal 124 herein.

Figure 12:
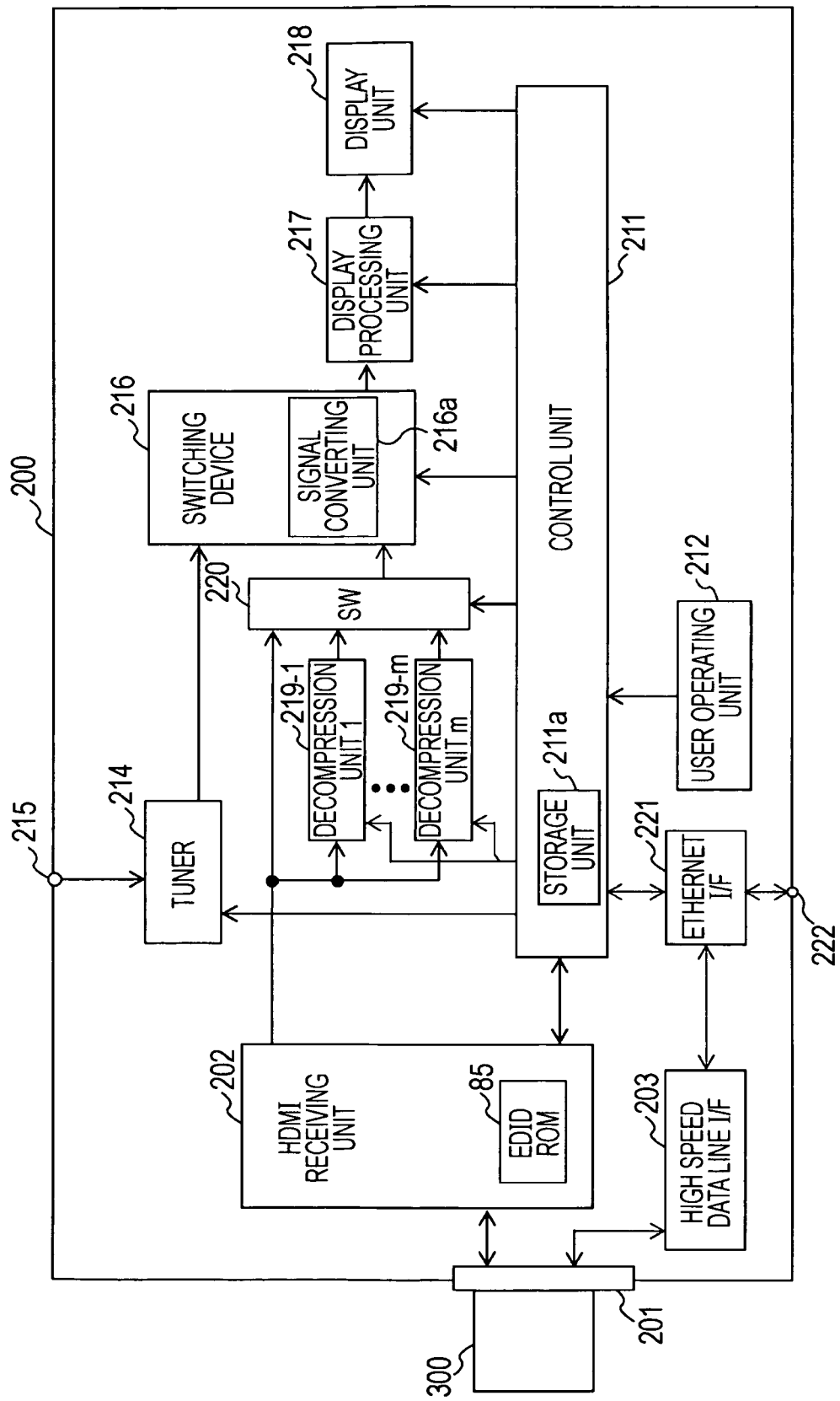
FIG. 12 is a block diagram illustrating a configuration example of a television receiver as a video signal receiving device.

FIG. 12 shows a configuration example of the television receiver 200. The television receiver 200 has an HDMI terminal 201, HDMI receiving unit 202, high speed data line interface 203, control unit 211, and user operating unit 212. Also, the television receiver 200 has a tuner 214, antenna terminal 215, switching device 216, display processing unit 217, and display unit 218. Also, the television receiver 200 has m number of data decompression units 219-1 through 219-m, a switch unit 220, Ethernet interface 221, and network terminal 222.

The control unit 211 controls the operations of each unit of the television receiver 200. The user operating unit 212 makes up the user interface, and is connected to the control unit 211. The user operating unit 212 is made up of keys, buttons, dials, disposed in an unshown casing of the television receiver 200 or by remote controls or the like.

The HDMI receiving unit 202 receives the video signal transmitted in one direction from the HDMI transmitting unit 102 of the video camera 100 connected via the HDMI cable 300, by the communication compliant with HDMI. The HDMI receiving unit 202 herein makes up the video signal receiving unit. The details of the HDMI receiving unit 202 herein will be described later. The HDMI receiving unit 202 supplies the received video signal to the switch unit 220 and data decompression units 219-1 through 219-$m$.

The high speed data line interface 203 is a bi-directional communication interface using a predetermined line making up the HDMI cable 300, similar to the high speed data line interface 103 of the video camera 100 described above. The high speed data line interface 203 is inserted between the Ethernet interface 221 and HDMI terminal 201.

The high speed data line interface 203 transmits the transmission data supplied from the control unit 211 via the Ethernet interface 221, to the video camera 100 from the HDMI terminal 201 via the HDMI cable 300. Also, the high speed data line interface 203 supplies the received data from the video camera 100 that has been received from the HDMI cable 300 via the HDMI terminal 201, to the control unit 211 via the Ethernet interface 221. The details of the high speed data line interface 203 will be described later.

Note that the network terminal 222 is connected to the Ethernet interface 221. The television receiver 200 uses the network terminal 222 to enable connection with the network of the Ethernet.

The tuner 214 receives satellite broadcasting, terrestrial digital broadcasting, and so forth. The broadcasting signal captured with an unshown antenna connected to the antenna terminal 215 is supplied to the tuner 214 herein.

When the video signal received at the HDMI receiving unit 202 is a compressed video signal, and the data decompression units 219-1 through 219-$m$ themselves correspond to the compression method thereof, subject the video signal to data decompression processing, and output a non-compressed video signal. The data decompression units 219-1 through 219-$m$ make up a video signal decompressing unit. The switch unit 220 selectively takes out the video signal received at the HDMI receiving unit 202 or the non-compressed video signal obtained with the data decompression units 219-1 through 219-$m$, and supplies to the switching device 216. The switch unit 220 makes up the video signal selecting unit.

Here, the operations of the data decompression units 219-1 through 219-$m$ and switch unit 220 are controlled by the control unit 211 as follows. That is to say, the control unit 211 performs control based on the compression information and video signal format information supplied from the video camera 100 using an AVI InfoFrame packet, CEC line, or high-speed data line, as described above. The control unit 211 holds the above-described compression information and video signal format information in a storage unit 211$a$.

The compression information includes information showing whether the video signal received with the HDMI receiving unit 202 is a non-compressed video signal or the compressed videos signal, and information that when the videos signal thereof is a compressed video signal, the compression method and compression ratio and so forth are included. The control unit 111 makes up the compression information obtaining unit along with the HDMI receiving unit 202 and high speed data line interface 203.

The control unit 211 controls the operations of the data decompression units 219-1 through 219-$m$ and switch unit 220, based on the above-described compression information and the like. That is to say, when the video signal received at the HDMI receiving unit 202 is a non-compressed video signal, the control unit 211 takes out the non-compressed video signal with the switch unit 220, and supplies to the switch device 216 as a reception video signal.

On the other hand, when the video signal received at the HDMI receiving unit 202 is a compressed video signal, the control unit 211 subjects the video signal received at the HDMI receiving unit 202 to data decompression processing with the data decompressing unit corresponding to the compression method thereof, and takes out the non-compressed video signal obtained as a result thereof with the switch unit 220, and supplies to the switching device 216 as a reception video signal.

Note that the switching device 216 has a signal converting unit 216$a$. Even if the video signal received at the HDMI receiving unit 202 is a non-compressed video signal as described above, when the resolution and so forth of the non-compressed video signal is made smaller with the signal converting unit 117$a$ of the codec 117 of the video camera 100 from the relation with the transmitting bit rate of the HDMI transfer path, the signal converting unit 216$a$ returns the resolution and so forth to a state that can be handled by the television receiver 200, i.e. that can be displayed by the television receiver 200 based on the information of the resolution and so forth of the non-compressed videos signal transmitted from the video camera 100 as described above.

The switching device 216 selectively takes out the video signal received with the tuner 214 or the video signal taken out with the switch unit 220, and supplies to the display processing unit 217. The display processing unit 217 performs edge enhancement and so forth for displaying as to the image data taken out with the switching device 216. The display unit 218 displays the image with the video signal processed with the display processing unit 217. The display unit 218 is made up of an LCD (Liquid Crystal Display), organic EL (ElectroLuminescence), PDP (Plasma Display Panel), CRT (Cathode Ray Tube) and so forth, for example.

Note that as described in the description of the video camera 100, information showing a compression method (decompression method) that the television receiver 200 can handle is transmitted from the television receiver 200 to the video camera 100 with an E-EDID Vender Specific region, CEC line, high speed data line, and so forth. In this sense, the control unit 211 makes up the compression method information supplying unit along with the HDMI receiving unit 202 and high speed data line interface 203.

Also, as described in the description of the video camera 100, format information of the video signal that is handled by the television receiver 200, i.e. can be displayed with the television receiver 200, in the E-EDID Video Short region and Vender Specific region, is transmitted to the video camera 100. In this sense the HDMI receiving unit 202 makes up the video format information supplying unit.

An operating example of the AV system 50 in FIG. 1 (FIG. 2, FIG. 12) configured as above will be described. Note that for the audio system, the description will be omitted.

For example, upon the user operating the video camera 100 so as to image-capture a subject, the imaging device 115 starts the image-capturing operation, and a video signal (image data) corresponding to the subject is obtained from the imaging signal processing unit 116. The video signal output from the imaging signal processing unit 116 is encoded with the codec 117, and the encoded data is recorded in the HD 119 with the recording/playing unit 118. Also, for example upon the user operating the video camera 100 so as to record data from the external device 130, the video signal from the external device 130 is encoded with the codec 117, and the encoded data is recorded in the HD 119 with the recording/playing unit 118.

Upon the user operating the video camera 100 so as to transmit the data recorded in the HD 119, the encoded data is played from the HD 119 by the recording/playing unit 118, and supplied to the codec 117. With the codec 117, the encoded data played with the recording/playing unit 118 is decoded to a non-compressed (baseband) video signal to be transmitted. The resolution, bit depth, frame rate and so forth of the non-compressed video signal herein is converted with the signal converting unit 117*a* into a format handled by the television receiver 200, i.e. a format that can be displayed with the television receiver 200, for example.

The video signal output from the codec 117 is supplied to the HDMI transmitting unit 102 through the switch unit 122 without change, or the video signal output from the codec 117 is supplied to the HDMI transmitting unit 102 through the switch unit 122 after being subjected to data compression processing with one of the data compression units 121-1 through 121-*n*.

In this case, when the bit rate of the non-compressed video signal output from the codec 117 is BR1 and the transfer bit rate of the HDMI transfer path is BR2, and BR1≦BR2 holds, the non-compressed video signal output from the codec 117 is supplied to the HDMI transmitting unit 102 as a video signal to be transmitted.

On the other hand, when BR1≦BR2 does not hold, the non-compressed video signal output from the codec 117 is subjected to data compression processing with one of the data compression units 121-1 through 121-*n*, and the output compressed video signal is supplied to the HDMI transmitting unit 102 as a video signal to be transmitted.

Note that even when BR1≦BR2 does not hold, if there is no compression method that can be handled by the television receiver 200 by which the data compression units 121-1 through 121-*n* can perform data compression processing, the resolution and so forth of the non-compression video signal output from the codec 117 is reduced so as to satisfy BR1≦BR2, and the non-compressed video signal thereof is supplied to the HDMI transmitting unit 102 as the video signal to be transmitted.

Thus, the video camera 100 can transmit the video signal to the television receiver 200 well, with a desired bit rate of the transfer bit rates of the HDMI transfer path.

Also, upon the user operating the video camera 100 so as to transmit the imaging data, the video signal (image data) output from the imaging signal processing unit 116 as described above is supplied to the HDMI transmitting unit 102 through the switch unit 122 without change, similar to the video signal played from the HD 119 as described above, or the video signal output from the codec 117 is supplied to the HDMI transmitting unit 102 through the switch unit 122 after being subjected to data compression processing with one of the data compression units 121-1 through 121-*n*.

Thus the video signal (non-compressed video signal or compressed video signal) supplied to the HDMI transmitting unit 102 is transmitted in one direction to the television receiver 200 via the HDMI cable 300 with communication compliant with HDMI. Note that the compression information and format information of the transmission video signal is transmitted from the control unit 111 to the television receiver 200 using the AVI InfoFrame packet, CEC line, high speed data line and so forth inserted during a blanking period of the video signal.

With the television receiver 200, a video signal transmitted from the HDMI transmitting unit 102 of the video camera 100 in one direction via the HDMI cable 300 is received by the HDMI 202 receiving unit, by communication compliant with HDMI. The video signal received with the HDMI receiving unit 202 is supplied to the switch unit 220 and data decompression unit 219-1 through 219-*m*.

The operations of the switch unit 220 and data decompression unit 219-1 through 219-*m* are controlled from the video camera 100, based on the compression information supplied as described above. That is to say, when the video signal received with the HDMI receiving unit 202 is a non-compressed video signal, the non-compressed video signal is supplied to the switching device 216 through the switch unit 220. On the other hand, when the video signal received with the HDMI receiving unit 202 is a compressed video signal, the video signal received with the HDMI receiving unit 202 is subjected to data decompression processing with the data decompression unit corresponding to the compression method thereof, and the non-compressed video signal obtained as a result thereof is supplied to the switching device 216 via the switch unit 220.

Note that when the non-compressed video signal supplied to the switching device 216 has the resolution and so forth reduced on the video camera 100 side from the relation with the transfer bit rates of the HDMI transfer path, the resolution and so forth is returned to a state that can be handled by the television receiver 200, i.e. that can be displayed with the television receiver 200, based on the format information supplied from the video camera 100 as described above.

Thus, regardless of whether the video signal received at the HDMI receiving unit 202 is a non-compressed video signal or a compressed video signal, a good received video signal is supplied to the switching device 216. Note that as described above, with the video camera 100 data compression processing is performed with a compression method that the television receiver 200 can handle based on the compression method information from the television receiver 200, whereby the compression video signal received with the HDMI receiving unit 202 can always be decompressed by one of the data decompression units 219-1 through 219-*m*.

Also, the video signal received with the tuner 214 is supplied to the switching unit 216. When the user performs an operation to select the HDMI receiving unit 202 with the user operating unit 212, the video signal received at the HDMI receiving unit 202 is taken out with the switching device 216. On the other hand, when the user performs an operation to select the tuner 214 with the user operating unit 212, the image data received at the tuner 214 is taken out with the switching device 216.

The video signal taken out with the switching device 216 is supplied to the display processing unit 217. With the display processing unit 217, based on control by the control unit 211, edge enhancement processing, noise reduction processing and so forth is performed as to the video signal, and the video signal after processing is supplied to the display unit 218. With the display unit 218, the image is displayed based on the image data supplied from the display processing unit 217.

Figure 13:
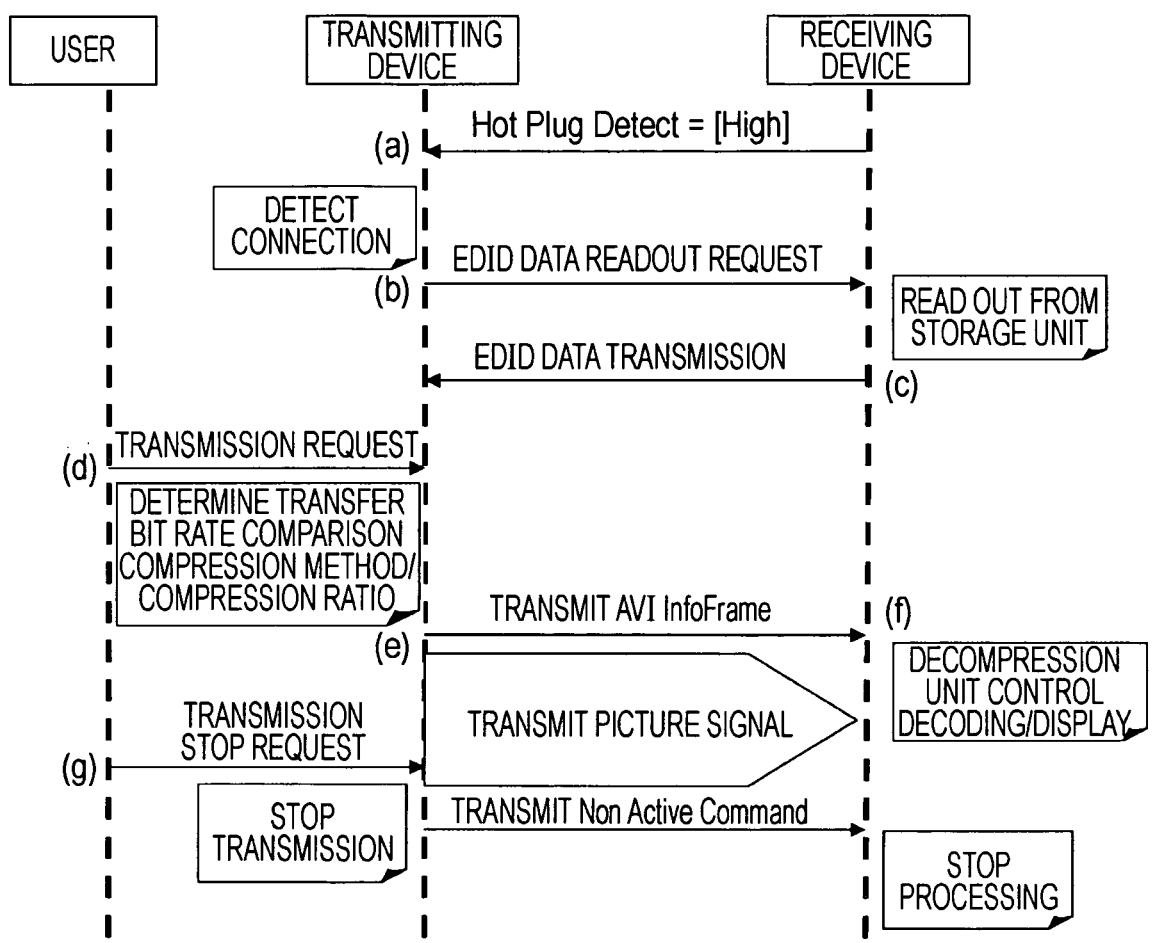
FIG. 13 is a diagram illustrating a control sequence example in the case of transmitting a video signal from the transmitting device (video camera) to the receiving device (television receiver) via an HDMI cable.

FIG. 13 shows a control sequence in the case of transmitting a video signal from the transmission device (video camera 100) to the receiving device (television receiver 200) via the HDMI cable 300.

(a) Upon receiving the HPD (Hot Plug Detect) signal transferred from the receiving device, the transmitting device can know that a connection has been established. (b) The transmitting device requests a readout of the E-EDID data including compression method (decompression method) information as to the receiving device. (c) Upon receiving the request, the receiving device reads out the E-EDID data from the storage unit of the receiving device, and transfers to the transmitting device. The transmitting device recognizes the compression method that the receiving device can handle from the transferred E-EDID data, and determines the compression method that the transmitting device can use. (d) When a transmission request is placed from the user and the selected video signal is to be transmitted, the transmission device compares the transfer bit rate of the HDMI transfer path and the bit rate of the transmission video signal, and if the bit rate of the transmission video signal is less than the transfer bit rate of the HDMI transfer path, this is transferred while remaining non-compressed.

On the other hand, in the case that the bit rate of the transmission video signal exceeds the transfer bit rate of the HDMI transfer path, the transmitting device selects an appropriate compression method from within the above-described determined compression methods, further determines a compression ratio as needed, and (e) sets the information thereof to a predetermined region of the AVI InfoFrame packet and sends to the receiving device, and transmits the compressed video signal.

(f) The receiving device extracts compression method and compression ratio information from the received AVI InfoFrame packet, and if non-compressed, hands the signal to the display unit without change. On the other hand, is a compressed transfer, the compression method and compression ratio information is used to perform decompression processing (decoding) as to the compression video signal. (g) When a transmission stop is instructed by the user operation, the transmitting device stops the transmission of the video signal.

Figure 14:
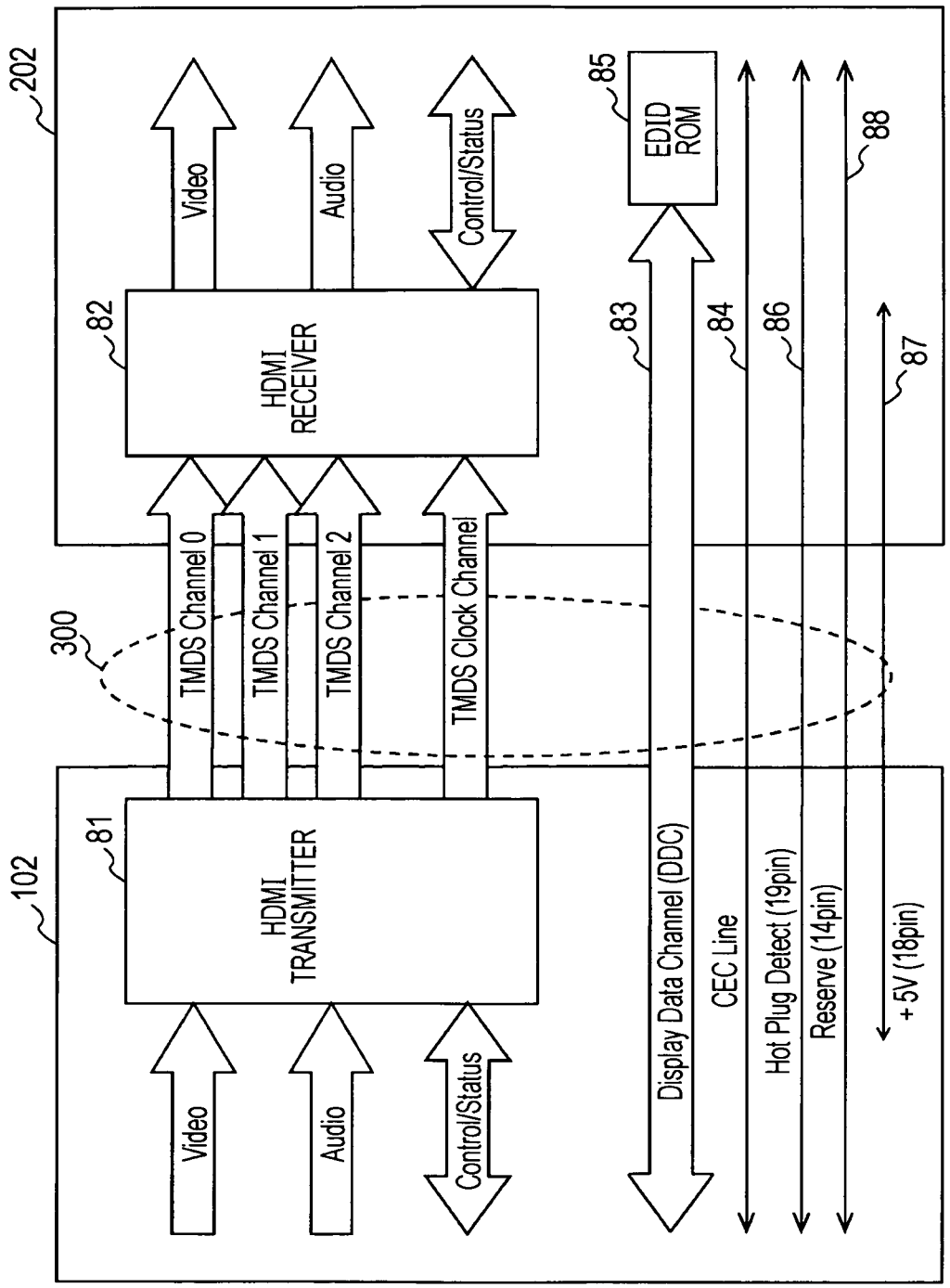
FIG. 14 is a block diagram illustrating a configuration example of the HDMI transmitting unit of the source equipment and the HDMI receiving unit of the synching equipment.

Next, the HDMI transmitting unit 102 of the video camera 100 and the HDMI receiving unit 202 of the television receiver 200 will be described. FIG. 14 shows a configuration example of the HDMI transmitting unit (HDMI source) 102 and the HDMI receiving unit (HDMI sync) 202.

In an active image section (hereafter called active video section, as appropriate) which is a section wherein the horizontal blanking section and vertical blanking section are removed from the section from one vertical synchronous signal to the next vertical synchronous signal, the HDMI transmitting unit 102 transmits a differential signal corresponding to pixel data of one screen worth of a non-compressed image in one direction to the HDMI receiving unit 202 by multiple channels, while at least transmitting a differential signal corresponding to audio data, control data, and other auxiliary data and so forth associated to the image, in the horizontal blanking section and vertical blanking section, to the HDMI receiving unit 202 with multiple channels.

That is to say, the HDMI transmitting unit 102 has a transmitter 81. The transmitter 81 converts the pixel data of the non-compressed image to a corresponding differential signal, serial-transfers in one direction to the HDMI receiving unit 202 connected via the HDMI cable 300 with three TMDS channels #0, #1, #2 which are multiple channels.

Also, the transmitter 81 converts the audio data associated with the non-compressed image, and further the necessary control data and other auxiliary data and the like into corresponding differential signals, and serial-transfers in one direction to the HDMI receiving unit 202 connected via the HDMI cable 300 through the three TMDS channels #0, #1, #2.

Further, the transmitter 81 transmits a pixel clock synchronized to the pixel data transmitted with the three TMDS channels #0, #1, #2 to the HDMI receiving unit 202 connected via the HDMI cable with a TMDS clock channel. Now, through one of the TMDS channels #i (i=0, 1, 2), 10 bits of pixel data is transmitted during one clock of the pixel clock.

The HDMI receiving unit 202 receives the differential signal corresponding to the pixel data transmitted in one direction from the HDMI transmitting unit 102 through multiple channels in the active video section, while receiving the differential signals corresponding to the audio data and control data transmitted in one direction from the HDMI transmitting unit 102 through multiple channels in the horizontal blanking section or vertical blanking section.

That is to say, the HDMI receiving unit 202 has a receiver 82. The receiver 82 synchronizes the differential signal corresponding to the pixel data and the differential signals corresponding to the audio data and control data that are transmitted in one direction from the HDMI transmitting unit 102 connected via the HDMI cable 300 through the TMDS channels #0, #1, #2, to a pixel clock transmitted similarly from the HDMI transmitting unit 102 through a TMDS clock channel, and receives.

Among the transfer channels of the HDMI system made up of the HDMI transmitting unit 102 and HDMI receiving unit 202, there are transfer channels called a DDC (Display Data channel) 83 and CEC line 84, besides the TMDS clock channel serving as the transfer channel to transfer the three TMDS channels #0 through #2 serving as the transfer channels for synchronizing the pixel data and audio data to the pixel clock and serially transferring in one direction from the HDMI transmitting unit 102 to the HDMI receiving unit 202.

The DDC 83 is made up of two unshown signal lines included in the HDMI cable 300, and is used for the HDMI transmitting unit 102 to read out the E-EDID (Enhanced Extended Display Identification Data) from the HDMI receiving unit 202 connected via the HDMI cable 300.

That is to say, the HDMI receiving unit 202 has, besides the HDMI receiver 82, an EDID ROM (Read Only Memory) 85 that stores E-EDID which is capability information relating to self capability (Configuration/capability). The HDMI transmitting unit 102 reads out the E-EDID of the HDMI receiving unit 202 via the DDC 83 from the HDMI receiving unit 202 connected via the HDMI cable 300, and based on the E-EDID thereof, recognizes the image format (profile) corresponding to the electronic equipment having the HDMI receiving unit 202 for example, such as RGB, YCbCr 4:4:4, YCbCr 4:2:2, for example.

The CEC line 84 is made up of one unshown signal line included in the HDMI cable 300, and is used to perform bi-directional communication of data for control between the HDMI transmitting unit 102 and HDMI receiving unit 202.

Also, a line 86 connected to a pin called an HPD (Hot Plug Detect) is included in the HDMI cable 300. The source equipment uses the line 86 to detect the sync equipment connection. Also, a line 87 used to supply power to the sync equipment from the source equipment is included in the HDMI cable 300. Further, a reserve line 88 is included in the HDMI cable 300.

Figure 15:
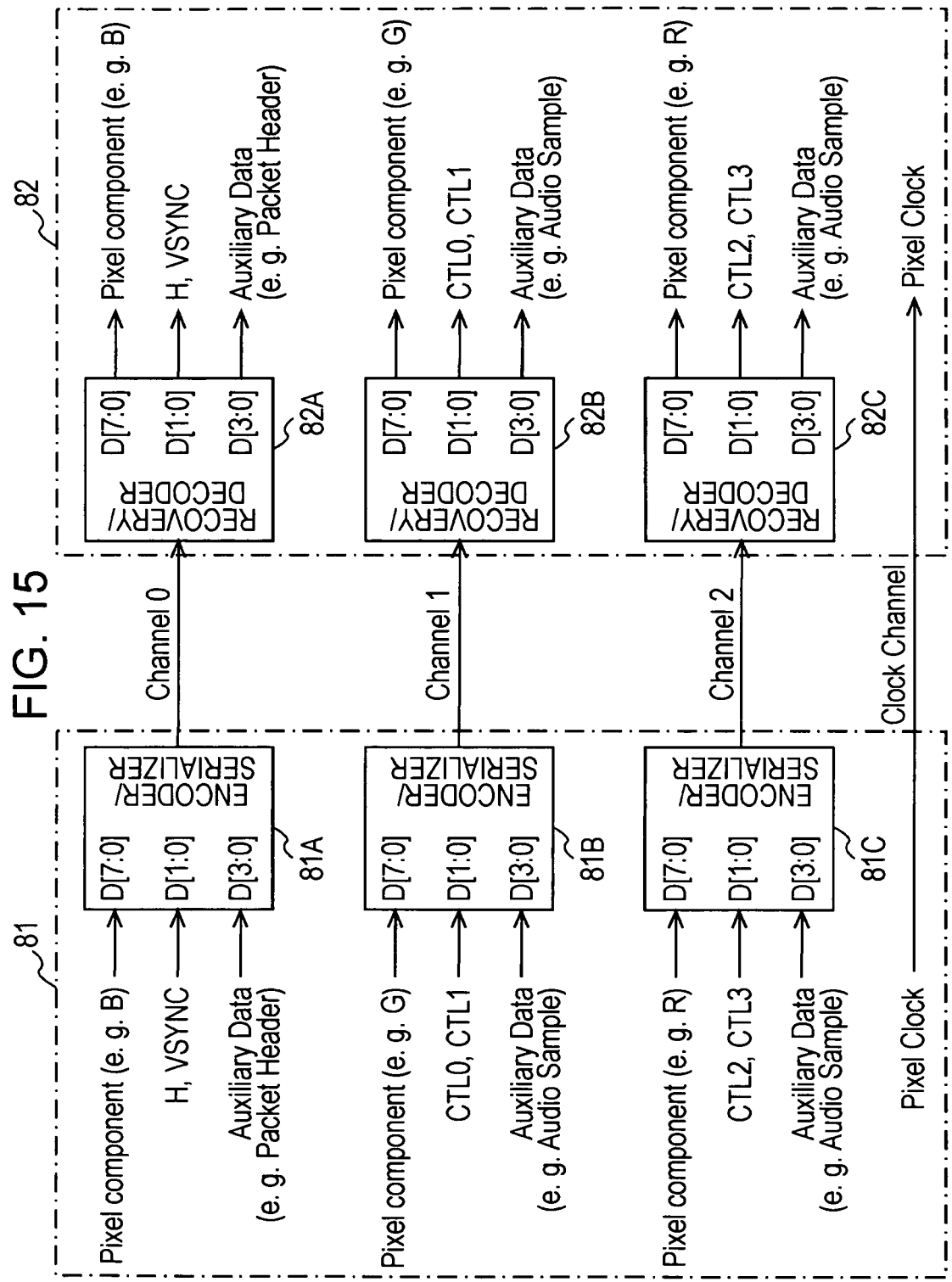
FIG. 15 is a block diagram illustrating a configuration example of an HDMI transmitter and HDMI receiver.

FIG. 15 shows a configuration example of the HDMI transmitter 81 and HDMI receiver 82 in FIG. 14.

The transmitter 81 has three encoders/serializers 81A, 81B, 81C that each correspond to the three TMDS channels #0, #1, #2. Each of the encoders/serializers 81A, 81B, 81C encode the image data, auxiliary data, and control data supplied thereto, converts from parallel data to serial data, and transmits with the differential signal. Here, in the case that the image data has the three components of R (red), G (green), and B (blue) for example, the B component (B component) is supplied to the encoder/serializer 81A, the G component (G component) is supplied to the encoder/serializer 81B, and the R component (R component) is supplied to the encoder/serializer 81C.

Also, as auxiliary data, for example, there are audio data and control packets, the control packets are supplied for example to the encoder/serializer 81A, and the audio data is supplied to the encoders/serializers 81B and 81C.

Further, as control data, there is one-bit vertical synchronous signal (VSYNC), one-bit horizontal synchronous signal (HSYNC), and one bit each of control bits CTL0, CTL1, CTL2, CTL3. The vertical synchronous signal and horizontal synchronous signal are supplied to the encoder/serializer 81A. The control bits CTL0, CTL1 are supplied to the encoder/serializer 81B, and the control bits CTL2, CTL3 are supplied to the encoder/serializer 81C.

The encoder/serializer 81A transmits the B component of the image data supplied thereto, the vertical synchronous signal and horizontal synchronous signal, and the auxiliary data, by time division. That is to say, the encoder/serializer 81A has the B component of the image data supplied thereto as parallel data in 8-bit increments which is a fixed number of bits. Further, the encoder/serializer 81A encodes the parallel data thereof, converts this to the serial data, and transmits through the TMDS channel #0.

Also, the encoder/serializer 81A encodes two bits of parallel data of the vertical synchronous signal and horizontal synchronous signal supplied thereto, converts to serial data, and transmits through the TMDS channel #0. Further, the encoder/serializer 81A has the auxiliary data supplied thereto as 4-bit increment parallel data. Also, the encoder/serializer 81A encodes the parallel data thereof and converts to serial data, and transmits through the TMDS channel #0.

The encoder/serializer 81B transmits the G component of the image data supplied thereto, the control bits CTL0, CTL1, and the auxiliary data, by time division. That is to say, the encoder/serializer 81B has the G component of the image data supplied thereto as parallel data in 8-bit increments which is a fixed number of bits. Further, the encoder/serializer 81B encodes the parallel data thereof, converts this to the serial data, and transmits through the TMDS channel #1.

Also, the encoder/serializer 81B encodes two bits of parallel data of the control bits CTL0, CTL1 supplied thereto, converts to serial data, and transmits through the TMDS channel #1. Further, the encoder/serializer 81B has the auxiliary data supplied thereto as 4-bit parallel data. Also, the encoder/serializer 81B encodes the parallel data thereof and converts to serial data, and transmits through the TMDS channel #1.

The encoder/serializer 81C transmits the R component of the image data supplied thereto, the control bits CTL2, CTL3, and the auxiliary data, by time division. That is to say, the encoder/serializer 81C has the R component of the image data supplied thereto as parallel data in 8-bit increments which is a fixed number of bits. Further, the encoder/serializer 81C encodes the parallel data thereof, converts this to the serial data, and transmits through the TMDS channel #2.

Also, the encoder/serializer 81C encodes two bits of parallel data of the control bits CTL2, CTL3 supplied thereto, converts to serial data, and transmits through the TMDS channel #2. Further, the encoder/serializer 81C has the auxiliary data supplied thereto as 4-bit increment parallel data. Also, the encoder/serializer 81C encodes the parallel data thereof and converts to serial data, and transmits through the TMDS channel #2.

The receiver 82 has three recovery/decoders 82A, 82B, 82C corresponding to each of the three TMDS channels #0, #1, #2. Each of the recovery/decoders 82A, 82B, 82C receive image data, auxiliary data, and control data transmitted by the differential signals through the TMDS channels #0, #1, #2. Further, each of the recovery/decoders 82A, 82B, 82C convert the image data, auxiliary data, and control data from serial data to parallel data, and further decodes and outputs.

That is to say, the recovery/decoder 82A receives the B component, vertical synchronous signal and horizontal synchronous signal, and auxiliary data of the image data transmitted by the differential signal through the TMDS channel #0. Also, the recovery/decoder 82A converts the B component, vertical synchronous signal and horizontal synchronous signal, and auxiliary data of the image data from serial data to parallel data, and decodes and outputs.

The recovery/decoder 82B receives the G component, control bits CTL0, CTL1, and auxiliary data of the image data transmitted by the differential signal through the TMDS channel #1. Also, the recovery/decoder 82B converts the G component, control bits CTL0, CTL1, and auxiliary data of the image data from serial data to parallel data, and decodes and outputs.

The recovery/decoder 82C receives the R component, control bits CTL2, CTL3, and auxiliary data of the image data transmitted by the differential signal through the TMDS channel #2. Also, the recovery/decoder 82C converts the R component, control bits CTL2, CTL3, and auxiliary data of the image data from serial data to parallel data, and decodes and outputs.

Figure 16:
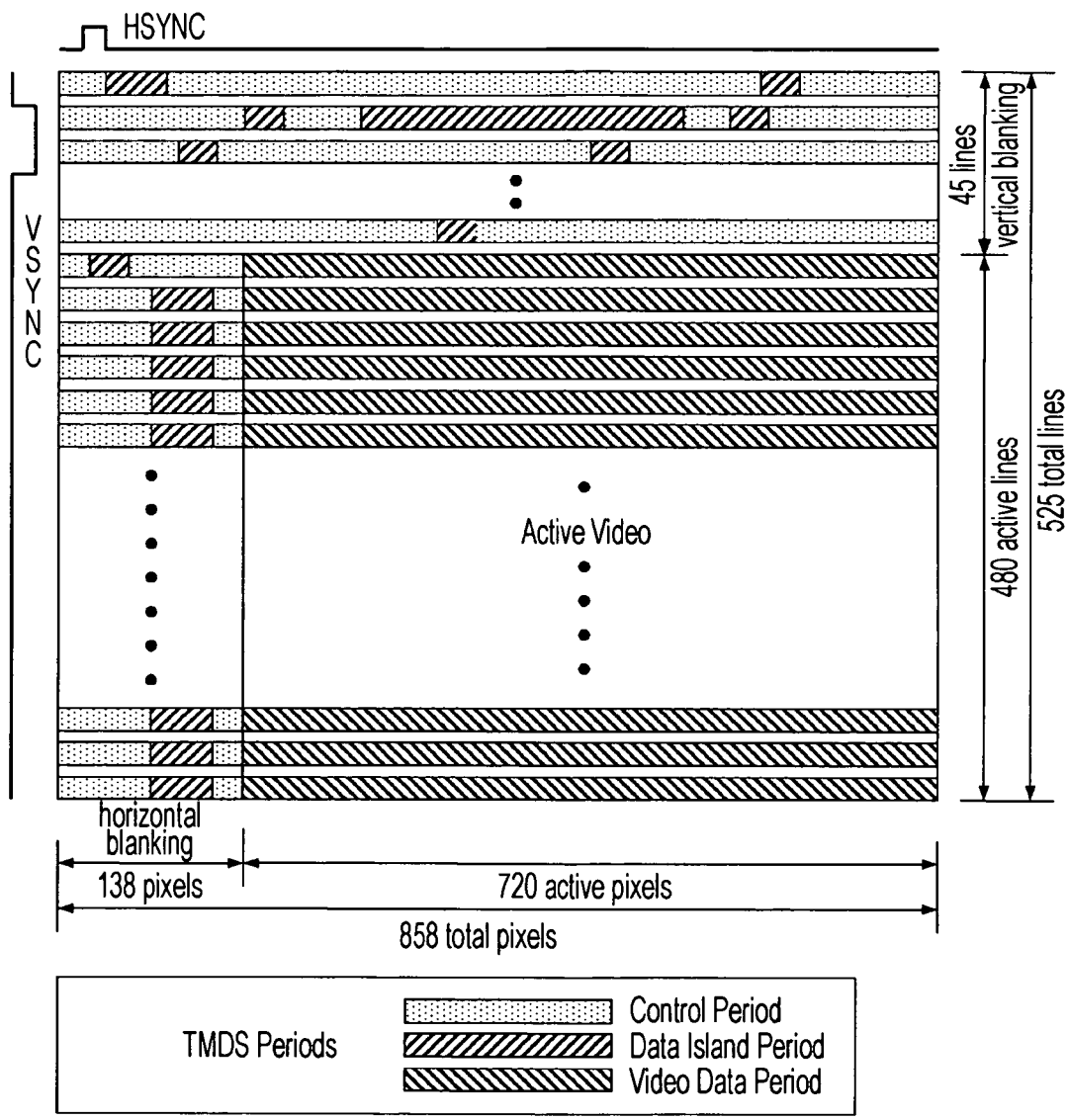
FIG. 16 is a diagram illustrating a configuration of TMDS transfer data.

FIG. 16 shows an example of the transfer section (period) that various types of transfer data is transferred through the three TMDS channels #0, #1, #2 of HDMI. Note that FIG. 16 shows various types of transfer data sections in the case that a progressive image of horizontal×vertical being 720×480 pixels is transferred.

There are three types of periods, a video data section (Video Data period), data island section (Data Island period), and control section (Control period) that exist in the video field (Video Field) wherein the transfer data is transferred through the three TMDS channels #0, #1, #2 of HDMI, according to the type of transfer data.

The video field section is a section from the startup edge (active edge) of a certain vertical synchronous signal to the next vertical synchronous signal, and can be divided into a horizontal blanking period (horizontal blanking), vertical blanking period (vertialblanking), and an active video section (Active Video) which is the section having removed the horizontal blanking period and vertical blanking period from the video field section.

The video data section is assigned to the active video section. With this video data section, data of active pixels (Active pixel) worth 720 pixels×480 lines worth that make up one screen worth of non-compressed image data, or the data subjected to compression processing and obtained is transferred.

The data island section and control section are assigned to the horizontal blanking period and vertical blanking period. With the data island section and control section, auxiliary data (Auxiliary data) is transferred.

That is to say, the data island section is assigned to a portion of the horizontal blanking period and vertical blanking period. With the data island section, of the auxiliary data, data which is not related to control, e.g. audio data packets and so forth are transferred.

The control section is assigned to another portion of the horizontal blanking period and vertical blanking period. With the control section, of the auxiliary data, data related to control, e.g. vertical synchronous signals and horizontal synchronous signals, control packets, and so forth are transferred.

Here, with the current HDMI, the frequency of the pixel clock transferred with the TMDS clock channel is 165 MHz for example, and in this case, the transfer rate of the data island section is approximately 500 Mbps or the like.

FIG. 17 shows a pin array of the HDMI terminals 101 and 201. The pin array herein is an example of type A (type-A).

The two lines that are differential lines wherein the TMDS Data #i+ and TMDS Data #i− are transferred which are the differential signals of the TMDS channel #i, are connected to a pin (pin having a pin number of 1, 4, 7) that the TMDS Data #i+ is assigned to and a pin (pin having a pin number of 3, 6, 9) that the TMDS Data #i− is assigned to.

Also, the CEC line 84 by which the CEC signal which is the data for control is transferred is connected to a pin having a pin number of 13, and the pin having a pin number of 14 is an open (Reserved) pin. Also, the line by which the SDA (SerialData) signal such as E-EDID or the like is transferred is connected to a pin having a pin number of 16, and the line by which the SCL (Serial Clock) signal which is the clock signal used for synchronization at the time of SDA signal exchanging is connected to a pin having a pin number of 15. The above-described DDC 83 is made up of a line by which the SDA signal is transferred and a line by which the SCL signal is transferred.

Also, as described above the line 86 for the source equipment to detect a connection with the sync equipment is connected to a pin having a pin number of 19. Also, as described above the line 87 for supplying power is connected to a pin having a pin number of 18.

Next, the high speed data line interface 103 of the video camera 100 and the high speed data line interface 203 of the television receiver 200 will be described. Not that here the video camera 100 is described as the source equipment and the television receiver 200 as the sync equipment.

Figure 18:
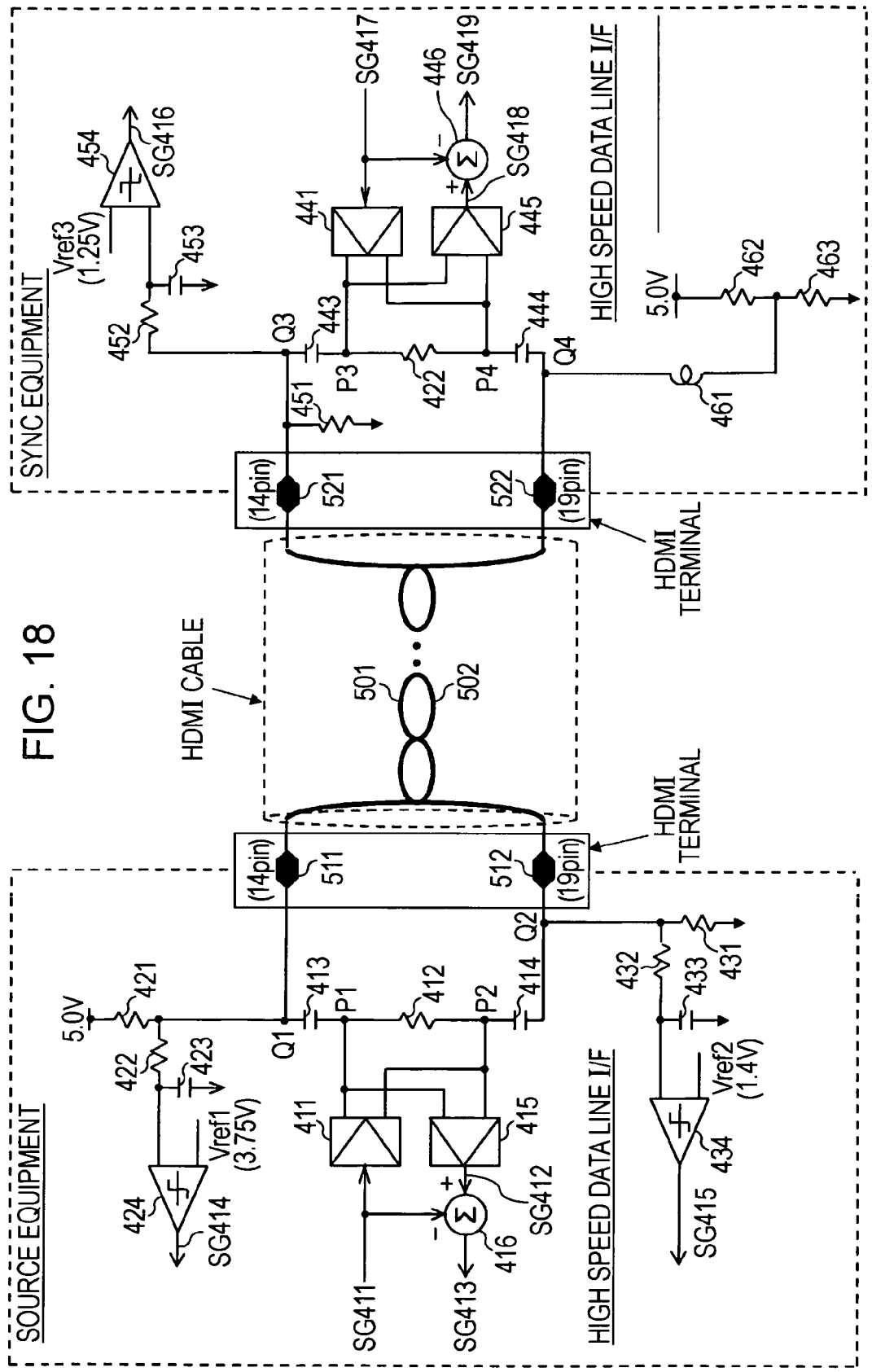
FIG. 18 is a connection diagram illustrating a configuration example of a communication unit to perform LAN communication between the source equipment and sync equipment.

FIG. 18 shows a configuration example of the high speed data line interface of the source equipment and sync equipment. The high speed data line interface makes up a communication unit to perform LAN (Local Area Network) communication. The communication unit herein performs communication using a pair of differential lines of the multiple lines making up the HDMI cable, and with the present embodiment, a bi-directional communication path made up of a reserve line (Ether+line) corresponding to an open (Reserve) pin (pin 14) and the HPD line (Ether−line) corresponding to the HPD pin (pin 19).

The source equipment has a LAN signal transmitting circuit 411, terminating resistor 412, AC coupling capacitance 413, 414, LAN signal receiving circuit 415, subtraction circuit 416, a pull-up resistor 421, resistor 422 and capacitance 423 making up a low-pass filter, comparator 424, pull-down resistor 431, resistor 423 and capacitance 433 making up a low-pass filter, and a comparator 434. Here, the high speed data line interface (high speed data line I/F) is made up of the LAN signal transmitting circuit 411, terminating resistor 412, AC coupling capacitance 413, 414, LAN signal receiving circuit 415, and subtraction circuit 416.

A series circuit of the pull-up resistor 421, AC coupling capacitance 413, terminating resistor 412, AC coupling capacitance 414, and pull-down resistor 431 is connected between the power line (+5.0V) and the ground line. The mutual connect point P1 of the AC coupling capacitance 413 and terminating resistor 412 is connected to the positive output side of the LAN signal transmitting circuit 411, while being connected to the positive input side of the LAN signal receiving circuit 415. Also, the mutual connect point P2 of the AC coupling capacitance 414 and terminating resistor 412 is connected to the negative output side of the LAN signal transmitting circuit 411, while being connected to the negative input side of the LAN signal receiving circuit 415. The transmission signal (transmission data) SG 411 is supplied to the input side of the LAN signal transmitting circuit 411.

Also, an output signal SG 412 of the LAN signal receiving circuit 415 is supplied to the positive side terminal of the subtracting circuit 416, and the transmission signal (transmission data) SG 411 is supplied to the negative side terminal of the subtracting circuit 416. With the subtracting circuit 416, the transmission signal SG 411 is subtracted from the output signal SG 412 of the LAN signal receiving circuit 415, and the reception signal (receiving data) SG 413 is obtained.

Also, mutual connect point Q1 of the pull-up resistor 421 and AC coupling capacitance 413 is connected to a ground line via a series circuit of the resistor 422 and capacitance 423. The output signal of the low-pass filter obtained at the mutual connect point of the resistor 422 and capacitance 423 is supplied to one of the input terminals of the comparator 424. With the comparator 424 herein, the output signal of the low-pass filter is compared to the reference voltage Vref1 (+3.75V) supplied to the other input terminal. The output signal SG 414 of the comparator 424 is supplied to the control unit (CPU) of the source equipment.

Also, the mutual connect point Q2 of the AC coupling capacitance 414 and pull-down resistor 431 is connected to a ground line via the series circuit of the resistor 432 and capacitance 433. The output signal of the low-pass filter obtained at the mutual connect point of the resistor 432 and capacitance 433 is supplied to one of the input terminals of the comparator 434. With the comparator 434, the output signal of the low pass filter is compared to the reference voltage Vref2 (+1.4V) supplied to the other input terminal. The output signal SG 415 of the comparator 434 is supplied to the control unit (CPU) of the source equipment.

The sync equipment has a LAN signal transmitting circuit 441, terminating resistor 442, AC coupling capacitance 443, 444, LAN signal receiving circuit 445, subtraction circuit 446, a pull-down resistor 451, resistor 452 and capacitance 453 making up a low-pass filter, comparator 454, choke coil 461, resistor 462, and resistor 463. Here, the high speed data line interface (high speed data line I/F) is made up of the LAN signal transmitting circuit 441, terminating resistor 442, AC coupling capacitance 443, 444, LAN signal receiving circuit 445, and subtraction circuit 446.

Between the power line (+5.0V) and the ground line, a series circuit of the resistor 462 and resistor 463 is connected. Also, between the mutual connect point herein of the resistor 462 and resistor 463 and the ground line, a series circuit of the choke coil 461, AC coupling capacitance 444, terminating resistor 442, AC coupling capacitance 443, and pull-down resistor 451 is connected.

The mutual connect point P3 of the AC coupling capacitance 443 and terminating resistor 442 is connected to the positive output side of the LAN signal transmitting circuit 441, while being connected to the positive input side of the LAN signal receiving circuit 445. Also, the mutual connect point P4 of the AC coupling capacitance 444 and terminating resistor 442 is connected to the negative output side of the LAN signal transmitting circuit 441 while being connected to the negative input side of the LAN signal receiving circuit 445. The transmission signal (transmission data) SG 417 is supplied to the input side of the LAN signal transmitting circuit 441.

Also, an output signal SG 418 of the LAN signal receiving circuit 445 is supplied to the positive side terminal of the subtracting circuit 446, and a transmission signal SG 417 is supplied to the negative side terminal of the subtracting circuit 446. With the subtracting circuit 446 herein, the transmission signal SG 417 is subtracted from the output signal SG 418 of the LAN signal receiving circuit 445, and a receiving signal (receiving data) SG 419 is obtained.

Also, the mutual connecting point Q3 of the pull-down resistor 451 and AC coupling capacitance 443 is connected to a ground line via a series circuit of the resistor 452 and capacitance 453. The output signal of the low-pass filter obtained at the mutual connect point of the resistor 452 and capacitance 453 is supplied to one of the input terminals of the comparator 454. With the comparator 454 herein, the output signal of the low-pass filter is compared to a reference voltage Vref3 (+1.25V) supplied to the other input terminal. The output signal SG 416 of the comparator 454 is supplied to the control unit (CPU) of the sync equipment.

The reserve line 501 and HPD line 502 included in the HDMI cable make up a differential twisted pair. The source side edge 511 of the reserve line 501 is connected to the pin 14 of the HDMI terminal of the source equipment, and the sync side edge 521 of the reserve line 501 is connected to the pin 14 of the HDMI terminal of the sync equipment. Also, the source side edge 512 of the HPD line 502 is connected to the pin 19 of the HDMI terminal of the source equipment, and the sync side edge 522 of the HPD line 502 is connected to the pin 19 of the HDMI terminal of the sync equipment.

With the source equipment, the mutual connect point Q1 of the pull-up resistor 421 and AC coupling capacitor 413 described above is connected to the pin 14 of the HDMI terminal, and also the mutual connect point Q2 of the pull-down resistor 431 and AC coupling capacitance 414 is connected to the pin 19 of the HDMI terminal. On the other hand, with the sync equipment, the mutual connect point Q3 of the pull-down resistor 451 and AC coupling capacitance 443 described above is connected to the pin 14 of the HDMI terminal, and also, the mutual connect point Q4 of the choke coil 461 and AC coupling capacitance 444 is connected to the pin 19 of the HDMI terminal.

Next, the operations of the LAN communication by the high speed data line interface configured as described above will be described.

With the source device, the transmission signal (transmission data) SG 411 is supplied to the input side of the LAN signal transmission circuit 411, and the differential signal (positive output signal, negative output signal) corresponding to the transmission signal SG 411 is output from the LAN signal transmission circuit 411 herein. The differential signal output from the LAN signal transmission circuit 411 is supplied to the connect points P1 and P2, and is transmitted to the sync equipment through a pair of HDMI cables (reserve line 501, HPD line 502).

Also, with the sync device, the transmission signal (transmission data) SG 417 is supplied to the input side of the LAN signal transmission circuit 441, and the differential signal (positive output signal, negative output signal) corresponding to the transmission signal SG 417 is output from the LAN signal transmission circuit 441 herein. The differential signal output from the LAN signal transmission circuit 411 is supplied to the connect points P3 and P4, and is transmitted to the source equipment through a pair of HDMI cables (reserve line 501, HPD line 502).

Also, with the source equipment, the input side of the LAN signal receiving circuit 415 is connected to the connecting points P1 and P2, whereby as an output signal SG 412 of the LAN signal receiving circuit 415, an added signal of the transmission signal corresponding to the differential signal (current signal) output from the LAN signal transmitting circuit 411 and a receiving signal corresponding to the differential signal transmitted from the sync equipment as described above is obtained. With the subtracting circuit 416, the transmission signal SG 411 is subtracted from the output signal SG 412 of the LAN signal receiving circuit 415. Therefore, the output signal SG 413 of the subtracting circuit 416 corresponds to the transmission signal (transmission data) SG 417 of the sync equipment.

Also, with the sync equipment, the input side of the LAN signal receiving circuit 445 is connected to the connecting points P3 and P4, whereby as an output signal SG 418 of the LAN signal receiving circuit 445, an added signal of the transmission signal corresponding to the differential signal (current signal) output from the LAN signal transmitting circuit 441 and a receiving signal corresponding to the differential signal transmitted from the source equipment as described above is obtained. With the subtracting circuit 446, the transmission signal SG 417 is subtracted from the output signal SG 418 of the LAN signal receiving circuit 445. Therefore, the output signal SG 419 of the subtracting circuit 446 corresponds to the transmission signal (transmission data) SG 411 of the source equipment.

Thus, bi-directional LAN communication can be performed between the high speed data line interface of the source equipment and the high speed data line interface of the sync equipment.

Note that in FIG. 18, besides the above-described LAN communication, the HPD line 502 conveys to the source equipment that the HDMI cable is connected to the sync equipment with a DC bias level. That is to say, the resistors 462, 463 within the sync equipment and the choke coil 461 biases the HPD line 502 to roughly 4V when the HDMI cable is connected to the sync equipment, via the pin 19 of the HDMI terminal. The source equipment extracts the DC bias of the HPD line 502 with the low-pass filter made up of a resistor 432 and capacitance 433, and compares to the reference voltage Vref2 (e.g. 1.4V) with the comparing unit 434.

The voltage of the pin 19 of the HDMI terminal of the source equipment is lower than the reference voltage Vref2 since the pull-down resistor 431 exists, if the HDMI cable is not connected to the sync equipment, and further is higher than the reference voltage Vref2 if the HDMI cable is connected to the sync equipment. Accordingly, the output signal SG 415 of the comparator 434 is a high level when the HDMI cable is connected to a sync device, and a low level otherwise. Thus, the control unit (CPU) of the source equipments can recognize whether or not the HDMI cable is connected to the sync equipment, based on the output signal SG 415 of the comparator 434.

Also, in FIG. 18, a function is had to mutually recognize with the DC bias potential of the reserve line 501, whether the equipment connected to both ends of the HDMI cable is equipment capable of LAN communication (hereafter called "eHDM handling equipment") or is equipment not capable of LAN communication (hereafter called "eHDM non-handling equipment").

As described above, the source equipment pulls-up (+5V) the reserve line 501 with the resistor 421, and the sync equipment pulls-down the reserve line 501 with the resistor 451. The resistors 421 and 451 do not exist in eHDM non-handling equipment.

The source equipment, as described above, compares the DC potential of the reserve line 501 that passed through the low-pass filter made up of the resistor 422 and capacitance 423, with the reference voltage Vref1. When there is a pull-down resistor 451 at the eHDM handling equipment, the voltage of the reserve line 501 at the sync equipment becomes 2.5V. However, when there is no pull-down resistor 451 at the eHDM non-handling equipment, the voltage of the reserve line 501 at the sync equipment becomes 5V from the existence of the pull-up resistor 421.

Therefore, by the reference voltage Vref1 being 3.75V for example, the output signal SG 414 of the comparator 424 has a low level when the sync equipment is eHDM handling equipment, and otherwise has a high level. Thus, the control unit (CPU) of the source equipment can recognize whether the sync equipment is eHDM handling equipment or not, based on the output signal SG 414 of the comparing unit 424.

Similarly, the sync equipment compares the DC potential of the reserve line 501 that has passed through the low-pass filter made up of the resistor 452 and capacitance 453, with the reference voltage Vref3, using the comparator 454. When there is a pull-up resistor 421 at the eHDM handling equipment, the voltage of the reserve line 501 at the source equipment becomes 2.5V. However, when there is no pull-up resistor 421 at the eHDM non-handling equipment, the voltage of the reserve line 501 at the source equipment becomes 0V from the existence of the pull-down resistor 451.

Therefore, by the reference voltage Vref3 being 1.25V for example, the output signal SG 416 of the comparator 454 has a high level when the source equipment is eHDM handling equipment, and otherwise has a low level. Thus, the control unit (CPU) of the sync equipment can recognize whether the source equipment is eHDM handling equipment or not, based on the output signal SG 416 of the comparing unit 454.

According to the configuration example shown in FIG. 18, with an interface that performs LAN communication and communication of equipment control data and exchange and authentication of video and audio data transfer and connecting equipment information with one HDMI cable, LAN communication is performed with bi-directional communication via a pair of differential transfer paths, and the connection state of the interface is notified by at least one of the DC bias potentials of the transfer paths, whereby a spatial separation can be performed whereby the SCL line and SDA line are physically not used for LAN communication. Consequently, a circuit can be formed for the LAN communication unrelated to the regulated electrical state relating to the DDC, and a stable and accurate LAN communication can be realized at low cost.

Note that the pull-up resistor 421 shown in FIG. 18 may be provided within the HDMI cable, not within the source equipment. In such a case, each of the terminals of the pull-up resistors 421 are connected to each of a reserve line 501, and lines (signal lines) connected to the power (power potential) out of the lines provided within the HDMI cable.

Further, the pull-down resistor 451 and resistor 463 shown in FIG. 18 may be provided within the HDMI cable instead of within the sync equipment. In such a case, each of the terminals of the pull-down resistors 451 are connected to each of a reserve line 501, and line (ground line) connected to the ground (reference potential) out of the lines provided within the HDMI cable. Also, each of the terminals of the resistor 463 are connected to each of the lines (ground lines) connected to the HPD line 502 and ground (reference potential), of the lines provided within the HDMI cable.

As described above, with the AV system 50 shown in FIG. 1, the video camera 100 (see FIG. 2) selectively transmits a non-compressed video signal or a compressed video signal obtained by subjecting the non-compressed video signal to compression processing with a compression method that the television receiver 200 can handle, and the video signal of the desired bit rate, within the transfer bit rates of the transfer path, can be transmitted well.

Also, in the AV system 50 shown in FIG. 1, the television receiver 200 (see FIG. 12) supplies, to the video camera 100, the information of a compression method that can be handled by itself, while controlling the decompression processing, signal selection processing and so forth based on the compression information and so forth supplied from the video camera 100, and can obtain a reception video signal good regardless of whether the transmitted video signal is a non-compressed video signal or a compressed video signal.

Note that with the above-described embodiment, with the video camera 100, before starting the transfer, a comparison of the transfer bit rate of the HDMI transfer path and the bit rate of the transmission video signal output from the codec 117 is performed, and the bit rate of the transmission video signal is determined. That is to say, if the bit rate of the transmission video signal is at or less than that transfer bit rate of the HDMI transfer path, determination is made to transfer while remaining non-compressed, and on the other hand, in the case that the bit rate of the transmission video signal exceeds the transfer bit rate of the HDMI transfer path, determination is made as to whether to compress and transfer or to transfer in a format of a low bit rate.

However, there may be times wherein the quality of the receiving signal at the television receiver 200 deteriorates from signal decay from deterioration (bends, twists, broken lines) of the HDMI cable 300 or cable length, or by connection problems with the connection portions and the transfer bit rate of the HDMI transfer path decreases in actuality. In this case, if the transmission video signal of a bit rate determined before the above-described transfer is started is to be transferred, transfer in an optimal state becomes difficult.

Below, another embodiment will be described that enables realizing an optimal transfer state according to the actual transfer path state. In the other embodiment herein, the television receiver 200' supplies the transfer path information showing the state of the transfer path to the video camera 100 via the HDMI cable 300.

Figure 19:
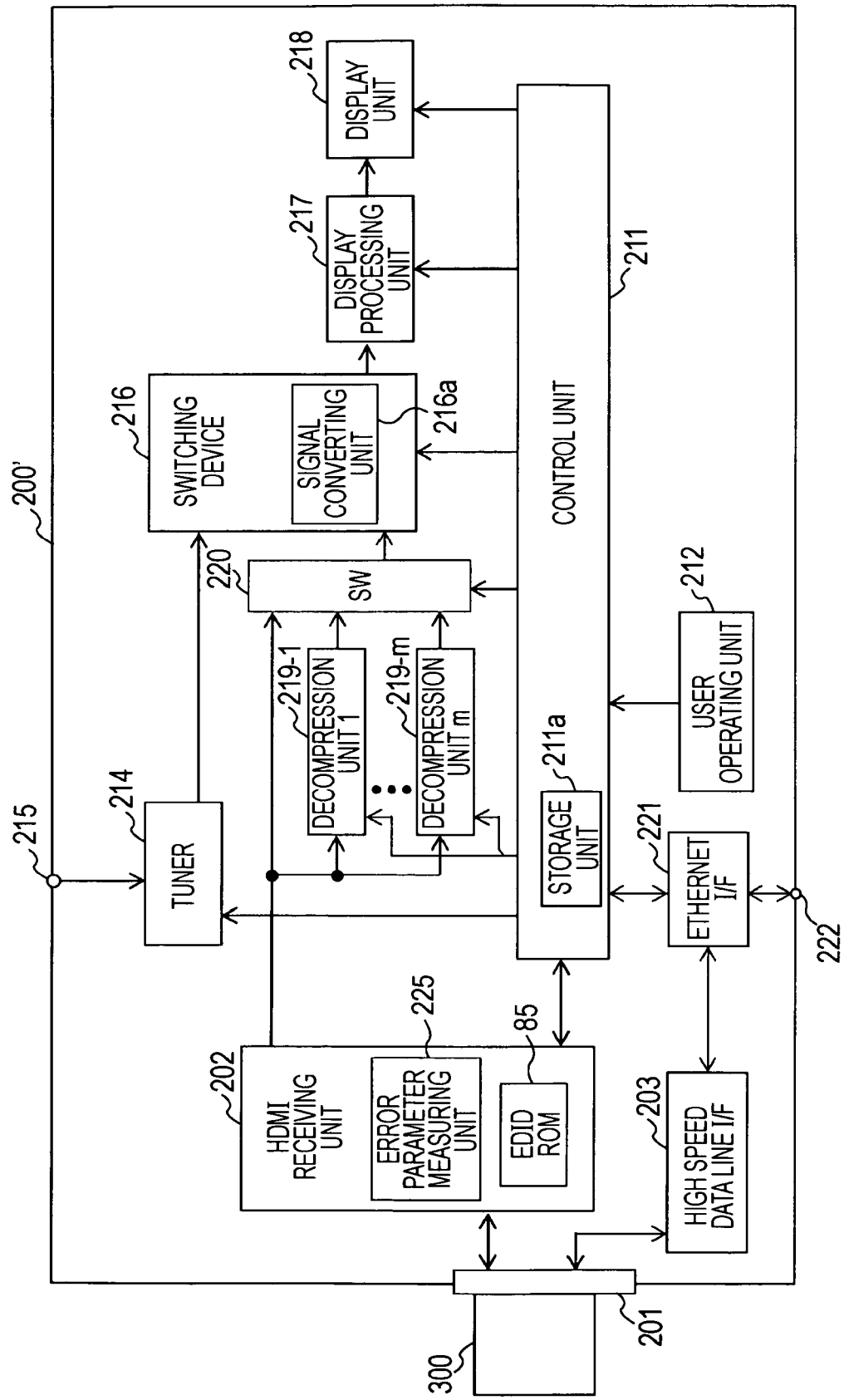
FIG. 19 is a block diagram illustrating another configuration example of a television receiver as a video signal receiving device.

FIG. 19 shows a configuration example of the television receiver 200' in the other embodiment herein. In FIG. 19 here, the portions corresponding to FIG. 12 are appended the same reference numerals, and the detailed description thereof is omitted.

The television receiver 200 provides an error parameter measuring unit 225 to the HDMI receiving unit 202. The error parameter measuring unit 225 periodically measures the error parameters which are the parameters showing the state of the transfer path. The control unit 211 determines the state of the transfer path based on the error parameters measured with the error parameter measuring unit 225 herein.

For example, the error parameter measuring unit 225 measures the amplitude value of the TMDS clock signal as an error parameter. The control unit 211 compares the measured amplitude value to a reference value (comparison value), and when the amplitude value is smaller than the reference value, determines that the state of the transfer path is poor. Also, for example, the error parameter measuring unit 225 measures the gain control voltage value of the TMDS adaptive equalizer as an error parameter. The control unit 211 compares the measured voltage value to a reference value (comparison value) of a set maximum value neighborhood, and when the voltage value is greater than the reference value, determines that the state of the transfer path is poor.

Also, for example, the error parameter measuring unit 225 measures the error rates of an ECC error, BCH error, TERC4 error and so forth as error parameters. The control unit 211 compares the measured error rate as a reference value (comparison value), and when the error rate is greater than the reference value, determines that the state of the transfer path is poor.

The control unit 211 supplies good/poor transfer path determination information to the video camera 100 as transfer path information. In this case, the control unit 211 uses a CEC line or high speed data line to supply the transfer path information. Now, the control unit 211 makes up the transfer path information supplying unit along with the HDMI receiving unit 202 and high speed data line interface 203.

The video camera 100 (see FIG. 2) uses a CEC line or high speed data line to obtain the transfer path information supplied from the television receiver 200' as described above. In this case, the control unit 111 of the video camera 100 makes up a transfer path information obtaining unit along with the HDMI receiving unit 102 and high speed data line interface 103.

At the video camera 100, the bit rate of the transmission video signal is adjusted based on the transfer path information obtained from the television receiver 200'. The bit rate adjustment herein is performed by a format change of the transmission video signal or a change of the compression method or compression ratio. For example, in the case that the transfer path state is poor, the format of the transmission video signal is changed to a transmission video signal format having a format of a low bit rate, or a non-compressed video signal is changed to a compressed video signal, and further the compression method or compression ratio is controlled so that the bit rate of the transmission video signal is lowered. In this case, the signal converting unit 117a, compression unit 121-1 through 121-n and switch unit 122 make up the bit rate adjusting unit.

In the above description, an example of the television receiver 200' supplying good/poor transfer path determination information to the video camera 100 as transfer path information is described. However, the television receiver 200' can be configured to supply the E-EDID stored in the EDID ROM 85 as transfer path information to the video camera 100.

Information of a format that can be handled with the television receiver 200', i.e. a format that can be displayed with the television receiver 200' is stored in the EDID ROM 85. The control unit 211 of the television receiver 200' changes the format information of the video signal within the E-EDID stored in the EDID ROM 85 when the state of the transfer path is determined to be poor as described above. In this case, the format of the video signal that is currently transmitted from the video camera 100 is removed, and is changed into a state showing only a format having a lower necessary bit rate than the removed format.

In this case, the capability that the television receiver 200' possesses has not deteriorated. Changing the format information of the video signal within the E-EDID stored in the EDID ROM 85 is performed so that the capability that the television receiver 200' possesses appears to have deteriorated, to prompt changing of the format of the transmission video signal on the video camera 100 side to a format with a low bit rate.

In the case of changing format information within the E-EDID stored in the EDID ROM 85 as described above, the control unit 211 of the television receiver 200' performs this with the voltage of the HPD line 86 of the HDMI cable 300 as a low level "L". After changing the format information of the video signal within the E-EDID stored in the EDID ROM 85, the control unit 211 restores the voltage of the HPD line 86 of the HDMI cable 300 to a high level "H".

In the case that the voltage of the HPD line 86 of the HDMI cable 300 is a low lever "L", and subsequently is returned to a high level "H", the control unit 111 of the video camera 100 recognizes that the format information of the video signal within the E-EDID has been changed, and reads out the E-EDID from the EDID ROM 85.

The control unit 111 of the video camera 100 having obtained the E-EDID from the television receiver 200' changes the format of the transmission video signal to the format showing the format information thereof, based on the format information of the video signal within the E-EDID. Thus, in the case that the state of the transfer path is poor, the bit rate of the transmission video signal transmitted from the video camera 100 to the television receiver 200' is adjusted to be lowered.

Figure 20:
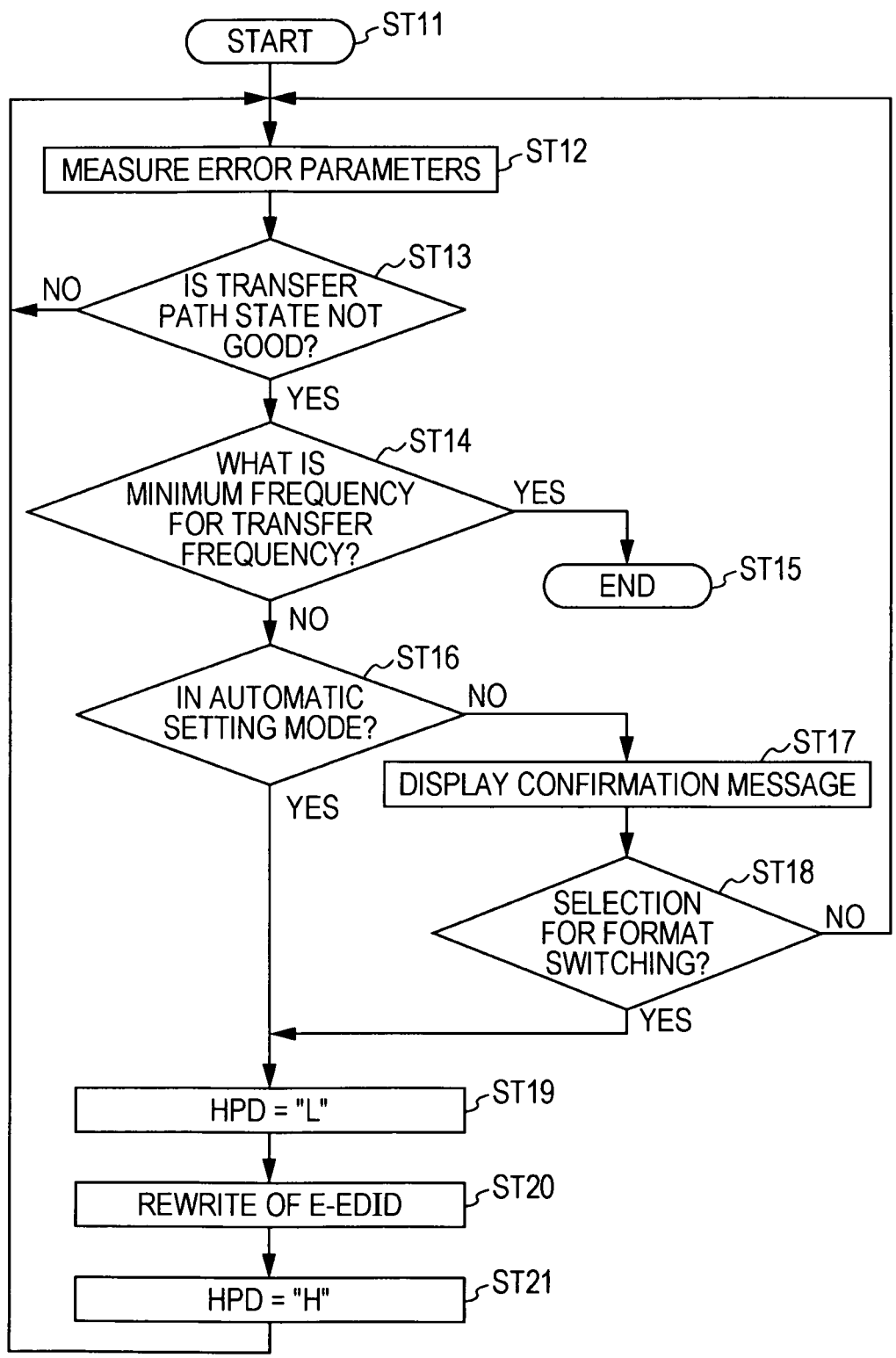
FIG. 20 is a flowchart showing a processing sequence of rewriting processing of the E-EDID according to the transfer path state at a control unit of a television receiver.

The flow chart in FIG. 20 shows processing procedures of a rewriting processing of the E-EDID according to the transfer path state described above, in the control unit 211 of the television receiver 200'.

The control unit 211 starts processing corresponding to the power turned on of the television receiver 200' for example, in step ST11, and subsequently advances to the processing in step ST12. In step ST12 herein, the control unit 211 measures the error parameter which is a parameter showing the state of the transfer path with the error parameter measuring unit 225.

Next, the control unit 211 determines in step ST13 whether or not the transfer path state is poor or not, based on the error parameter measured in step ST12. If not poor, the control unit 211 immediately returns to the processing in step ST12. On the other hand, if poor, the control unit 211 advances to the processing in step ST14.

In step ST14 herein, the control unit 211 determines whether or not the transfer frequency is a minimum frequency. That is to say, the control unit 211 determines whether or not the format of the video signal currently transmitted from the video camera 100 is the format having the minimum necessary bit rate out of the formats that the television receiver 200' can handle.

When the transfer frequency is the minimum frequency, change of the format information of the video signal within E-EDID is impossible, whereby the control unit 211 ends the processing in step ST15. On the other hand, when the transfer frequency is not the minimum frequency, the control unit 211 advances to the processing in step ST16.

In step ST16, the control unit 211 determines whether or not in an automatic setting mode. Although not described above, with the television receiver 200', the user can operate a user operating unit 212 to cause a mode wherein rewriting of the format information of the video signal within E-EDID is automatically performed (automatic setting mode) according to the transfer path state. When not in automatic setting mode, the control unit 211 controls the display processing unit 217 in step ST17, and displays a format switching confirmation message on the display unit 218.

Next, the control unit 211 determines in step ST18 whether or not the user has selected the format switching. When the user has not selected the format switching, the control unit 211 returns the processing to step ST12. On the other hand, when the user has selected format switching, the control unit 211 advances to the processing in step ST19. When in automatic setting mode in step ST16, the control unit 211 immediately advances to the processing in step ST19.

In step ST19, the control unit 211 has the voltage of the HPD line 86 of the HDMI cable 300 as a low level "L". The control unit 211 performs rewriting of the format information of the video signal within E-EDID in step ST20. In this case, the control unit 211 removes the format of the video signal currently transmitted from the video camera 100, and rewrites the format information so as to show only formats with necessary bit rates lower than the removed format. The control unit 211 attempts to lower the transfer frequency of the transfer path, i.e. lower the bit rate of the transmission video signal from the video camera 100, by such rewriting of format information.

Next, in step ST21 the control unit 211 has the voltage of the HPD line 86 of the HDMI cable 300 as a high level "H". Following the processing in step ST21, the control unit 211 returns to the processing in step ST12, continues monitoring the transfer path state, and in the case that the transfer path state is poor, performs rewriting processing again of the format information of the video signal within E-EDID.

An example wherein the format information of the video signal within E-EDID is rewritten and the transfer frequency of the transfer path is sequentially lowered is shown below. Table 1, table 2, and table 3 are partially extracted data of E-EDID for 1080P (12 bit), E-EDID for 1080P (8 bit), and E-EDID for 1080i (8 bit), respectively. By rewriting the E-EDID in stages as for 1080P (12 bit)→for 1080P (8 bit)→and for 1080i (8 bit), the transfer frequency can be lowered as 225 MHz→165 MHz→80 MHz.

TABLE 1

Original EDID 1080P(12 bit)
INITIAL SETTINGS
TMDS CLOCK: 225 MHz
* Frequency Range (FD) *
MIN FH   [KHz] = 15
MAX FH   [KHz] = 70
MIN FV   [ Hz] = 58
MAX FV   [ Hz] = 62
MAX PIXEL [MHz] = 150
GTF Second Curve = OFF
* Detail Timing *
          Preferred #2
Dot clock [MHz]:   148.50      74.25
H.Active [Dot]:    1920        1280
H.Blank [Dot]:     280         370
H.Front_p [Dot]:   88          110
H.Sync [Dot]:      44          40
V.Active [Line]:   1080        720
V.Blank [Line]:    45          30
V.Front_p[Line]:   4           5
V.Sync  [Line]:    5           5
Scan Type   :      Non-Int     Non-Int
Sync Type   :      D.S         D.S
H/V Sync Pola :    +/+         +/+
Sync on     :      *         *
Serration   :      *         *
FH    [KHz]:       67.50       45.00
FV    [Hz]:        60.00       60.00
H/V Size  [mm]:    1600/900    1600/900
* Video Data Block *
No16  1920*1080p 60 Hz 16:9
No4   1280* 720p 60 Hz 16:9
No5   1920* 1080i 60 Hz 16:9
No3   720* 480p 60 Hz 16:9
No2   720* 480p 60 Hz 4:3
No7   720* 480i 60 Hz 16:9
No8   720* 480i 60 Hz 4:3
No32  1920*1080p 24 Hz 16:9
No1   640* 480p 60 Hz 4:3
* Vender Specific Data Block *
IEEE Registration Identifier = 000c03
Source Physical Address(A.B.C.D) = 1.0.0.0
Supports_AI = ON
DC_48 bit (16 bits/color) = OFF
DC_36 bit (12 bits/color) = ON
DC_30 bit (10 bits/color) = ON
YCC444 under deep color = ON
DVI Dual-link operation = OFF
Max_TMDS_Clock = 225 [MHZ]

TABLE 2

2nd EDID 1080P(8bit)
Deep Color HANDLING ⟶ NON-HANDLING
TMDS CLOCK:165 MHz
******** Frequency Range (FD) *******
MIN FH [KHz]     =    15
MAX FH [KHz]     =    70
MIN FV [Hz]      =    58
MAX FV [Hz]      =    62
MAX PIXEL [MHz]  =    150
GTF Second Curve =    OFF
******** Detail Timing *******
           Preferrred #2
Dot clock [MHz]:   148.50      74.25
H.Active [Dot]:    1920        1280
H.Blank [Dot]:     280         370
H.Fron_p [Dot]:    88          110
H.Sync [Dot]:      44          40
V.Active [Line]:   1080        720
V.Blank [Line]:    45          30
V.Front_p[Line]:   4           5
V.Sync [Line]:     5           5
Scan Type:         Non-Int     Non-Int
Sync Type:         D.S         D.S
H/V Sync Pola:     +/+         +/+
Sync on:           *         *
Serration:         *         *
FH [KHz]:          67.50       45.00
FV [ Hz]:          60.00       60.00
H/V Size [mm]:     1600/900    1800/900

*** Video Data Block ***
      No 16  1920*  1080p   60 Hz   16:9
      No 4   1280*   720p   60 Hz   16:9
      No 5   1920*  1080i   60 Hz   16:9
      No 3    720*   480p   60 Hz   16:9
      No 2    720*   480p   60 Hz    4:3
      No 7    720*   480i   60 Hz   16:9
      No 6    720*   480i   60 Hz    4:3
      No 32  1920*  1080p   24 Hz   16:9
      No 1    640*   480p   60 Hz    4:3

*** Vender Specific Data Block ***
      IEEE Registration Identifier = 000c03
      Source Physical Addres(A.B.C.D) = 1.0.0.0
      Supports_AI = ON
      DC_48bit (16 bits/color) = OFF
      DC_36bit (12 bits/color) = OFF
      DC_30bit (10 bits/color) = OFF
      YCC444 under deep color = OFF
      DVI Dual-link operation = OFF
      Max_TMDS_Clock = 165 [MHz]

TABLE 3

3rd EDID
1080/60p HANDLING ⟶ NON-HANDLING
TMDS CLOCK:80 MHz
******** Frequency Range (FD) *******
MIN FH [KHz]     =    15
MAX FH [KHz]     =    70
MIN FV [Hz]      =    58
MAX FV [Hz]      =    62
MAX PIXEL [MHz]  =    80
GTF Second Curve =    OFF TABLE 3-continued

```
********** Detail Timing *********
              Preferrred
Dot clock [MHz]:   74.25
H.Active [Dot]:    1280
H.Blank [Dot]:     370
H.Fron_p [Dot]:    110
H.Sync [Dot]:      40
V.Active [Line]:   720
V.Blank [Line]:    30
V.Front_p[Line]:   5
V.Sync [Line]:     5
Scan Type:         Non-Int
Sync Type:         D.S
H/V Sync Pola:     +/+
Sync on:           ***
Serration:         ***
FH [KHz]:          45.00
FV [ Hz]:          60.00
H/V Size [mm]:     1600/900
       ***** Video Data Block *****
No 4   1280*   720p    60 Hz   16:9
No 5   1920*   1080i   60 Hz   16:9
No 3    720*   480p    60 Hz   16:9
No 2    720*   480p    60 Hz    4:3
No 7    720*   480i    60 Hz   16:9
No 6    720*   480i    60 Hz    4:3
No 32  1920*   1080p   24 Hz   16:9
No 1    640*   480p    60 Hz    4:3

***** Vender Specific Data Block *****
IEEE Registration Identifier = 000c03
Source Physical Address (A.B.C.D) = 1.0.0.0
Supports_AI = ON
DC_48bit (16 bits/color) = OFF
DC_36bit (12 bits/color) = OFF
DC_30bit (10 bits/color) = OFF
YCC444 under deep color = OFF
DVI Dual-link operation = OFF
Max_TMDS_Clock = 80 [MHz]
```

With the above-described other embodiment, with the video camera 100 the transfer path information showing the transfer path state from the television receiver 200' is obtained. With the video camera 100, a bit rate of the transmission video signal is adjusted, based on the transfer path information herein. That is to say, with the above-described other embodiment, the bit rate of the transmission video signal transmitted from the video camera 100 to the television receiver 200' is dynamically adjusted according to the state of the transfer path, whereby an optimal transfer state can be realized according to the actual transfer path.

Also, with the above-described other embodiment, with the video camera 100, the E-EDID including the changed video signal format information is obtained as transfer path information from the television receiver 200'. Therefore, with the video camera 100, the format of the transmission video signal is changed to a format that the format information included in the E-EDID is shown, and the bit rate adjustment of the transmission video signal can be performed simply.

Note that with the above-described embodiment, as in the AV system 50 shown in FIG. 1, an example is shown which applies the present invention to source equipment (transmitting device) and sync equipment (receiving device). However, it goes without saying that the present invention can be similarly applied to the transmitting unit and receiving unit making up the repeater equipment.

Figure 21:
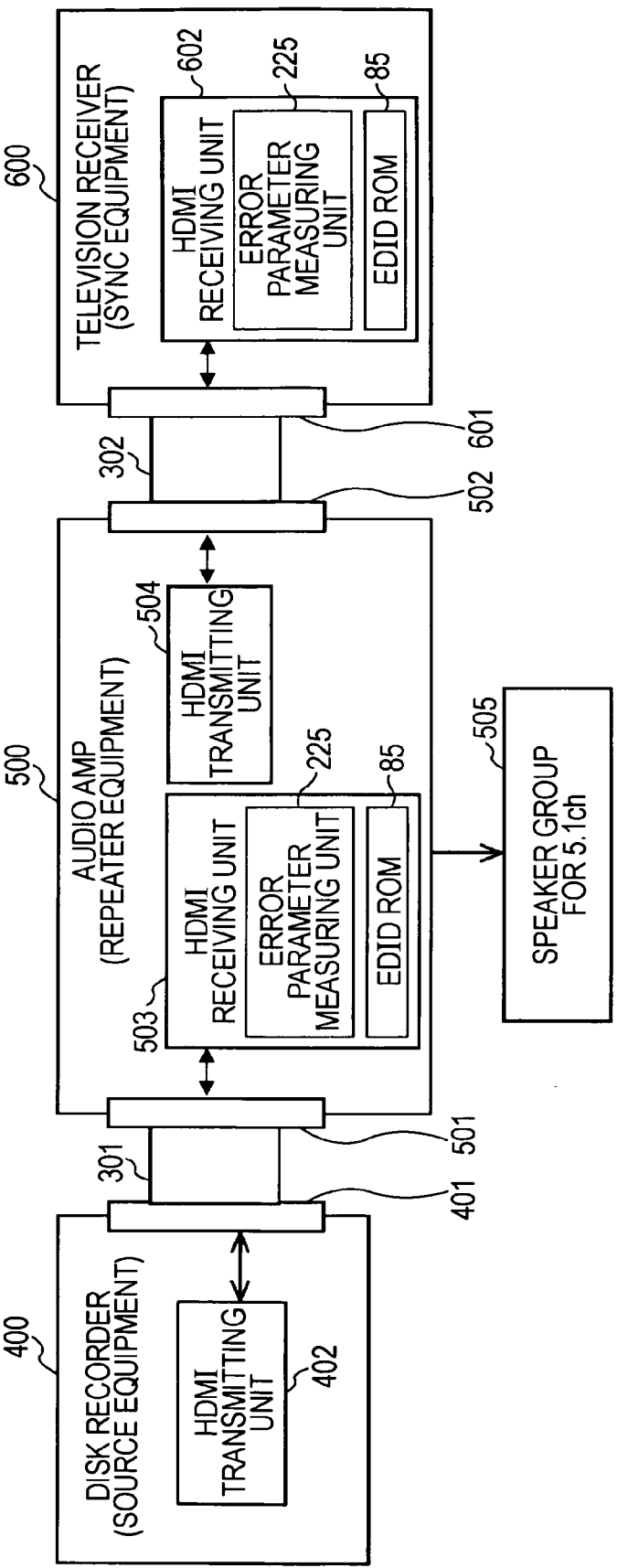
FIG. 21 is a block diagram illustrating a configuration example of an AV system having a repeater equipment according to another embodiment of the present invention.

FIG. 21 shows a configuration example of the AV system 50A having repeater equipment. The AV system 50A has a disk recorder 400 serving as source equipment, an audio amp 500 serving as repeater equipment, and television receiver 600 serving as sync equipment.

An HDMI terminal 401 connected to an HDMI transmitting unit (HDMITX) 402 is provided to the disk recorder 400. An HDMI terminal 601 connected to an HDMI receiving unit (HDMIRX) 602 is provided to the television receiver 600. Also, an HDMI terminal 501 connected to an HDMI receiving unit (HDMIRX) 503 is provided to the audio amp 500 and an HDMI terminal 502 connected to the HDMI transmitting unit (HDMITX) 504 is provided.

The disk recorder 400 and audio amp 500 are connected via an HDMI cable 301. That is to say, one end of the HDMI cable 301 is connected to the HDMI terminal 401 of the disk recorder 400, and the other end of the HDMI cable 301 herein is connected to the HDMI terminal 501 of the audio amp 500. Also, the audio amp 500 and television receiver 600 are connected via an HDMI cable 302. That is to say, one end of the HDMI cable 302 is connected to the HDMI terminal 502 of the audio amp 500, and the other end of the HDMI cable 302 herein is connected to the HDMI terminal 601 of the television receiver 600.

With the AV system 50A shown in FIG. 21, the video signal played with the disk recorder 400 is supplied to the television receiver 600 via the HDMI cable 301, audio amp 500, and HDMI cable 302, and an image is displayed at the television receiver 600. On the other hand, the audio signal played with the disk recorder 400 is supplied to the audio amp 500 via the HDMI cable 301, and after processing with the audio amp 500, for example is supplied to an externally-attached 5.1 channel speaker group 505, whereby audio is output with the speaker group 505.

With the AV system 50A shown in FIG. 21, the HDMI receiving unit 503 of the audio amp 500 and the HDMI receiving unit 602 of the television receiver 600 have an error parameter measuring unit 225 and EDID ROM 85, similar to the television receiver 200' shown in FIG. 19 described above. While a detailed description will be omitted, the transmitting unit of the disk recorder 400 and the transmitting unit of the audio amp 500 are configured similar to the video camera 100 shown in FIG. 2, and operate similarly. Also, the receiving unit of the audio amp 500 and the receiving unit of the television receiver 600 are similarly configured as the receiving units of the television receivers 200 and 200' shown in FIG. 12 and FIG. 19, and operate similarly.

Also, the above-described embodiment shows that which uses an HDMI transfer path. However, the present invention can also similarly be applied to that which uses a transfer path of a non-compressed video signal other than HDMI, for example a DVI (Digital Visual Interface), DP (Display Port) interface, wireless transfer, and further a gigabit Ethernet/fiber optics transfer path which is expected to come into widespread use in the from now on.

In the case of a DVI, similar to the above-described HDMI, stipulations to store a video signal corresponding format (resolution, bit depth, frame rate and so forth) in a region called E-EDID that the receiving device has are defined. Accordingly, in the case of the DVI herein, similar to the above-described case of HDMI, in the event of transmitting the video signal to the receiving device, the transmitting device can use a DDC (Display Data Channel) to read out the above-described corresponding format information from the receiving device E-EDID and determine the format of the transmitting video signal.

In the case of the DVI herein, similar to the HDMI, the video signal is transmitted in one direction from the source equipment to the sync equipment, using the TMDS channel 0 through TMDS channel 2 (see FIG. 14). The upper-limit transfer bit rate for stipulations of the DVI transfer path is 3.96 Gbps.

Figure 22:
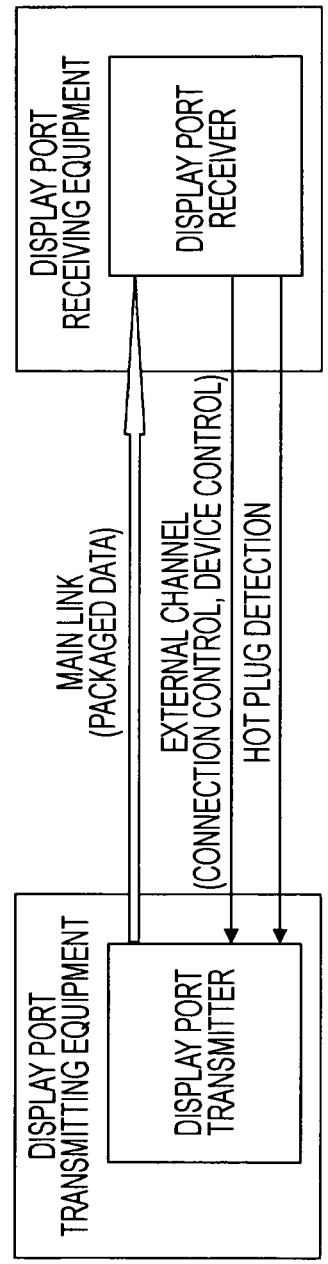
FIG. 22 is a block diagram illustrating a configuration example of a DP system.

FIG. 22 shows a configuration example of the DP system using a DP interface. The DP system herein has display port transmitting equipment and display port receiving equipment connected with a DP interface. The display port transmitting equipment has a display port transmitter, and the display port receiving device has a display port receiver.

A main link is configured with one, two, or four double-terminated differential signal pairs (pair lanes), does not have a dedicated clock signal, and instead a clock is embedded in a 8B/10B encoded data stream. With the DP interface, two transfer speeds are defined. One has a bandwidth of 2.16 Gbps for each pair lane. The other has a bandwidth of 1.296 Gbps for each pair lane. Accordingly, the stipulated upper limit transfer bit rate of the transfer path of the DP interface herein is 2.16 Gbps per one port, and 8.64 Gbps for the maximum four ports.

With the DP interface herein, unlike HDMI, the transfer speed and pixel frequency are independent, and the existence and amount thereof of appended data such as pixel depth and resolution, frame frequency, and audio data within the transfer stream, and DRM information, can be freely adjusted.

Also, with the DP interface, separate from the main link, there is a half-duplex bi-directional external (auxiliary) channel with a bandwidth of 1M bits/second and a maximum delay of 500 ms, information exchange is performed relating to the functions between the transmitting equipment and the receiving equipment with the bi-directional communication herein.

With the DP interface herein, for example with the above-described external (auxiliary) channel, information of the compression method that can be handled can be supplied from the receiving device to the transmitting device, and also compression information can be supplied from the transmitting device to the receiving device. Note that in the case of the DP interface herein, although unshown, information of the compression method (decompression method) that the receiving device can handle is stored in the EDID similar to HDMI or DVI. Also, with the DP interface herein, a hot plug detect is provided to detect that the connection destination has been changed.

Figure 23:
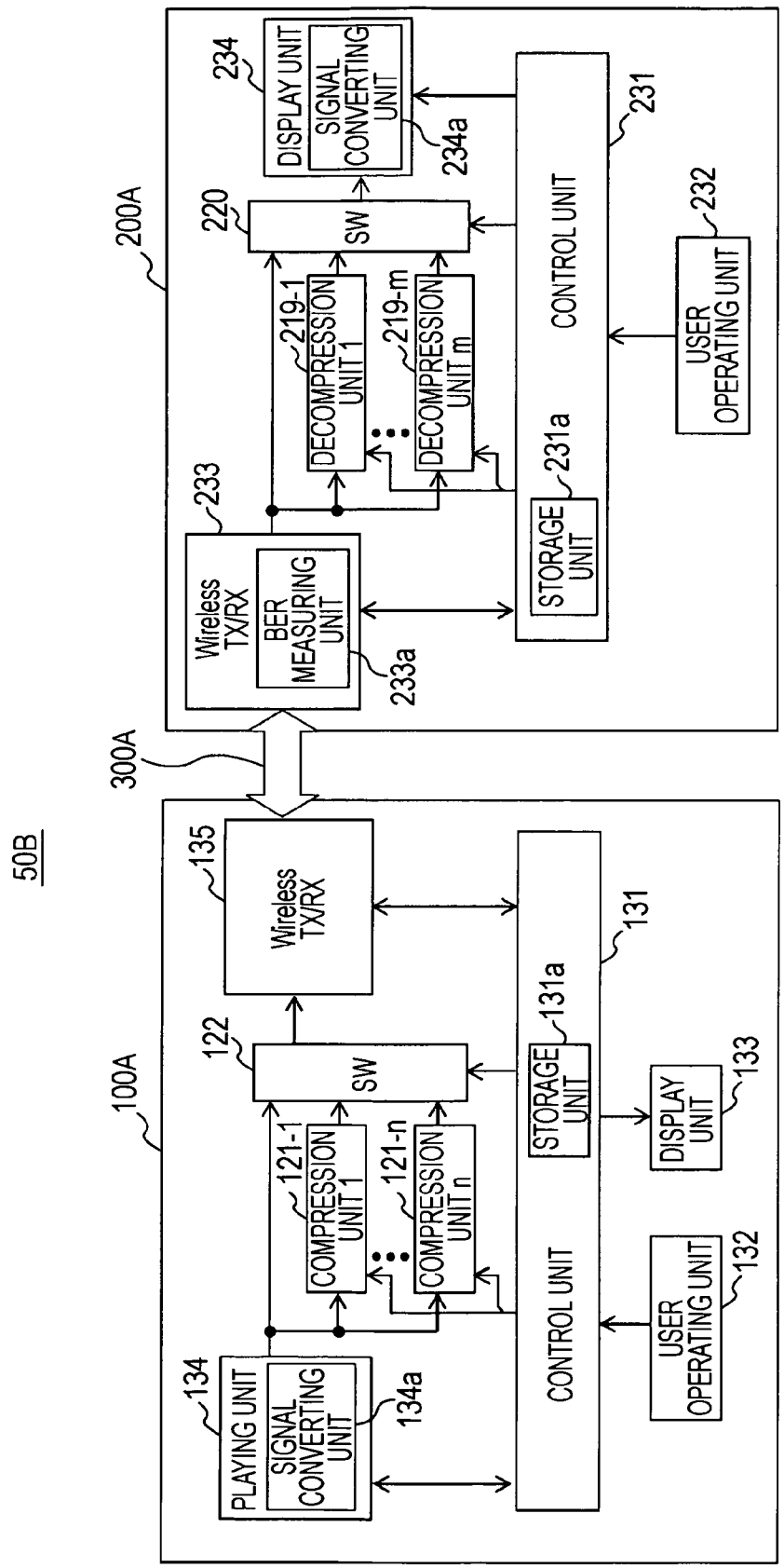
FIG. 23 is a block diagram illustrating a configuration example of a wireless system according to another embodiment of the present invention.

FIG. 23 shows a configuration example of the wireless system 50B as another embodiment of the present embodiment. In FIG. 23 herein, the portions corresponding to FIG. 2 and FIG. 12 and FIG. 19 are appended the same reference numerals, and the detailed description thereof will be omitted as appropriate. The wireless system 50B herein is made up of a transmitting device 100A and receiving device 200A connected with a wireless transfer path 300A.

The transmitting device 100A has a control unit 131, user operating unit 132, display unit 133, playing unit 134, n number of data compression units 121-1 through 121-n, switch units 122, and wireless transmitting/receiving unit 135.

The control unit 131 controls the operations of each unit of the transmitting device 100A. The user operating unit 132 and display unit 133 make up the user interface, and connected to the control unit 131. The user operating unit 132 is made up of keys, buttons, dials arrayed on an unshown casing of the transmitting device 100A or a touch panel arrayed on the display face of the display unit 133, or further with a remote controlled transmitting/receiving device or the like. The display unit 133 is made up of an LCD (Liquid Crystal Display) or the like.

The playing unit 134 plays predetermined video content from a recording medium such as an optical disk, HDD or memory card or the like for example, and outputs a non-compressed video signal. The playing unit 134 makes up a video signal output unit. The wireless transmitting/receiving unit 135 receives information of the video signal corresponding format (resolution, bit depth, frame rate and so forth) from the receiving device 200A, via the wireless transfer path 300A, and supplies this format information to the control unit 131. The control unit 131 stores and holds the format information herein in the storage unit 131a. The playing unit 134 converts and outputs the format (resolution, bit depth, frame rate and so forth) of the non-compressed video signal to be output based on control by the control unit 131 by the signal converting unit 134a so that the receiving device 200A can handle, i.e. so as to be displayable with the receiving device 200A. The wireless transmitting/receiving unit 135 makes up a video format information obtaining unit.

The data compression units 121-1 through 121-n each subject the non-compressed video signal output from the playing unit 134 to compression processing with a predetermined compression ratio, and output the compressed video signal. The data compression unit 121-1 through 121-n make up the video signal compression unit. The data compression units 121-1 through 121-n each perform data compression processing with mutually different compression methods. For example, as compression methods, "RLE (Run Length Encoding)", "Wavelet", "SBM (SuperBit Mapping)", "LLVC (Low Latency Video Codec)", "ZIP" and so for may be considered. Note that the compression rate needed with the data compression units 121-1 through 121-n can be small, and a compression method that performs inter-line compression processing or inter-frame (field) compression processing is sufficient, and from the perspective of suppressing image quality deterioration, a lossless compression method is desired. For example, RLE and ZIP are lossless compression methods.

The switch unit 122 selectively takes out one of the non-compressed video signal output from the playing unit 134 and the compressed video signal output from the data compression units 121-1 through 121-n, and supplies to the wireless transmitting/receiving unit 135. The switch unit 122 makes up a video signal selecting unit.

Now, the actions of the switch unit 122 and the data compression units 121-1 through 121-n are controlled as follows by the control unit 131. In this case, let us say that the bit rate of the non-compressed (baseband) video signal output from the playing unit 134 is BR1, and the transfer bit rate of the wireless transfer path 300A is BR2. The bit rate BR1 can be found with a computation expression of, for example, (resolution)×(frame rate)×(3 colors worth of bit depth).

The transfer bit rate BR2 of the wireless transfer path 300A is set by the control unit 131, based on the bit error rate information on the receiving device 200A side supplied from the receiving device 200A via the wireless transfer path 300A. The control unit 131 sequentially changes the bit rate BR2, based on the bit error rate information on the receiving device 200A side, with a bit rate wherein the bit error rate on the receiving device 200A side is at or below a constant value, and also so as to be the highest bit rate therein.

That is to say, the control unit 131 makes the value of the bit rate BR2 to be small in the case that the bit error rate is greater than a constant value, and makes the value of the bit rate BR2 to be large in the case that the bit error rate is smaller than a constant value, and shifts the bit error rate at the receiving device 200A side in the neighborhood of the constant value.

The wireless transmitting/receiving unit 135 obtains bit error rate information supplied from the receiving device 200A via the wireless transfer path 300A, and supplies to the control unit 131. The control unit 131 holds the bit error rate information herein in the storage unit 131*a*. The wireless transmitting/receiving unit 135 makes up the bit error rate information obtaining unit.

In the case that the bit rate BR1 is not exceeding the bit rate BR2, the switch unit 122 takes out the non-compressed video signal output from the playing unit 134, and supplies to the wireless transmitting/receiving unit 135 as a video signal to be transmitted. On the other hand, in the case that the bit rate BR1 is exceeding the bit rate BR2, the switch unit 122 takes out the compression video signal obtained by subjecting the non-compressed video signal output from the playing unit 134 to data compression processing with one of the data compression units 121-1 through 121-*n*, and supplies to the wireless transmitting/receiving unit 135 as a video signal to be transmitted.

Here, the control unit 131 references information showing the compression method that the receiving device 200A can handle which is supplied from the receiving device 200A via the wireless transfer path 300A, and determines which data compression unit of the data compression units 121-1 through 121-*n* to select. That is to say, the control unit 131 selects a data compression unit that satisfies a condition of performing data compression processing with a compression method that the receiving device 200A can handle, while performing compression processing so that the bit rate of the compressed video signal generated with the data compression processing does not exceed the above-described bit rate BR2 (transfer bit rate of the wireless transfer path 300A). In this case, with the data compression unit wherein the compression ratio can be changed, there are cases wherein the above-described bit rate conditions can be satisfied by compression ratio change control.

Note that in the case there are two or more data compression units existing that satisfy the above-described conditions, and when there is that which performs data compression with a lossless compression method, the control unit 131 selects that data compression unit with priority. Thus, image deterioration from the data compression processing is suppressed by a data compression unit performing data compression with a lossless compression method being selected with priority.

Also, as described above, in the case that the bit rate BR1 exceeds the bit rate BR2, causing the compression video signal obtained by data compression processing with one of the data compression units 121-1 through 121-*n* is basic, but in the case that there is nothing within the data compression units 121-1 through 121-*n* to perform data compression processing with a compression method that receiving device 200A can handle, the control unit 131 performs control such as follows.

That is to say, with the signal converting unit 134*a* that the playing unit 134 has, one or multiple items of the resolution, bit depth, and frame rate of the non-compressed video signal output from the playing unit 134 herein is made to be small, so that the bit rate BR1 of the non-compression video signal does not exceed the transfer bit rate BR2 of the wireless path 300A. The control unit 131 takes out the non-compressed video signal output from the playing unit 134 with the switch unit 122, and supplies to the wireless transmitting/receiving unit 135 as a video signal to be transmitted.

The wireless transmitting/receiving unit 135 obtains format information of the video signal and information of the compression method that the receiving device 200A can handle, which is supplied from the receiving device 200A via the wireless transfer path 300A, and supplies to the control unit 131. The control unit 131 holds the compression method information in the storage unit 131*a*. The wireless transmitting/receiving unit 135 makes up the compression method information obtaining unit.

The control unit 131 supplies the control information of the switch unit 122 and data compression unit 121-1 through 121-*n* and the format information (information of resolution and so forth) of the non-compressed video signal output from the playing unit 134 described above, to the receiving device 200A via the wireless transfer path 300A. Information indicating whether the transmission video signal is a non-compressed video signal or a compressed video signal, and information such as compression method and compression ratio when the transmission video signal is a compressed video signal, are included in the control information of the switch unit 122 and data compression unit 121-1 through 121-*n* (hereafter called "compression information"). The control unit 131 makes up the compression information supplying unit along with the wireless transmitting/receiving unit 135.

The control unit 131 can use the AVI InfoFrame packet to transmit the above-described compression information to the receiving device 200A, similar to the AV system 50 shown in FIG. 1 described above (see FIG. 10 and FIG. 11).

The wireless transmitting/receiving unit 135 transmits the video signal supplied from the switch unit 122 to the receiving device 200A via the wireless transfer path 300A with predetermined communication. In this sense, the wireless transmitting/receiving unit 135 makes up the video signal transmitting unit.

The receiving device 200A has a control unit 231, user operating unit 232, wireless transmitting/receiving unit 233, m number of data decompression units 219-1 through 219-*m*, switch unit 220, and display unit 234.

The control unit 231 controls the operations of each unit of the receiving device 200A. The user operating unit 232 makes up the user interface, and is connected to the control unit 231. The user operating unit 232 is made up of keys, buttons, dials, disposed in an unshown casing of the television receiver 200A or by a remote controller or the like.

The wireless transmitting/receiving unit 233 receives the video signal transmitted from the transmitting device 100A via the wireless transfer path 300A with predetermined communication. The wireless transmitting/receiving unit 233 herein makes up the video signal receiving unit. The wireless transmitting/receiving unit 233 supplies the received video signal to the switch unit 220 and data decompression units 219-1 through 219-*m*.

When the video signal received at the wireless transmitting/receiving unit 233 is a compressed video signal, and the data decompression units 219-1 through 219-*m* themselves correspond to the compression method thereof, subject the video signal to data decompression processing, and output a non-compressed video signal. The data decompression units 219-1 through 219-*m* make up a video signal decompressing unit. The switch unit 220 selectively takes out the video signal received at the wireless transmitting/receiving unit 233 or the non-compressed video signal obtained with the data decompression units 219-1 through 219-*m*, and supplies to the display unit 234. The switch unit 220 makes up the video signal selecting unit.

Here, the operations of the data decompression units 219-1 through 219-*m* and switch unit 220 are controlled by the control unit 231 as follows. That is to say, the control unit 231 performs control based on the compression information and video signal format information supplied from the transmitting device 100A via the wireless transfer path 300A, as described above. This information is obtained by the wireless transmitting/receiving unit 233, supplied to the control unit 231, the control unit 231 holds this information in the storage unit 231a.

The compression information includes information showing whether the video signal received with the wireless transmitting/receiving unit 233 is a non-compressed video signal or the compressed videos signal, and information of the compression method and compression ratio and so forth are included when the video signal thereof is a compressed video signal. The wireless transmitting/receiving unit 233 makes up the compression information obtaining unit.

The control unit 231 controls the operations of the data decompression units 219-1 through 219-m and switch unit 220, based on the above-described compression information and the like. That is to say, when the video signal received at the wireless transmitting/receiving unit 233 is a non-compressed video signal, the control unit 231 takes out the non-compressed video signal with the switch unit 220, and supplies to the display unit 234 as a reception video signal.

On the other hand, when the video signal received at the wireless transmitting/receiving unit 233 is a compressed video signal, the control unit 231 subjects the video signal to data decompression processing with the data decompressing unit corresponding to the compression method thereof, and takes out the non-compressed video signal obtained as a result thereof with the switch unit 220, and supplies to the display unit 234.

Note that the display unit 234 has a signal converting unit 234a. Even if the video signal received at the wireless transmitting/receiving unit 233 is a non-compressed video signal as described above, when the resolution and so forth of the non-compressed video signal is made smaller with the signal converting unit 134a that the playing unit 134 of the transmitting device 100A has from the relation with the transmitting bit rate of the wireless transfer path 300A, the signal converting unit 234a returns the resolution and so forth to a state that can be handled by the receiving device 200A, i.e. that can be displayed by the receiving device 200A based on the information of the resolution and so forth of the non-compressed video signal transmitted from the transmitting device 100A as described above.

The display unit 234 displays the image with the video signal output from the switch unit 220. The display unit 234 is made up of an LCD (Liquid Crystal Display), organic EL (ElectroLuminescence), PDP (Plasma Display Panel), CRT (Cathode Ray Tube) and so forth, for example.

Note that as mentioned in the description of the transmitting device 100A, information indicating the compression method (decompression method) that the receiving device 200A can handle and video signal format information is transmitted from the receiving device 200A to the transmitting device 100A via the wireless transmitting path 300A. The compression method information and format information are held in the storage unit 231a of the control unit 231, for example.

In the event that the compression method information and format information are transmitted from the receiving device 200A to the transmitting device 100A, the compression method information and format information read out from the storage unit 231a herein is transmitted to the transmitting device 100A via the wireless transmission path 300A by the wireless transmitting/receiving unit 233. In this sense, the wireless transmitting/receiving unit 233 make up the compression method information supplying unit.

Also, the wireless transmitting/receiving unit 233 has a bit error rate measuring unit 233a. The bit error rate measuring unit 233a periodically, for example, measures the bit error rate of the video signal transmitted from the transmitting device 100A. The wireless transmitting/receiving unit 233 transmits the bit error rate information obtained with the bit error rate measuring unit 233a to the transmitting device 100A via the wireless transfer path 300A. With the transmitting device 100A, the transfer bit rate BR2 of the wireless transfer path 300A is set, based on the bit error rate information herein, and as described above, control of the data compression unit 121-1 through 121-n and the switch unit 122 can be performed. The wireless transmitting/receiving unit 233 makes up the bit error rate information supplying unit. The wireless transmitting/receiving unit 135 makes up the bit error rate information obtaining unit.

An operation example of the wireless system 50B in FIG. 23 as configured above will be described.

For example, when the user performs a transmission operation of the video signal, a non-compressed video signal of the predetermined image content that the user selected is output from the playing unit 134. The format (resolution and so forth) of the non-compressed video signal herein is converted to a format than can be handled by the receiving device 200A, i.e. a format that can be displayed with the receiving device 200A by the signal converting unit 134a.

The video signal output from the playing unit 134 is supplied to the wireless transmitting/receiving unit 135 through the switch unit 122 without change, or the video signal output from the playing unit 134 is supplied to the wireless transmitting/receiving unit 135 through the switch unit 122 after being subject to data compression processing with one of the data compression units 121-1 through 121-n.

In this case, when the bit rate of the non-compression video signal output from the playing unit 134 is BR1 and the transfer bit rate of the wireless transfer path 300A is BR2, when BR1≤BR2 holds, the non-compressed video signal output from the playing unit 134 is supplied to the wireless transmitting/receiving unit 135 as a video signal to be transmitted.

On the other hand, when BR1≤BR2 does not hold, the non-compressed video signal output from the playing unit 134 is subjected to data compression processing with one of the data compression units 121-1 through 121-n, and the output compressed video signal is supplied to the wireless transmitting/receiving unit 135 as a video signal to be transmitted.

Note that even when BR1≤BR2 does not hold, when there is none of the data compression units 121-1 through 121-n to perform data compression processing with a compression method that can be handled with the receiving device 200A, the resolution and so forth of the non-compressed video signal output from the playing unit 134 is made small so as to satisfy BR1≤BR2, and the non-compressed video signal thereof is supplied to the wireless transmitting/receiving unit 135 as a video signal to be transmitted.

With the wireless transmitting/receiving unit 235, the video signal supplied from the switch unit 122 is transmitted to the receiving device 200A via the wireless transfer path 300A with predetermined communication. In this case, the bit rate of the transmitting video signal is suppressed within the transfer bit rate of the wireless transfer path 300A, as described above. Accordingly, the transmitting device 100A can transmit well the video signal of the desired bit rate within the transfer bit rates of the wireless transfer path 300A, to the receiving device 200A.

Note that along with the transmission of the video signal described above, the compression information and format information of the transmission video signal is transmitted through the wireless transfer path 300A from the transmitting device 100A to the receiving device 200A.

With the receiving device 200A, the video signal transmitted from the wireless transmitting/receiving unit 135 of the transmitting device 100A via the wireless transmission path 300A is received by predetermined communication with the wireless transmitting/receiving unit 233. The video signal received with the wireless transmitting/receiving unit 233 is supplied to the switch unit 220 and data decompression units 219-1 through 219-$m$.

The operations of the switch 220 and data decompression units 219-1 through 219-$m$ are controlled by the transmitting device 100A, based on the compression information and format information supplied as described above.

That is to say, when the video signal received at the wireless transmitting/receiving unit 233 is a non-compressed video signal, the non-compressed video signal is supplied to the display unit 234 through the switch unit 220. When the video signal received with the wireless transmitting/receiving unit 233 is a compressed video signal, data compression processing is performed with the data decompression unit corresponding to the compression method thereof, and the non-compressed video signal obtained as a result thereof is supplied to the display unit 234 through the switch unit 220.

Note that when the resolution and so forth of the non-compressed video signal supplied to the display unit 234 is made small on the transmitting device 100A side from the relation with the transfer bit rate of the wireless transfer path, the resolution and so forth is returned to a state that can be handled with the receiving device 200A, i.e. that can be displayed with the receiving device 200A, based on the format information supplied from the transmitting device 100A as described above.

Thus, regardless of whether the video signal received with the wireless transmitting/receiving unit 233 is a non-compressed video signal or a compressed video signal, a good reception video signal is supplied to the display unit 234. An image by the video signal supplied from the switch unit 220 as described above is displayed on the display unit 234.

Note that as described above, with the transmitting device 100A, data compression processing is performed with a compression method that the receiving device 200A can handle, based on the compression method information from the receiving device 200A, whereby the compressed video signal received at the wireless transmitting/receiving unit 233 can always be decompressed with one of the data decompression units 219-1 through 219-$m$.

Also, with the wireless transmitting/receiving unit 233 of the receiving device 200A, the bit error rate of the video signal transmitted from the transmitting device 100A is measured periodically, for example, with the bit error rate measuring unit 233$a$. The measured bit error rate information is supplied from the wireless transmitting/receiving unit 233 to the transmitting device 100A side via the wireless transfer path 300A.

With the transmitting device 100A, the transfer bit rate BR2 of the wireless transfer path 300A is set by the control unit 131 based on bit error rate information on the receiving device 200A side supplied via the wireless transfer path 300A from the receiving device 200A. That is to say, with the control unit 131, the bit rate BR2 is sequentially updated so that the bit rate wherein the bit error rate on the receiving device 200A side is at or below a constant value becomes the highest bit rate therein. Accordingly, the bit error rate at the receiving device 200A side can be shifted in a constant value neighborhood, and even in a case that the transfer allowable bit rate (the transfer bit rate wherein the bit error rate becomes a constant value) of the wireless transfer path 300A is unstable and exhibits swings, the video signal can be transmitted from the transmitting device 100A to the receiving device 200A well.

Figure 24:
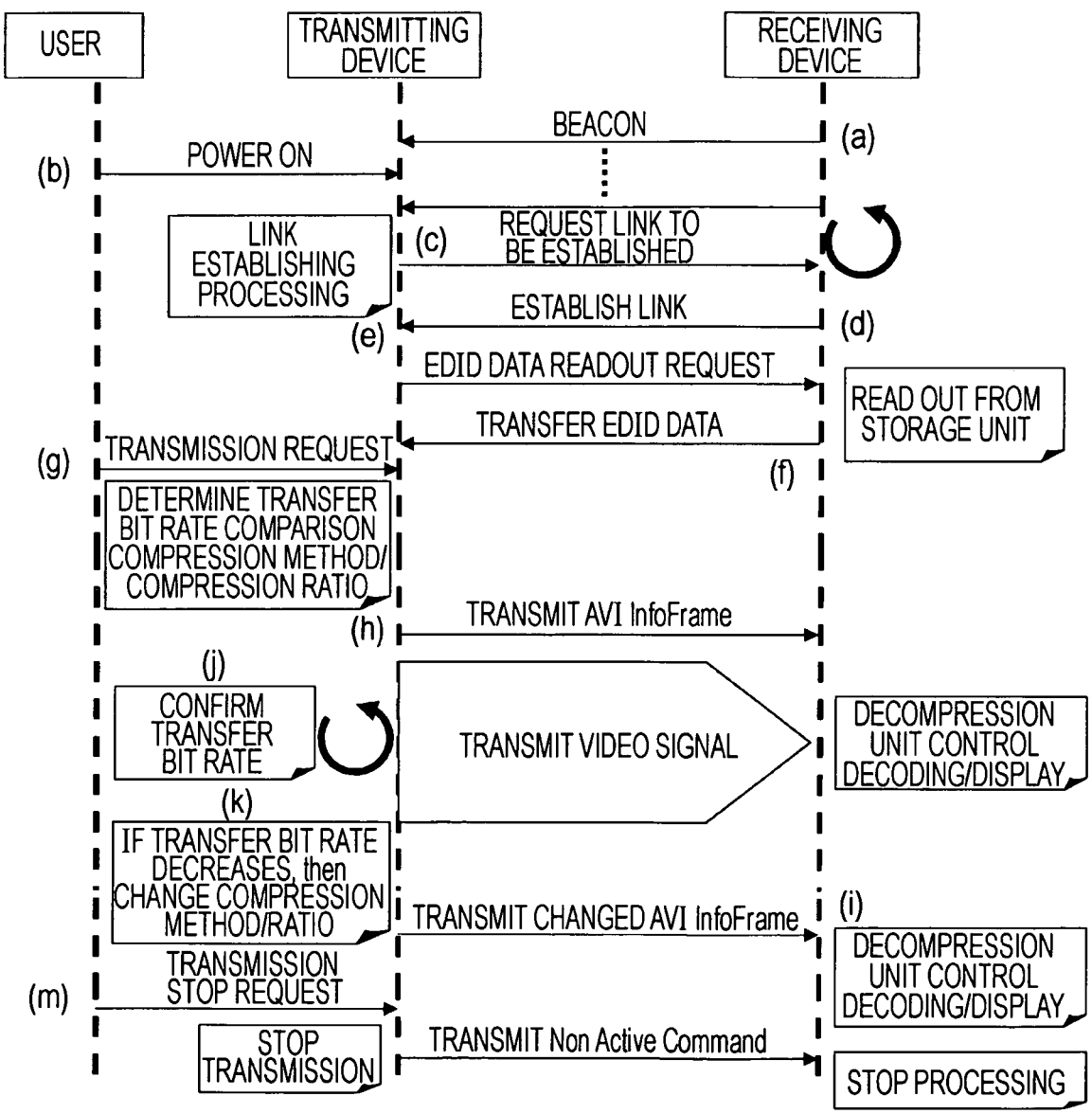
FIG. 24 is a diagram illustrating a control sequence example in the case of transmitting a video signal from the transmitting device to the receiving device via a wireless transfer path.

FIG. 24 shows a control sequence in the case of transmitting a video signal from the transmitting device 100A to the receiving device 200A, via the wireless transfer path 300A.

(a) The receiving device consistently outputs a beacon periodically, and confirms whether a transmitting device exists within the wireless network. (b) A transmitting device that the power is turned on by the user, or is already in a standby state, (c) performs participation in the wireless network and a link establishing request by replying an acknowledgement as to the beacon. (d) The receiving device recognizes the transmitting device, and replies with a link establishing acknowledgement.

(e) The transmitting device requests a transfer of the EDID data including the compression method (decompression method) as to the receiving device. (f) Upon receiving the request, the receiving device reads out predetermined data from the storage unit of the receiving device, and transfers this to the transmitting device. The transmitting device recognizes the compression method that the receiving device can handle from the transferred EDID data, and determines the compression method of the transmitting device that can be handled thereby.

(g) When transferring the video signal selected by the user, the transmitting device compares the transfer bit rate of the wireless transfer path and the necessary transfer bit rate of the transmission video signal, and if the necessary transfer bit rate herein is at or below the transfer bit rate of the transfer path, transfers while still non-compressed. On the other hand, in the case that the necessary bit rate exceeds the transfer bit rate of the wireless transfer path, the appropriate method is selected from within the compression method determined as described above, and determines the compression ratio as needed, and (h) sets the information thereof to a predetermined region of the AVI InfoFrame packet and transfers to the receiving device, and starts the transfer of the video signal.

(i) The receiving device extracts information such as the compression method and compression ratio from the received AVI InfoFrame packet, and if non-compressed, hands the signal without change to the display unit. On the other hand, if a compressed transfer, the information such as the compression method, compression ratio and so forth is used to control the decompression unit, and decodes. With wireless transfer the transfer bit rate is unstable depending on the transfer path conditions, and frequently changes, whereby (j) the transmitting device periodically confirms the transfer bit rate state of the wireless transfer path with the bit error rate information and so forth from the receiving device.

(k) in the case that the video signal that the transfer bit rate of the wireless transfer path is currently transmitting is lower than the necessary transfer bit rate, the transmitting device changes the compression ratio or changes the compression method to control the transfer bit rate necessary for the transmission video signal to be at or lower than the transfer bit rate of the wireless transfer path, and transmits the AVI InfoFrame packet wherein the compression method and compression ratio has been changed to the receiving device at the same time. (m) Upon a transmission stop being instructed by a user operation, the transmitting device stops the transmission of the video signal to the receiving device.

As described above, with the wireless system 50B shown in FIG. 23, the transmitting device 100A can selectively transmit the non-compressed video signal or the compressed video signal obtained by performing compression processing as to the non-compressed video signal with a compression method that the receiving device 200A can handle, and can transmit well a video signal with a desired bit rate within the transfer bit rates of the wireless transfer path 300A.

Also, with the wireless system 50B shown in FIG. 23, the receiving device 200A supplies the information of the compression method that can be handled by itself to the transmitting device 100A, while controlling the decompression processing and signal selection processing and so forth based on the compression information and so forth supplied from the transmitting device 100A, whereby a good reception video signal can be obtained, regardless of whether the transmitted video signal is a non-compressed video signal or a compressed video signal.

Note that the receiving device 200A has a bit error rate measuring unit 233a, so that information of the bit error rate is obtained as transfer path information. However, the transfer path information indicating the state of the transfer path is not limited to the information of the bit error rate herein. That is to say, with the receiving device 200A also, a configuration may have an error parameter measuring unit similar to the error parameter measuring unit 225 of the television receiver 200' shown in FIG. 19 described above. In this case, transfer path information corresponding to the measured error parameter is transmitted from the receiving device 200A to the transmitting device 100A, and the bit rate of the transmission video signal is adjusted at the transmitting device 100A based on the transfer path information herein.

Figures 25, 26:
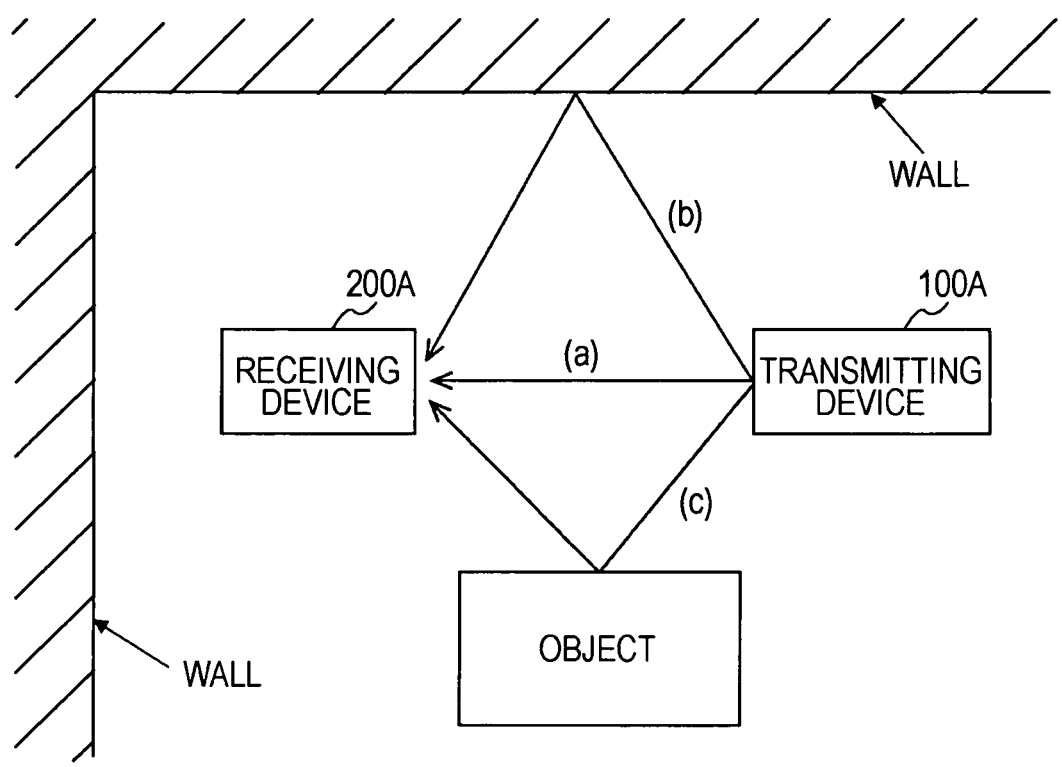
FIG. 25 is a diagram to describe that multiple paths can be taken as transmission paths from the transmitting device to the receiving device.
FIG. 26 is a diagram illustrating a table example showing the correlation between a path that is usable in the event of transmitting a video signal from the transmitting device to the receiving device, and transfer bit rates in the wireless transfer path of the path thereof.

Note that with the wireless system 50B shown in FIG. 23, for example, in the case that the wireless transfer path 300A is at a 60 GHz band (milli-wave band), in the case of considering transfer of the video signal indoors, the transmission waves reflect off walls and objects, whereby by changing the direction of the antenna (not shown) of the wireless transmitting/receiving unit 135 of the transmitting device 100A, i.e. the transmission direction, as shown in FIG. 25, multiple channels (in the example in the diagram, the 3 channels of (a) through (c)) can be taken as transmission channels from the transmitting device 100A to the receiving device 200A.

In this sort of state, the transmitting device 100A changes the transmission direction beforehand to multiple directions, and transmits the video signal of the various types of bit rates in each direction, while receiving the bit error rate information from the receiving device 200A, whereby a table such as shown in FIG. 26 can be formed, and this table can be held in the storage unit 131a of the control unit 131.

The table in FIG. 26 shows the correlation between the usable channels in the event of transmitting the video signal from the transmitting device 100A to the receiving device 200A, and the transfer bit rate in the wireless transfer path 300A of the channel thereof (transfer bit rate wherein transmission is possible when the bit error rate is at or under a constant value). Note that here, TRa>TRb>TRc.

In the situation shown in FIG. 25, in the state that transmission of a video signal is being performed with the channel (a) from the transmitting device 100A to the receiving device 200A, in the case that an obstacle such as a person comes into the position of crossing the channel (a), the transmitting device 100A references the table in FIG. 26, and goes to a state to perform transmission with the channel (b) next, which has a larger transfer bit rate. At this time, the control unit 131 of the transmitting device 100A changes the transfer bit rate BR2 of the wireless transfer path 300A from TRa to TRb, and controls the operations of the data compression units 121-1 through 121-n and the switch unit 122.

Also, after becoming a state wherein transmission of the video signal is performed with the channel (b) from the transmitting device 100A to the receiving device 200A as described above, further, in the case that an obstacle such as a person or the like comes into the position of crossing the channel (b), the transmitting device 100A references the table in FIG. 26, and goes to a state to perform transmission with the channel (c) next, which has a larger transfer bit rate. At this time, the control unit 131 of the transmitting device 100A changes the transfer bit rate BR2 of the wireless transfer path 300A further from TRb to TRc, and controls the operations of the data compression units 121-1 through 121-n and the switch unit 122.

Thus, in the case that the transmission channel is changed from the transmitting device 100A to the receiving device 200A, by the transfer bit rate BR2 of the wireless transfer path 300A being changed based on the table, the operations of the data compression units 121-1 through 121-n and the switch unit 122 are controlled, and even if the transmission channel is changed, the video signal can be transmitted from the transmitting device 100A to the receiving device 200A well.

Figure 27:
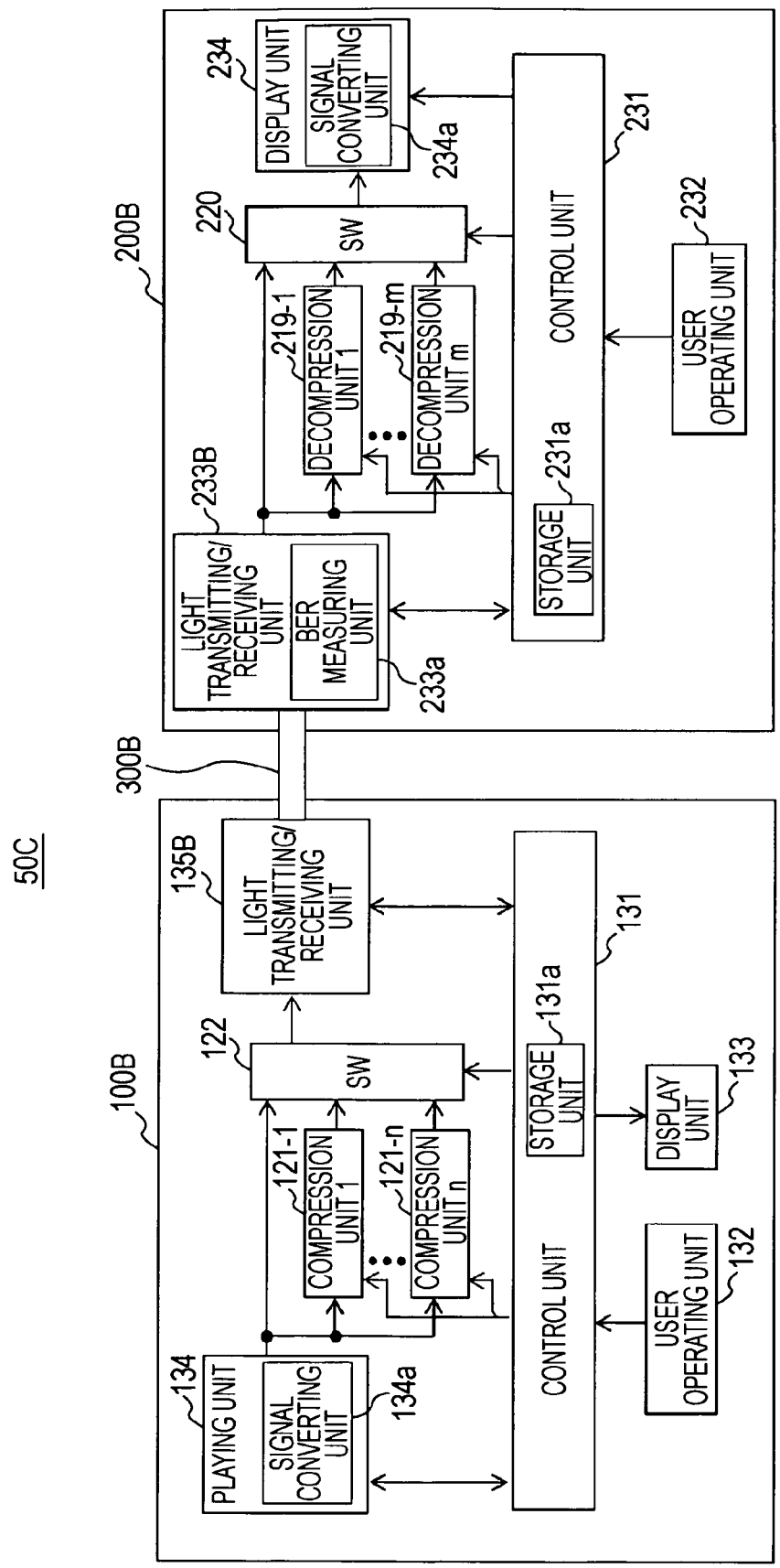
FIG. 27 is a block diagram illustrating a configuration example of an optical communication system according to another embodiment of the present invention.

FIG. 27 shows a configuration example of an optical communication system 50C as yet another embodiment of the present invention. In FIG. 27, the portion corresponding with FIG. 23 is shown with the same reference numerals appended. The optical communication system 50C here is a configuration wherein the transmitting device 100B and receiving device 200B are connected with an optical cable (optical transfer path) 300B.

The transmitting device 100B is configured such that the wireless transmitting/receiving device 135 of the transmitting device 100A of the wireless system 50B shown in FIG. 23 is replaced with an optical transmitting/receiving unit 135B. Also, the receiving device 200B is configured such that the wireless transmitting/receiving device 233 of the receiving device 200A of the wireless system 50B shown in FIG. 23 is replaced with an optical transmitting/receiving unit 233B. The optical transmitting/receiving unit 233B herein has a bit error rate measuring unit 233a.

The other portions of the optical communication system 50C shown in FIG. 27 are the same as the wireless system 50B shown in FIG. 23. The detailed descriptions will be omitted, but with the optical communication system 50C herein also operate similar to the wireless system 50B, and can obtain similar advantages.

Note that the video signal transmitting device is the video camera 100 in the AV system 50 shown in FIG. 1, the transmitting unit of the disk recorder 400 and audio amp 500 in the AV system 50A shown in FIG. 21, the transmitting device 100A in the wireless system 50B shown in FIG. 23, and the transmitting device 100B in the optical communication system 50C shown in FIG. 27. Also, the video signal receiving device is the television receiver 200 in the AV system 50 shown in FIG. 1, the receiving unit of the television receiver 600 and audio amp 500 in the AV system 50A shown in FIG. 21, the receiving device 200A in the wireless system 50B shown in FIG. 23, and the receiving device 200B in the optical communication system 50C shown in FIG. 27. However, the video signal transmitting device and video signal receiving device are not limited to these, and combinations of other equipment may be used.

Also, with the above-described embodiments, the portions of the data compression units 1221-1 through 121-n and the data decompression units 219-1 through 219-m can be realized by either hardware or software. In the case of a codec with a small calculating burden, realizing with software processing is also valid. With hardware alone, individual processing can be performed, but with software, processing of multiple compression methods can be changed easily.

INDUSTRIAL APPLICABILITY

With the present invention, a video signal of a desired bit rate can be well transmitted within transfer bit rates of the transfer path, and for example, can be applied to an AV system or the like that transmits a video signal via cable or wireless transfer path, from a transmitting device such as a video camera, DVD recorder, HDD recorder and so forth to a receiving device such as a television receiver.

The invention claimed is:

1. A video signal transmitting device comprising:
    a video signal output unit to output a non-compressed video signal to be transmitted;
    a compression method information obtaining unit to obtain information indicating a compression method that a receiving device can handle, from the receiving device via a transfer path;
    a transfer path information obtaining unit to obtain transfer path information indicating the state of said transfer path via said transfer path from said receiving device;
    a video signal compression unit to perform compression processing as to a non-compressed video signal output from said video signal output unit, with a compression method corresponding to the compression method indicated by the compression method information received with said compression method information receiving unit, and output a compressed video signal;
    a video signal selecting unit to select the non-compressed video signal output from said video signal output unit or the compressed video signal output from said video signal compression unit, based on said transfer path information obtained by said transfer path information obtaining unit;
    a video signal transmitting unit to transmit the video signal selected with said video signal selecting unit to said receiving device via a cable or wireless transfer path;
    a bit rate adjusting unit to adjust the bit rate of the video signal transmitted to said receiving device by said video signal transmitting unit, based on said transfer path information obtained with said transfer path information obtaining unit; and
    a compression information supplying unit to supply the control information of said video signal compression unit and said video signal selecting unit by said transmission control unit to said receiving device via said transfer path,
    wherein the information indicating a compression method is received at the transmitting device through a High Definition Multimedia Interface (HDMI) terminal of the transmitting device, and wherein when the receiving device changes format information stored within the receiving device indicating capability of the receiving device to display a format of a video signal, the change of the format information is communicated to the transmitting device through a hot plug detect (HPD) line of the HDMI terminal.

2. The video signal transmitting device according to claim 1, wherein, when a bit rate of the non-compressed video signal to be transmitted is a first bit rate and the transfer bit rate of said transfer path is a second bit rate,
    in the case that said first bit rate does not exceed said second bit rate, said transmission control unit effects control such that said non-compression video signal is selected with said video signal selecting unit, and
    in the case that said first bit rate exceeds said second bit rate, said transmission control unit effects control such that said compressed video signal is selected by said video signal selection unit when said video signal compression unit can handle the compression method indicated by the compression method information obtained with said compression method information obtaining unit, and controls at least the compression ratio or compression method of said video signal compression unit so that the bit rate of said compression video signal becomes lower than said second bit rate.

3. The video signal transmitting device according to claim 2, further comprising:
    a video format information obtaining unit to obtain the format information of the video signal from said receiving device via said transfer path;
    wherein said video signal output unit outputs a non-compressed video signal of a format indicated by format information obtained with said video format information obtaining unit;
    and wherein said transmission control unit obtains said first bit rate based on the format information obtained with said video format information obtaining unit.

4. The video signal transmitting device according to claim 2, wherein,
    in the case that said first bit rate exceeds said second bit rate, and said video signal compression unit cannot handle the compression method indicated by the compression method information obtained with said compression method information obtaining unit,
    said transmission control unit effects control such that said non-compression video signal is selected with said video signal selecting unit, and effects control such that at least the resolution, bit depth, or frame rate of the non-compressed video signal output from said video signal output unit is made smaller so that the bit rate of the non-compressed video signal becomes lower than said second bit rate.

5. The video signal transmitting device according to claim 2, wherein,
    in the case that said first bit rate exceeds said second bit rate, and said video signal compression unit can handle a plurality of compression methods indicated by the compression method information obtained with said compression method information obtaining unit,
    said transmission control unit effects control such that a lossless method of compression method is used with priority as the compression method in the event of performing compression processing as to said non-compressed video signal with said video signal compression unit.

6. The video signal transmitting device according to claim 1, wherein the transfer path information obtained with said transfer path information obtaining unit is the format information of the video signal read out from a storage unit wherein the format information is stored.

7. The video signal transmitting device according to claim 6, wherein, when a change to the format information stored in said storage unit is made, said transfer path information obtaining unit obtains the format information stored in said storage unit.

8. The video signal transmitting device according to claim 7, wherein said transfer path information obtaining unit recognizes the change to the format information stored in said storage unit with a voltage change of a predetermined line making up said transfer path.

9. The video signal transmitting device according to claim 1, wherein said transfer path is a wireless transfer path;
and wherein said transmission control unit
has information of the transfer bit rate of said transfer path as to a plurality of transmission directions; and
controls the operations of said video signal compression unit and said video signal selecting unit, based on the transfer bit rate in a second direction when said video signal transmitting unit performs switching of the transmission direction from a first direction to the second direction.

10. The video signal transmitting device according to claim 1, wherein said video signal transmitting unit transmits the video signal selected with said video signal selecting unit through a plurality of channels, by a differential signal, via said transfer path.

11. The video signal transmitting device of claim 1,
wherein the format information is changed within Enhanced Extended Display Identification Data (E-EDID) at the receiving device and the change to the format information is communicated to the transmitting device by a change of a voltage of the HPD line of the HDMI terminal after the format information is changed at the receiving device.

12. A video signal transmitting method comprising:
a video signal output step to output a non-compressed video signal to be transmitted;
a compression method information obtaining step to obtain information indicating a compression method that a receiving device can handle, from the receiving device via a transfer path;
a transfer path information obtaining step to obtain transfer path information indicating the state of said transfer path from said receiving device via said transfer path;
a video signal compression step to perform compression processing as to a non-compressed video signal output in said video signal output step, with a compression method corresponding to the compression method indicated by the compression method information received in said compression method information receiving step;
a video signal selecting step to select the non-compressed video signal output from said video signal output step or the compressed video signal output from said video signal compression step, based on said transfer path information obtained in said transfer path information obtaining step;
a video signal transmitting step to transmit the video signal selected in said video signal selecting step to said receiving device via a cable or wireless transfer path;
a bit rate adjusting step to adjust the bit rate of the video signal transmitted to said receiving device in said video signal transmitting step, based on said transfer path information obtained in said transfer path information obtaining step;
a transmission control step to control the operations in said video signal compression step and said video signal selecting step; and
a compression information supplying step to supply the control information of said video signal compression step and said video signal selecting step by said transmission control step to said receiving device via said transfer path,
wherein the information indicating a compression method is received at a transmitting device through a High Definition Multimedia Interface (HDMI) terminal of the transmitting device, and wherein when the receiving device changes format information stored within the receiving device indicating capability of the receiving device to display a format of a video signal, the change of the format information is communicated to the transmitting device through a hot plug detect (HPD) line of the HDMI terminal.

13. A video signal receiving unit comprising:
a video signal receiving unit to receive a video signal transmitted from a transmitting device via a cable or wireless transfer path;
a video signal decompressing unit to perform decompression processing as to a compressed video signal and output a non-compressed video signal, when the video signal received with said video signal receiving unit is a compressed video signal;
a video signal selecting unit to select the video signal received with said video signal receiving unit or the video signal output from said video signal decompression unit;
a compression information obtaining unit to obtain compression information including at least information indicating whether the video signal received with said video signal received unit from said transmitting device is a non-compressed video signal or a compressed video signal, and information indicating a compression method in the case that the video signal received with said video signal receiving unit is a compressed video signal;
a receiving control unit to control operations of said video signal decompression unit and said video signal selecting unit, based on the compression information obtained with said compression information obtaining unit;
a compression method information supplying unit to supply information indicating a compression method that said video signal decompression unit can handle to said transmitting device via said transmission path; and
a transfer path information supplying unit to supply transfer path information indicating the state of said transfer path to said transmitting device via said transfer path,
wherein the information indicating a compression method is transmitted to the transmitting device through a High Definition Multimedia Interface (HDMI) terminal of the receiving unit, and wherein when the receiving unit changes format information stored within the receiving device indicating capability of the receiving unit to display a format of a video signal, the change of the format information is communicated to the transmitting device through a hot plug detect (HPD) line of the HDMI terminal.

14. The video signal receiving device according to claim 13, further comprising a format information supplying unit which supplies the format information to said transmitting device via said transfer path.

15. The video signal receiving device according to claim 13, wherein said video signal receiving unit receives said video signal from said transmitting device through a plurality of channels, by a differential signal, via said transfer path.

16. The video signal receiving device according to claim 13, wherein said transfer path information supplying unit has an error parameter measuring unit to measure the error parameters which are the parameters to indicate the state of said transfer path,
and supplies the information corresponding to the error parameters measured with said error parameter measuring unit to said transmitting device as said transmission path information.

17. The video signal receiving device according to claim 16, further comprising:

a storage unit wherein the format information is stored;

wherein said transfer path information supplying unit changes the format information stored in said storage unit, based on the error parameters measured with said error parameter measuring unit, and supplies the changed format information to said transmitting device as said transfer path information.

18. The video signal receiving device according to claim 17, wherein said transfer path information supplying unit changes the voltage of a predetermined line making up said transfer path when the format information stored in said storage unit is changed, and notifies the change of the format information to said transmission device.

19. A video signal receiving method comprising:
- a video signal receiving step to receive a video signal transmitted from a transmitting device via a cable or wireless transfer path;
- a video signal decompressing step to perform decompression processing as to a compressed video signal and output a non-compressed video signal, when the video signal received in said video signal receiving step is a compressed video signal;
- a video signal selecting step to select the video signal received with said video signal receiving step or the video signal output in said video signal decompression step;
- a compression information obtaining step to obtain compression information including at least information indicating whether the video signal received in said video signal received step from said transmitting device is a non-compressed video signal or a compressed video signal, and information indicating a compression method in the case that the video signal received in said video signal receiving step is a compressed video signal; and
- a receiving control step to control operations of said video signal decompression step and said video signal selecting unit, based on the compression information obtained in said compression information obtaining step;
- a compression method information supplying step to supply information, indicating a compression method which can be handled in said video signal decompressing step, to said transmitting device via said transfer path; and
- a transfer path information supplying step to supply the transfer path information indicating the state of said transfer path to said transmitting device via said transfer path, wherein the information indicating a compression method is transmitted to the transmitting device through a High Definition Multimedia Interface (HDMI) terminal of a receiving unit, and wherein when the receiving unit changes format information stored within the receiving device indicating capability of the receiving unit to display a format of a video signal, the change of the format information is communicated to the transmitting device through a hot plug detect (HPD) line of the HDMI terminal.

* * * * *